United States Patent
Fraley et al.

(10) Patent No.: US 8,296,732 B2
(45) Date of Patent: Oct. 23, 2012

(54) COMPUTER-IMPLEMENTED SYSTEMS AND METHODS FOR ANALYZING PRODUCT CONFIGURATION AND DATA

(75) Inventors: Jessica Marie Fraley, Holly Springs, NC (US); Benjamin Jeffress Tomlinson, Raleigh, NC (US); William John Nasuti, Cary, NC (US); Katherine R. Lehman, Raleigh, NC (US)

(73) Assignee: SAS Institute Inc., Cary, NC (US)

(*) Notice: Subject to any disclaimer, the term of this patent is extended or adjusted under 35 U.S.C. 154(b) by 1244 days.

(21) Appl. No.: 11/969,611

(22) Filed: Jan. 4, 2008

(65) Prior Publication Data
US 2008/0235611 A1    Sep. 25, 2008

Related U.S. Application Data

(60) Provisional application No. 60/919,830, filed on Mar. 23, 2007.

(51) Int. Cl.
*G06F 9/44* (2006.01)

(52) U.S. Cl. ........ 717/121; 717/124; 717/131; 715/735; 715/744

(58) Field of Classification Search .......... 717/120–136; 715/735–737, 744–747
See application file for complete search history.

(56) References Cited

U.S. PATENT DOCUMENTS

| | | |
|---|---|---|
| 5,086,393 A | 2/1992 | Kerr et al. |
| 5,475,843 A | 12/1995 | Halviatti |
| 5,528,735 A | 6/1996 | Strasnick et al. |
| 5,566,291 A | 10/1996 | Boulton et al. |
| 5,669,000 A | 9/1997 | Jessen et al. |
| 5,724,262 A | 3/1998 | Ghahramani |
| 5,892,947 A | 4/1999 | DeLong et al. |
| 5,905,856 A | 5/1999 | Ottensooser |
| 6,002,869 A | 12/1999 | Hinckley |
| 6,031,990 A | 2/2000 | Sivakumar et al. |
| 6,219,839 B1 | 4/2001 | Sampsell |
| 6,222,557 B1 | 4/2001 | Pulley, IV et al. |
| 6,237,138 B1 | 5/2001 | Hameluck et al. |
| 6,259,451 B1 | 7/2001 | Tesler |
| 6,301,579 B1 | 10/2001 | Becker |
| 6,326,985 B1 | 12/2001 | Tazoe et al. |
| 6,400,366 B1 | 6/2002 | Davies et al. |
| 6,405,364 B1 | 6/2002 | Bowman-Amuah |
| 6,449,744 B1 | 9/2002 | Hansen |
| 6,480,194 B1 | 11/2002 | Sang'udi et al. |
| 6,513,154 B1 | 1/2003 | Porterfield |

(Continued)

OTHER PUBLICATIONS

Estublier et al., Impact of Software Engineering Research on the Practice of Software Configuration Management, ACM, Oct. 29, 2005, pp. 1-48.*

(Continued)

*Primary Examiner* — Wei Zhen
*Assistant Examiner* — Satish Rampuria
(74) *Attorney, Agent, or Firm* — Jones Day

(57) ABSTRACT

Computer-implemented systems and methods are provided for analyzing configuration data associated with a plurality of software applications. For example a system and method can be configured to receive configuration data about the software applications, wherein the configuration data about the software applications includes configuration items that have relationships with other configuration items. An interface display screen is provided to the user, wherein the user interface display screen is configured to display an evaluation of the retrieved configuration data.

26 Claims, 60 Drawing Sheets

U.S. PATENT DOCUMENTS

| | | | |
|---|---|---|---|
| 6,526,526 B1 | 2/2003 | Dong et al. | |
| 6,529,216 B1 | 3/2003 | Moore et al. | |
| 6,725,399 B1 | 4/2004 | Bowman | |
| 6,734,878 B1 * | 5/2004 | DeLuca et al. | 715/735 |
| 6,775,819 B1 | 8/2004 | Hardikar et al. | |
| 6,842,176 B2 | 1/2005 | Sang'udi et al. | |
| 6,907,382 B2 | 6/2005 | Urokohara | |
| 6,934,934 B1 | 8/2005 | Osborne et al. | |
| 7,039,875 B2 * | 5/2006 | Khalfay et al. | 715/762 |
| 7,068,267 B2 | 6/2006 | Meanor et al. | |
| 7,197,370 B1 | 3/2007 | Ryskoski | |
| 7,222,265 B1 | 5/2007 | LeSuer et al. | |
| 7,237,231 B2 | 6/2007 | Lambert | |
| 7,313,564 B2 | 12/2007 | Melamed et al. | |
| 7,386,839 B1 * | 6/2008 | Golender et al. | 717/131 |
| 7,430,592 B2 * | 9/2008 | Schmidt et al. | 709/220 |
| 7,475,396 B2 * | 1/2009 | Kapoor | 717/178 |
| 7,577,769 B2 | 8/2009 | Cobb et al. | |
| 7,721,259 B2 * | 5/2010 | Heinke et al. | 717/121 |
| 7,949,628 B1 * | 5/2011 | Blazek et al. | 707/600 |
| 2001/0028359 A1 | 10/2001 | Muraishi et al. | |
| 2002/0029377 A1 | 3/2002 | Pavela | |
| 2003/0135843 A1 | 7/2003 | Sluiman et al. | |
| 2003/0204791 A1 * | 10/2003 | Helgren et al. | 714/48 |
| 2004/0107415 A1 | 6/2004 | Melamed et al. | |
| 2004/0139385 A1 | 7/2004 | Sakaue | |
| 2005/0015666 A1 | 1/2005 | Kamani et al. | |
| 2005/0154557 A1 | 7/2005 | Ebert | |
| 2005/0210397 A1 | 9/2005 | Kanai et al. | |
| 2005/0229043 A1 | 10/2005 | Nasuti et al. | |
| 2005/0240618 A1 | 10/2005 | Nickerson et al. | |
| 2005/0278597 A1 | 12/2005 | Miguelanez et al. | |
| 2005/0283736 A1 | 12/2005 | Elie | |
| 2006/0265368 A1 | 11/2006 | Nickerson et al. | |
| 2006/0265492 A1 | 11/2006 | Morris | |
| 2006/0277102 A1 | 12/2006 | Agliozzo | |
| 2007/0027652 A1 | 2/2007 | Hosagrahara | |
| 2007/0083854 A1 | 4/2007 | Mayer-Ullmann et al. | |
| 2007/0250621 A1 | 10/2007 | Hillier | |
| 2008/0104573 A1 | 5/2008 | Singla et al. | |
| 2008/0127101 A1 | 5/2008 | Anafi et al. | |
| 2009/0248315 A1 | 10/2009 | Pardo et al. | |

OTHER PUBLICATIONS

Midha, Software Configuration Management for the 21st Century, Bell Labs Technical Journal, Winter 1997, pp. 154-165.*

Ganci, John et al., "Rational Application Developer V6 Programming Guide", IBM Redbooks, 21 page of Table of Contents and pp. 4, 5, 503-524 and 1087-1099 [Jun. 2, 2005].

Hamill, Paul, "Unit Test Frameworks," O'Reilly Media, Inc., Chapter 3,. 24 pp. (Nov. 2, 2004).

"Java Static Analysis, Code Review, Unit Testing, Runtime Error Detection", http://www.parasoft.com/jsp/products/jtest.jsp;jsessionid=aaacAMw30bA6G4?ITEMId=14, 1pg. (Jul. 20, 2009).

"Parasoft Jtest—Now Available With Test Case Sniffer", http://web.archive.org/web/20060404223614/http://parasoft.com/jsp/products/home.jsp?jproduct=Jtest, 4 pp. (Apr. 4, 2006).

Dockendorf, Scott, "Unit Testing and Generating Source Code for Unit Test Frameworks Using Visual Studio 2005 Team System", http://microsoft.com/en-us/library/ms364064(VS.80,printer).aspx, 13 pp. (Sep. 2005).

Nasuti, William John et al., U.S. Appl. No. 10/811,789, filed Mar. 29, 2004 entitled "System and Method for Software Testing".

Squires, Charles W. et al., U.S. Appl. No. 11/522,710, filed Sep. 18, 2006 entitled "Computer-Implemented System for Generating Automated Tests From a Web Application".

Buwalda, Hans et al., "Getting Automated Testing Under Control," Software TEsting & Quality Engineering, pp. 39-44 [Nov./Dec. 1999].

Buwalda, Hans, "It can be complicated to automate model-based testing. Here's how to employ action words to get the job done.", STQE Magazine, Software Quality Engineering, pp. 42, 44, 46-47 [Mar./Apr. 2003].

Walker, Mark H. et al., Microsoft Office Visio 2003 Inside Out, Microsoft Press [Oct. 29, 2003].

"WHEN-D4.2 Test Automation Approach", B-K Medial Group, Issue 1.0, pp. 1-14 [Jul. 5, 2000].

* cited by examiner

```
/** Login Configuration for JAAS

SPECIAL NOTE:  login.config.orig is the file used to create the login.config
                   Editing login.config directly is STRONGLY discouraged as edits
                   to the login.config.orig file will override edits to login.config
                   if the configuration scripts are re-run.
**/
PFS {
com.services.security.login.TrustedLoginModule optional "debug"="false"
    "host"="dl5664"
    "port"="8561"
    "repository"="Foundation"
    "trusteduser"="dl5664/trust"
    "trustedpv"="{001}U0FTcHcx"
    "domain"="web";
};

/* Added for VRS scheduling support */
UsernamePassword {
    com.platform.Login.UsernamePasswordLogin required;
};
```

*Fig. 17*
PRIOR ART

```
<!-- discouraged as edits to the                                          -->
<!-- WebReportStudioProperties.xml.orig file will override                 -->
<!-- edits to WebReportStudioProperties.xml                                -->
<!--                                                                      -->
<properties>

<include>C:\Program Files\WebReportStudio\3.1/customer/LocalProperties.xml</include>
   <vrs.customer.folder>C:\Program Files\WebReportStudio\3.1\customer</vrs.customer.folder>

<!-- START citation.default processing                                  -->

<citation.default>
      <!--NOTE: Potentially many server sections can be defined. Which     -->
      <!--server section is honored is controlled by property "server" below -->
      <!--(which could be overridden on command line). For each of several -->
      <!--properties, if specified without the server name, that is the    -->
      <!--default, but can be overridden for the specific servers. For example -->
      <!--citation.default.devel.credential and                            -->
      <!--citation.default.myServer.devel.credential. Expected sections    -->
      <!--define at least:                                                 -->
      <!--                                                                 -->
      <!--server                                                           -->
      <!--repository                                                       -->
      <!--pfs.config.props.xml.local                                       -->
      <!--pfs.config.props.xml.remote (for portal integration)             -->

<!--START section of citation.defaults for repository name           -->

<!--** PLEASE NOTE THAT XML is Case Sensitive **                     -->
      <server>d15665</server>
      <repository>Foundation</repository>

<!--END section of citation.defaults for repository name             -->

<!--START section of pfs.config.props.xml.local/remote               -->

<!--Remember, you can customize these per server                     -->
      <pfs.config.props.xml>
         <local>
```

| | | MATCH TO FIG. 20B |
|---|---|---|
| ☐ Web Report Studio – pooling and trusted authentication con | | |
| Options | | |
| Local Machine | | |
| # | Name | |
| 1 | Is the Web Report Studio 'Pool Administrator ID' set | |
| 2 | Does the Web Report Studio configuration 'Surrogate | |
| 3 | Can the Web Report Studio configuration 'Surrogate | |
| 4 | The Web Report Studio configuration 'Surrogate User | |
| 5 | Is the Web Report Studio configuration 'Surrogate Us | |
| 6 | Is the Web Report Studio configuration 'AllowPublicUse | |
| 7 | Is the Web Report Studio properties 'Authentication M | |
| 8 | Is the Web Report Studio 'AuthenticationDomain' set to | |
| 9 | Does the Web Report Studio Configuration 'server' ma | |
| 10 | Does the Web Report Studio Login.config 'Domain' matc | |
| 11 | Does the Web Report Studio Login.config 'Repository' | |
| 12 | Does the Web Report Studio configuration 'Repository' | |
| 13 | Does the Web Report Studio configuration 'server' ma | |

Fig. 20B

☐ Rule #9 (Model: Web Reporting Studio - pooling and trusted authentica

Name: Does the Web Reporting Studio Configuration 'server' match the 'host' in Web Report Studio
Description: Does the server in Web Report Studio Configuration match the host in the login.con
ID: 158

Instructions: Click on one of the below objects to evaluate the rule for that particular object.

WebReportStudio Configuration

| Object | Property | Value |
|---|---|---|
| C:\Program Files\SA... ⑤ | server ④ | d15664 ① |

② ③

Web Report Studio uses the Login.config file for repository connection information. It is important
Studio configuration files synchronized. The Login.config file is located under the Live directory
Report Studio configuration can be found in one of 2 places. Look for the 'server' xml tag in these
WebReportStudioProperties.xml. The first property file that specifies this setting is the one that
Report Studio Configurations here. ⑥

[Help]

MATCH TO FIG. 21B

*Fig. 21A*

Rule #1 (Model: Users)

Name: Each User belongs to which Identity Groups?
Description: Which identity groups does a user belong to?
ID: 108

Instructions: Click on one of the below objects to evaluate the rule for that particular object.

Person

| Object | Property | Value |
|---|---|---|
| Administrator | Name | Administrator |
| Trusted User | Name | Trusted User |
| Guest | Name | Guest |
| Demo User | Name | Demo User |
| Web Administrator | Name | Web Administrator |
| Pool Administrator | Name | Pool Administrator |

(1) Informational Rule. These are rules that are in place to aid data searches. They also contain the desired user isn't a member of the desired group (indicated by a red X) then open the User Manager dialog. You can specify which Groups a User is a member of on the Groups tab.

Help

MATCH TO FIG. 23B

*Fig. 23A*

MATCH TO FIG. 24B

☐ Rule #1 (Model: Users)

Name: Each User belongs to which Identity Groups?
Description: Which identity groups does a user belong to?
ID: 108

Instructions: Click on one of the below objects to evaluate the rule for that particular object.

Person

| Object | Property | Value | |
|---|---|---|---|
| Administrator | Name | Administrator | X |
| Trusted User | Name | Trusted User | X |
| Guest | Name | Guest | X |
| Demo User | Name | Demo User | X |
| Web Administrator | Name | Web Administrator | X |
| Pool Administrator | Name | Pool Administrator | X |

Informational Rule. These are rules that are in place to aid data searches. They also contain the desired user isn't a member of the desired group (indicated by a red X) then open the User Manager dialog. You can specify which Groups a User is a member of on the Groups tab.

[ Help ]

Fig. 24A

| ☐ The Configuration Troubleshooter Manager |
|---|
| File　Preferences　Help |

If you wish to edit a rule then filter the rules using the below
you wish to create a new rule then press the New button.

1 —

Object: [All]

Property: [All]

2 —

[Filter]

Rules:　3　　4

| ID | Name |
|---|---|
| 100 | Does the HTTP (WebDav) Server exist in the reposi... |
| 101 | Does the BIP Tree exist in the repository? |
| 102 | Does the BIP Tree have a content server set up in it? |
| 103 | Does the BIP Tree have a Content Base Path define... |
| 104 | Does the Web OLAP Viewer install properties... |
| 105 | Does the BIP Tree have a ReportStudio subfolder? |
| 106 | Is Web OLAP Viewer install.properties using t... |
| 107 | Is Web OLAP Viewer install.properties using t... |
| 108 | Each User belongs to which Identity Groups? |
| 109 | Does Web OLAP Viewer install.properties 'Po... |
| 110 | Does the Web OLAP Viewer Metadata Source... |
| 111 | Is the Web OLAP Viewer Metadata Source Fil... |

MATCH TO FIG.25B

[Help]　　6 ⌒　[Open]

*Fig. 25A* options, select the desired rule and press the Open button. If

☑ Include Predefined Rules

☑ Include Custom Rules

Rules

| Description | Predefined |
|---|---|
| Is a webdav http server defined within the BIP Tree | ☑ |
| Is the BIP Tree defined within the repository? | ☑ |
| Does the BIP Tree have a content server defined? | ☑ |
| Is a content base path set up for the BIP Tree? | ☑ |
| Does the machine name (host name) located in the... | ☑ |
| Does a ReportStudio folder exist as a subfolder of... | ☑ |
| Does the Web OLAP Viewer install.properties... | ☑ |
| Does the Web OLAP Viewer install.properties... | ☑ |
| Which identity groups does a user belong to? | ☑ |
| Does the pooling ID listed in the Web OLAP Viewer... | ☑ |
| Does the repository name specified in Web OLAP... | ☑ |
| Does the repository port specified in the Web... | ☑ |

MATCH TO FIG. 25A

New — 6     Close

*Fig. 25B*

The Configuration Troubleshooter Manager

File   Preferences   Help

To edit a model select it and press Open button. To create a new model press the New button:

| Name | Description | Predefined |
|---|---|---|
| BIP Tree for Web Report Studio | Check for correct BIP Tree setup for use with Web Report St... | ☑ |
| BIP Tree has content server set up correctly | Check that the BIP Tree has a content server defined and corre... | ☑ |
| BIP Tree has correct file structure in place | Check that the BIP Tree has the correct file structure created. | ☑ |
| HTTP Server (physical) | Check for correct HTTP Server and DAV setup, a basic diagnost... | ☑ |
| Library | Check libraries to identify potential configuration issues between... | ☑ |
| Web Report Studio Repository Migration | Check Repository values after moving from one host to another... | ☑ |
| Object Spawner | Check basic troubleshooting and diagnostic for the Object Sp... | ☑ |
| OLAP Server | Check of basic troubleshooting and diagnostics for the OLAP... | ☑ |
| Web Report Studio - Query Cache | This model checks the query cache configuration within Web... | ☑ |
| Web Report Studio Query and Reporting... | This model will help diagnose the Access to Repository Failed err... | ☑ |
| Information Delivery Portal Basic Check | This model checks some Information Delivery Portal basic inform... | ☑ |
| Information Delivery Portal Configuration... | This model compares the values found in the Information Deli... | ☑ |
| Information Delivery Portal - web authen... | This model checks the Information Delivery Portal with web... | ☑ |
| General Repository Migration | Check basic setup and configuration of repository after migrati... | ☑ |
| Web Report Studio - Surrogate User und... | Check the surrogate user set up for operation under Trusted au... | ☑ |
| Web OLAP Viewer - configuration check | Check for the correct Web OLAP Viewer setup, a basic diagnos... | ☑ |
| Web OLAP Viewer - deployment | A basic check of the Web OLAP Viewer deployment. | ☑ |
| Web OLAP Viewer - trusted authenticati... | Check Trusted authentication set up. | ☑ |
| WebDav Setup | Check for correct DAV setup within the repository, a basic diagn... | ☑ |
| Workspace Server | A basic workspace server diagnostic. | ☑ |
| Web Report Studio - configuration check | A basic check of a Web Report Studio configuration. | ☑ |

Help    Open    New    Close

Fig. 27

MATCH TO FIG. 28B

| Rule | | | |
|---|---|---|---|
| Available Rules | | | |
| ID | Name | Description | Predefined |
| 100 | Does the HTTP (WebDav) Server exist... | Is a webdav http server defined within... | ✓ |
| 101 | Does the BIP Tree exist in the repositor... | Is the BIP Tree defined within the repo... | ✓ |
| 102 | Does the BIP Tree have a content serv... | Does the BIP Tree have a content serv... | ✓ |
| 103 | Does the BIP Tree have a Content Bas... | Is a content base path set up for the BI... | ✓ |
| 104 | Does the Web OLAP Viewer inst... | Does the machine name (host name) lo... | ✓ |
| 105 | Does the BIP Tree have a ReportStudio... | Does a ReportStudio Folder exist as a... | ✓ |
| 106 | Is Web OLAP Viewer install.prop... | Does the Web OLAP Viewer inst... | ✓ |
| 107 | Is Web OLAP Viewer install.prop... | Does the Web OLAP Viewer inst... | ✓ |
| 108 | Each User belongs to which Identity Gr... | Which identity groups does a user belo... | ✓ |
| 109 | Does Web OLAP Viewer install.pr... | Does the pooling ID listed in the Web... | ✓ |
| 110 | Does the Web OLAP Viewer Met... | Does the repository name specified in... | ✓ |
| 111 | Is the Web OLAP Viewer Metadat... | Does the repository port specified in th... | ✓ |
| 112 | BIP Tree more information | | ✓ |
| 113 | Does the BIP Tree have a Content Serv... | Does a Content Server Userid exist for... | ✓ |
| 114 | Does the BIP Tree's content base path... | Do the Base Paths specified by the htt... | ✓ |
| 115 | Import tables - additional information | | ✓ |
| 116 | What is the Web OLAP Viewer L... | What is the Web OLAP Viewer L... | ✓ |

Fig. 28A

| Selected Rules ③ | | | |
|---|---|---|---|
| ID | Name | Description | Predefined |
| 551 | Is a Data Library preassigned? | Is a library preassigned | ✓ |
| 522 | Each User has 'Read Permission' on w... | check user read metadata permissions... | ✓ |
| 523 | Each IdentityGroup has 'Read Permissio... | check user read metadata permissions... | ✓ |
| 544 | Each Workspace server serves which... | Workspace server handles which libra... | |

*Fig. 28B*

MATCH TO FIG. 28A

Select the desired models:

| Include | Name | Type | Application | Requires Searching |
|---|---|---|---|---|
| ☐ | BIP Tree for Web Report Studio | Diagnostic | Web Report Stu... | ☐ |
| ☐ | BIP Tree has content server set up cor... | Diagnostic | General | ☐ |
| ☐ | BIP Tree has correct file structure in pl... | Diagnostic | Web Report Stu... | ☐ |
| ☐ | HTTP Server (physical) | Diagnostic | General | ☐ |
| ☐ | Library | Diagnostic | General | ☑ |
| ☐ | Web Report Studio Repository Mig... | Diagnostic | Web Report Stu... | ☑ |
| ☐ | Object Spawner | Diagnostic | General | ☐ |
| ☐ | OLAP Server | Diagnostic | General | ☑ |
| ☐ | Web Report Studio – Query Cache | Diagnostic | Web Report Stu... | ☑ |
| ☐ | Web Report Studio Query and Re... | Diagnostic | Web Report Stu... | ☑ |
| ☐ | General Repository Migration | Diagnostic | General | ☑ |
| ☐ | Web Report Studio – Surrogate Us... | Diagnostic | Web Report Stu... | ☑ |
| ☐ | Web OLAP Viewer – configuratio... | Diagnostic | Web OLAP Vie... | ☑ |
| ☐ | Web OLAP Viewer – deployment | Diagnostic | Web OLAP Vie... | ☐ |
| ☐ | Web OLAP Viewer – trusted auth... | Diagnostic | Web OLAP Vie... | ☐ |
| ☐ | WebDav Setup | Diagnostic | General | ☐ |
| ☐ | Workspace Server | Diagnostic | General | ☐ |
| ☐ | Web Report Studio – configuration... | Diagnostic | Web Report Stu... | ☑ |

[Help]  [Cancel]  [◁ Back]  [Next ▷]  [Finish]

*Fig. 30*

```
<Object application="General" description="" name="Object Spawner" type="Object" value="ServerComponent"
<Property description="" name="Name"><Value version_end="" version_start="">Name< /Value></Property>
<Property description="" name="Port"><Value version_end="" version_start="">Port< /Value></Property>
<Property description="Returns a user readable name" name="Displayable Name" >
    <Value version_end ="" version_start="">Displayable Name</Value>
</Property>
<Property description ="" name="Servers started by object spawner" >
    <Value version_end ="" version_start="">AssociatedServers</Value>
</Property>
<Property description ="" name="Is object spawner running" >
    <Value version_end ="" version_start="">AmIRunning</Value >
</Property>
<Property description ="" name="What machine hosts object spawner" >
    <Value version_end ="" version_start="">HostName</Value >
</Property>
</Object>
```

Fig. 33

```
<Rule Description="Is a Workspace Server running?" Displayable_Name="Is a Workspace Server running?" id="504">
  <Obj1 ObjectName="WorkspaceServer" PropertyName="AmIRunning" application="General" version_end="" version_start=""/>
  <Obj2 ObjectName="Constant" PropertyName="true" application="General" version_end="" version_start=""/>
  <RelationshipRef name="Equals" value="Check/X/Warning"/>
  <PassedComment>More information on Workspace Servers is available <a href='http://support.sas.com/rnd/itech/doc9/admin_oma/sasserver/iombridge/iom_quicko.html '>here</a>.</PassedComment>
  <FailedComment>A Workspace Server does not appear to be running.  Please start your Workspace Server according to your installation instructions.  More information on Workspace Servers is available <a href='http://support.sas.com/rnd/itech/doc9/admin_oma/sasserver/iombridge/iom_quicko.html '>here</a>.</FailedComment>
</Rule>
```

*Fig. 34*

```xml
<?xml version="1.0" encoding="utf-8"?>
<Model TimeStampDay="7" TimeStampHour="16" TimeStampMinute="44" TimeStampMonth="2" TimeStampYear="2006" Version="3.1" applicationName="WebReportStudio" applicationValue="Web Report Studio" description="A basic check of a Web Report Studio configuration." name="Web Report Studio - configuration check" type="Diagnostic" version_end="All" version_start="All">
<Inc_Models>
<Inc_Model filename="scout//models//DiagnosticOptimizer.xml"/>
</Inc_Models>
<Inc_Rules>
<Inc_Rule ID="158"/>
<Inc_Rule ID="581"/>
<Inc_Rule ID="583"/>
<Inc_Rule ID="151"/>
<Inc_Rule ID="152"/>
<Inc_Rule ID="153"/>
<Inc_Rule ID="201"/>
<Inc_Rule ID="170"/>
<Inc_Rule ID="171"/>
<Inc_Rule ID="213"/>
<Inc_Rule ID="221"/>
<Inc_Rule ID="159"/>
</Inc_Rules>
<User_Input/>
</Model>
```

Fig. 35

| Test Group Name (Platform Profile Name) | | | A | | |
|---|---|---|---|---|---|
| Test Number | B | C | Test Name | D | Results |
| 1 | | | Name of Test 1 | | True/False/More |
| 2 | | | Name of Test 2 | | True/False/More |
| 3 | | | Name of Test 3 | | True/False/More |
| 4 | | | Name of Test 4 | | True/False/More |

E  Detailed explanation of what any selected test is testing for

Help

Test Number (Test Group) (A)

Test Name: Name of the test (B)
Test Description: Description of the test (C)
Test ID: ID number of the test (D)

Instructions on how to evaluate the test results below (E)

(F)

| Configuration Setting Source Name | | |
|---|---|---|
| | Configuration setting Name | Value retrieved | Results |
| Source 1 | Configuration setting Name | Value retrieved | Results |
| Source 2 | Configuration setting Name | Value retrieved | Results |
| Source N | Configuration setting Name | Value retrieved | Results |

(L)

(F) (G) (H) (I) (J)

| Configuration Setting Source Name | | |
|---|---|---|
| | Configuration setting Name | Value retrieved | Results |
| Source 1 | Configuration setting Name | Value retrieved | Results |
| Source 2 | Configuration setting Name | Value retrieved | Results |
| Source N | Configuration setting Name | Value retrieved | Results |

Discussion of the results (K)

Help    Refresh    OK

*Fig. 39*

```
-<Object name="IdentityGroup" value="IdentityGroup" type="Object" >
  <Property name="Displayable Name" value=""/>
  <Property name="Name" value=""/>
  <Property name="Members" value=""/>
  <Property name="Logins" value=""/>
</Object>
```

*Fig. 42*

```
-<Rule id="108" Displayable_Name="Users belong to which Identity Groups"
  Description="Users Belong to which Identity Groups" >
  <Obj1 ObjectName="Person" PropertyName="Name" />
  <Obj2 ObjectName="IdentityGroup" PropertyName="Members" />
  <RelationshipRef name="AtLeastOneMatches" value="Check/X/Warning" />
</Rule>
```

*Fig. 43*

```
-<Model name="Users" type="EXPLORE" application="Management Console" description="This
  model will determine which groups each user is a member of.">
  -<Inc_Rules>
    <Inc_Rule ID="108" />
    <Inc_Rule ID="128" />
  </Inc Rules>
</Model>
```

*Fig. 44*

• XML Input

```
<?xml version="1.0" encoding="ISO-8859-1" ?>
-<SCOUT_Input_File>
   <userID>adm</userID>
   <password>{001}QmlzdHJvMzc=</password>
   <AuthDomain>DefaultAuth</AuthDomain>
   <Repository>Foundation</Repository>
   <Port>8561</Port>
   <Host>t2006.na.sas.com</Host>
-</Models>
   <Model filename="DiagnosticOlapServer.xml"/>
  </Models>
</SCOUT_Input_File>
```

*Fig. 53*

• XML Output

```
<?xml version="1.0" encoding="ISO-8859-1" ?>
<SCOUT_LOG_FILE>
-<Models>
   <Model filename="DiagnosticOlapServer.xml"/>
</Models>
-<Objects>
 -<Object Name="OlapServer" Type="Object" Value="
  -<Instances>
    -<Instance Name="Main">
     -<Properties>
        <Property Name="Displayable Name" Value="Ma
        <Property Name="SupportedLogins" Value="t2006\
        <Property Name="SupportedDomains" Value="Default
        <Property Name="AmIRunning" Value="false" />
        <Property Name="Name" Value="Main"/>
        <Property Name="Port" Value="5451"/>
        <Property Name="HostName" Value="t2006.na.sas.
        <Property Name="AuthenticationType" Value="user
        <Property Name="CommunicationProtocol" Value="
        <Property Name="ApplicationProtocol" Value="Bridg
```

COMPUTER-IMPLEMENTED SYSTEMS AND METHODS FOR ANALYZING PRODUCT CONFIGURATION AND DATA

CROSS-REFERENCE TO RELATED APPLICATION

This application claims priority to and the benefit of U.S. Application Ser. No. 60/919,830, (entitled "Computer-Implemented Systems And Methods For Analyzing Product Configuration And Data" and filed on Mar. 23, 2007), of which the entire disclosure (including any and all figures) is incorporated herein by reference.

TECHNICAL FIELD

This document relates generally to computer system administration and more particularly to analysis of configuration settings and data.

BACKGROUND

Modern computer applications are complex systems that may use multiple operating systems, have multiple program components and multiple types of users, each with unique access requirements. System Administrators face a difficult task when attempting to initialize and maintain application uptime and optimization for users. Troubleshooting and optimizing complex computer systems becomes exponentially more difficult as the size of the user base and complexity of their computer needs increases as each product could contain hundreds of configuration settings.

FIG. 1 is a block diagram depicting a typical prior art manual administration process. This manual administration process 130 begins with an administrator selecting a set of system behaviors 134 desired for capture and analysis in step 1 of the process. Once a set of system behaviors 134 has been identified, the administrator must then compile a list of data required for analysis 136 of the set of identified system behaviors 134 depicted as step 2. Step 3 of the process involves the collection of the data catalogued in the list of data required for analysis 136. This collection step requires manual examination of configuration data from a variety of sources depending upon the system behaviors 134 selected for analysis.

In this example, a first source for data can include local software applications 138 and their associated configuration data 140. This data could be accessed through the software application 138 or through data files external to the running application. Data required for analysis 136 could also be housed in one or more data repositories 142. These data repositories could be stored locally or remotely. Configuration data 148 also may be stored in remote software application instances or in remote data repositories and could be accessed remotely through servers 150. When all data appearing in the list of data required for analysis has been collected, the administrator must analyze the collected data and transform the data to a form useful for the administrator's needs at step 4 of the process. Finally, step 5 of the process entails display of the analyzed results 152.

A weakness of this method is that all tasks fall to the administrator and many of which are manually intensive. For example, as the number of integrated products grow and/or the number of configuration settings increases, the usefulness of this approach diminishes because of the increased complexity in analyzing multiple applications and components through this approach.

SUMMARY

In accordance with the teachings provided herein, systems and methods for analyzing configuration data associated with a plurality of software applications are provided. For example a system and method can be configured to receive configuration data about the software applications, wherein the configuration data about the software applications includes configuration items that have relationships with other configuration items, and wherein the configuration data about the software applications includes two configuration items that have a relationship. An interface display screen is provided to the user, wherein the user interface display screen is configured to display an evaluation of the retrieved configuration data based upon an evaluation of the relationship between the two configuration items.

As another example, systems and methods for analyzing configuration data with a plurality of software applications are provided which include software instructions for retrieving configuration data about the software applications. The configuration data is retrieved from the computer location on which their respectively associated software applications are located. The configuration data about the software applications includes configuration items that have relationships with other configuration items, and the configuration data about the software applications includes two configuration items that have a many-to-many relationship between the two configuration items. The systems and methods include interface displaying software instructions for providing a user interface display screen, wherein the user interface display screen is configured to display an evaluation of the retrieved configuration data based upon an evaluation of the many-to-many relationship between the two configuration items.

As yet another example, a computer-implemented graphical user interface is provided. This user interface contains a first display area for displaying one or more entities that have relationships to other entities. It also includes a second display area for displaying a second set of entities that have relationships to other entities, wherein at least one entity in the first display area has a many-to-many relationship with at least one entity in the second display area.

BRIEF DESCRIPTION OF THE DRAWINGS

FIGS. 17 and 18 are examples of configuration files.

FIGS. 20A-21B depict a configuration check results summary screen and detail screen, respectively.

FIGS. 23A-24B depict a many-to-many relationship display and selection display, respectively.

FIGS. 25A and 25B depict a test design and modification display.

FIGS. 27-28B depict additional test design and modification displays.

FIG. 30 depicts a batch mode test group selection display.

FIGS. 33-35 depict examples of object data, single test data, and group test data, respectively.

FIGS. 38, 39, and 40 depict a group test results analysis display, a single test results analysis display, and a single data source data value display, respectively.

FIG. 41 depicts a utility model hierarchy.

FIG. 42-44 depict an example of an object, an example of a rule, and an example of a model, respectively.

FIGS. 53 and 54 depict batch mode XML input and batch mode XML output, respectively.

FIGS. 55 and 56 depict a rule manager display and a model manager display respectively.

DETAILED DESCRIPTION

Figure 1:
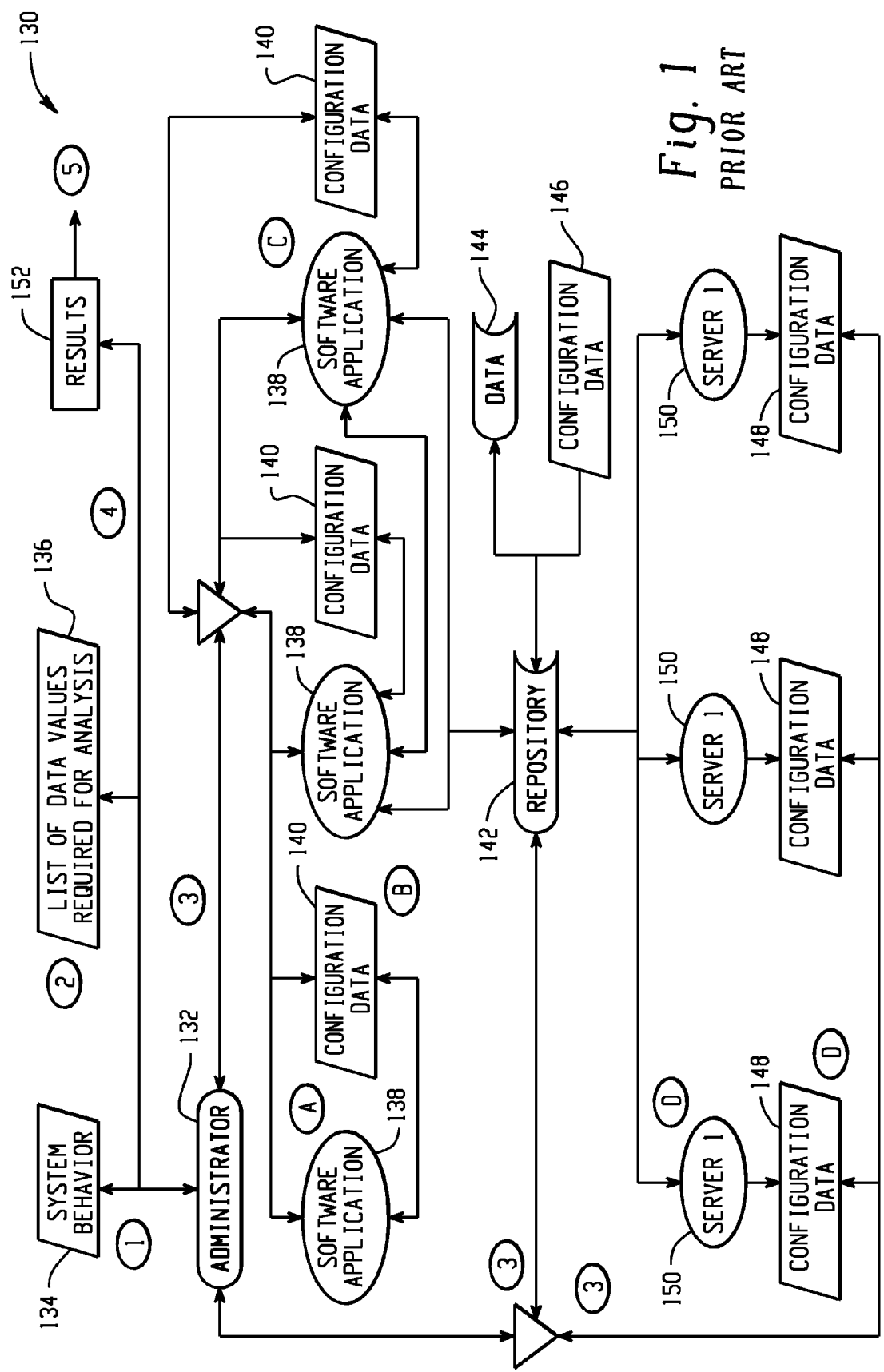
FIG. 1 is a block diagram depicting a typical manual administration process.
Figure 2:
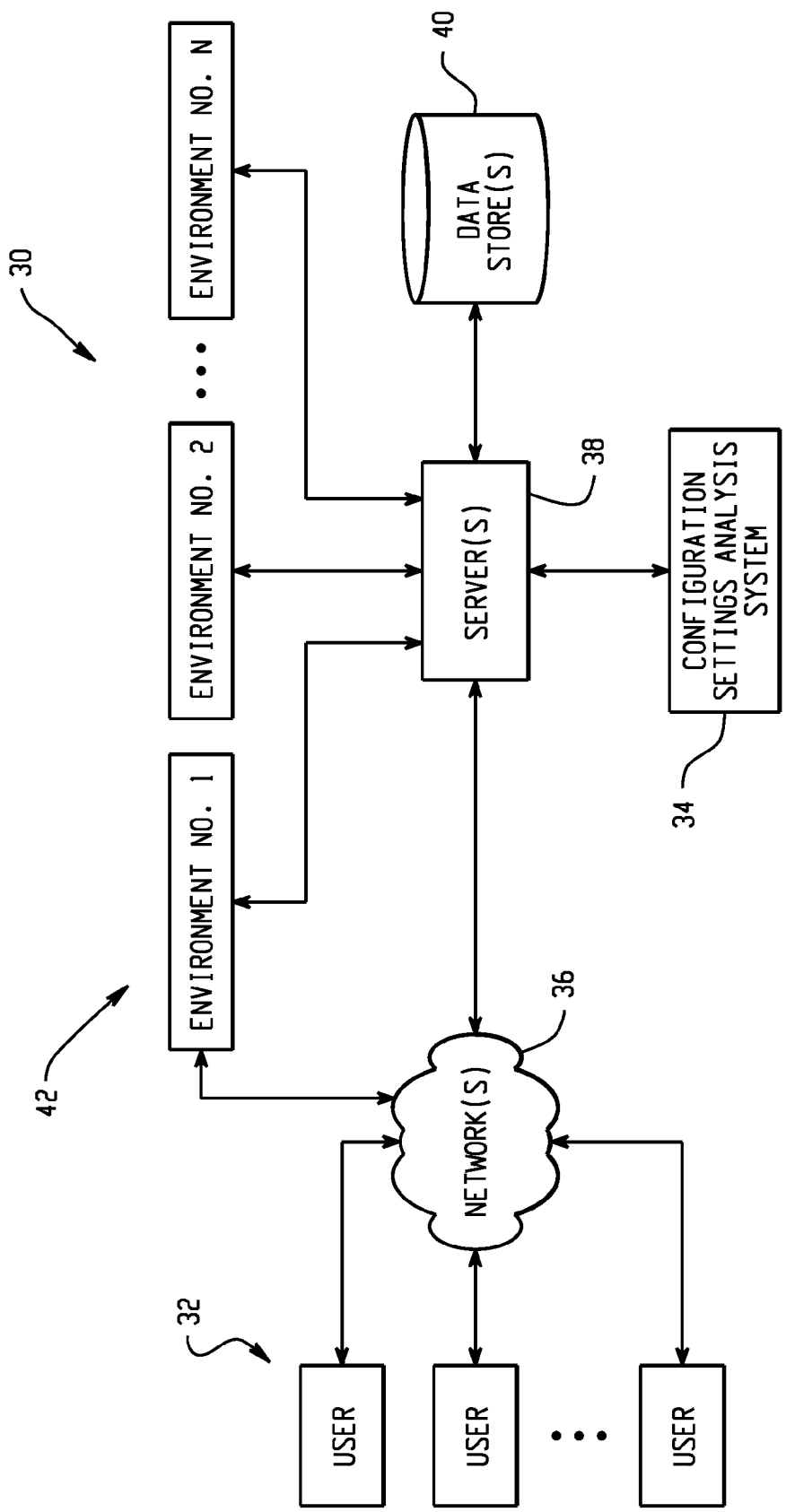
FIG. 2 is a block diagram depicting an example system configuration.

FIG. 2 depicts at 30 an environment wherein users 32 can access system 34 in order to analyze the configuration settings of different software applications. The system 34 links or joins different software application environments, thereby allowing for a decrease in time required to gather configuration data across applications. This joining of environments also allows the user (e.g., an administrator, etc.) to have data values automatically compared across software applications. Any test which does not meet the conditions specified by the test is automatically flagged as a potential problem. Accordingly, the system 34 insulates the user from the visual noise of data not considered important to the test question being asked, and allows the user to focus on the settings considered salient to the test at hand.

A user can interact with a configuration settings analysis system 34 in a number of ways such as through network 36 and server(s) 38. A server 38 accessible through the network(s) 36 can host the system 34. It should be noted that configuration settings analysis system 34 utilizes the server(s) 38 and network 36 to enable access to remote data sources such as those housed on remote data stores 40 as well as remote environments 42. In this setup, the configuration settings analysis system 34 receives data about the software applications a user 32 wishes to analyze. These software applications may reside locally with the configuration settings analysis system 34 or they may reside in different and disparate computer environments. The retrieved configuration data items can also have relationships with other configuration items, such as one-to-one relationships, many-to-many relationships, etc.

Once the configuration settings analysis system 34 retrieves the sought after configuration data, a user interface display screen is provided to the user to display an evaluation of the retrieved configuration data based upon an evaluation of the relationship(s) between the configuration items.

Figure 3:
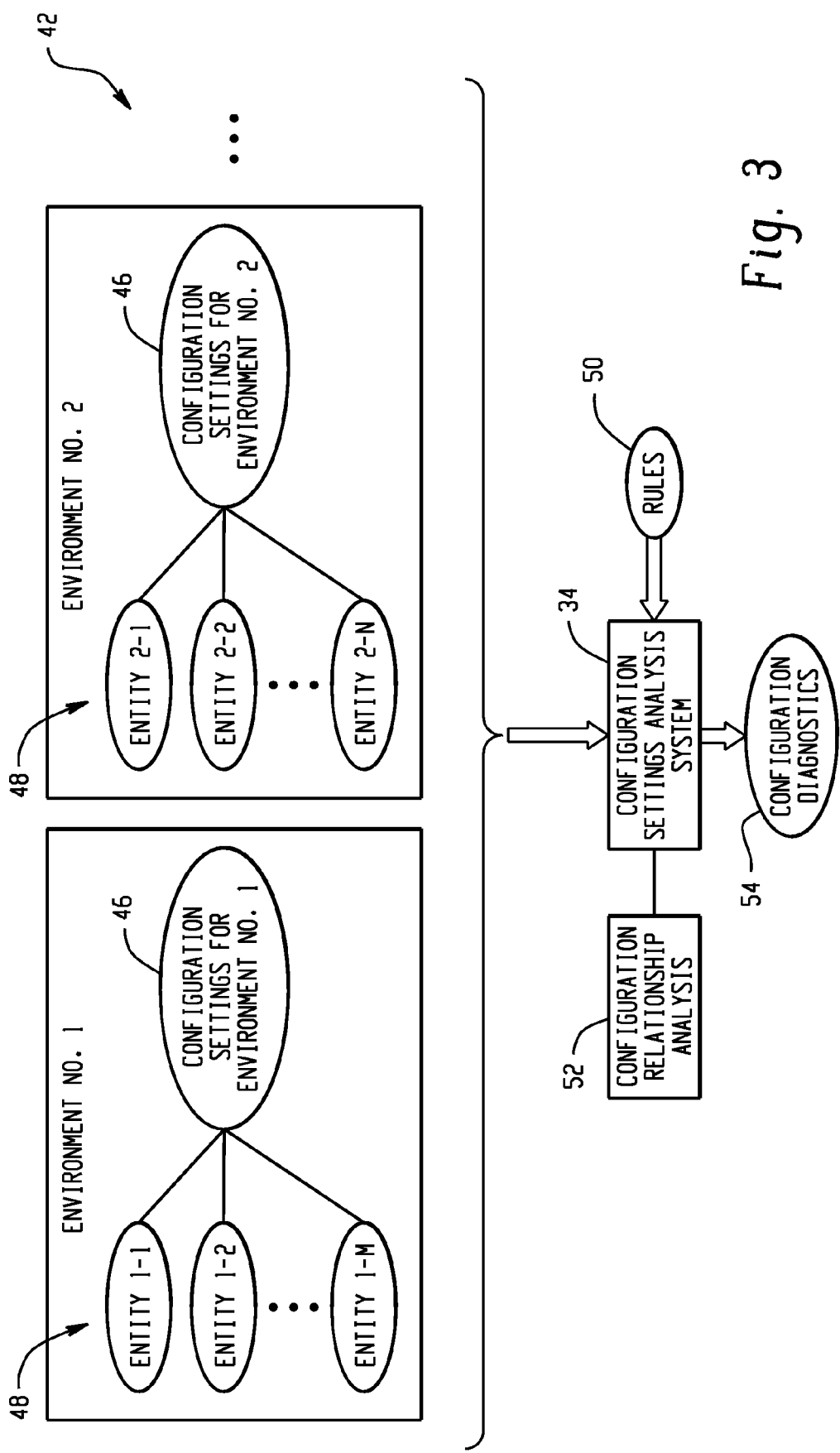
FIGS. 3-5 are block diagrams depicting the flow of data from disparate environments to a configuration settings analysis system.

FIG. 3 is a block diagram depicting the flow of data between computer environments 42 and a configuration settings analysis system 34. An environment 42 contains a collection of configuration settings for the entities 48 operating within its environment 42. This collection of configuration settings is used by the configuration settings analysis system 34 for its configuration analysis. Configuration settings for an environment 46 can be made up of data items from a wide range of entities 48 such as configuration data of local applications, properties of active objects present in an environment, data stores housed within an environment, data sources from other disparate environments linked through the environment, as well as others. The data provided to the configuration settings analysis system 34 is then analyzed according to a set of selected rules 50 in order for analysis 52 of the relationships. The result of the analysis 52 is the generation of configuration diagnostics 54.

Figure 4:
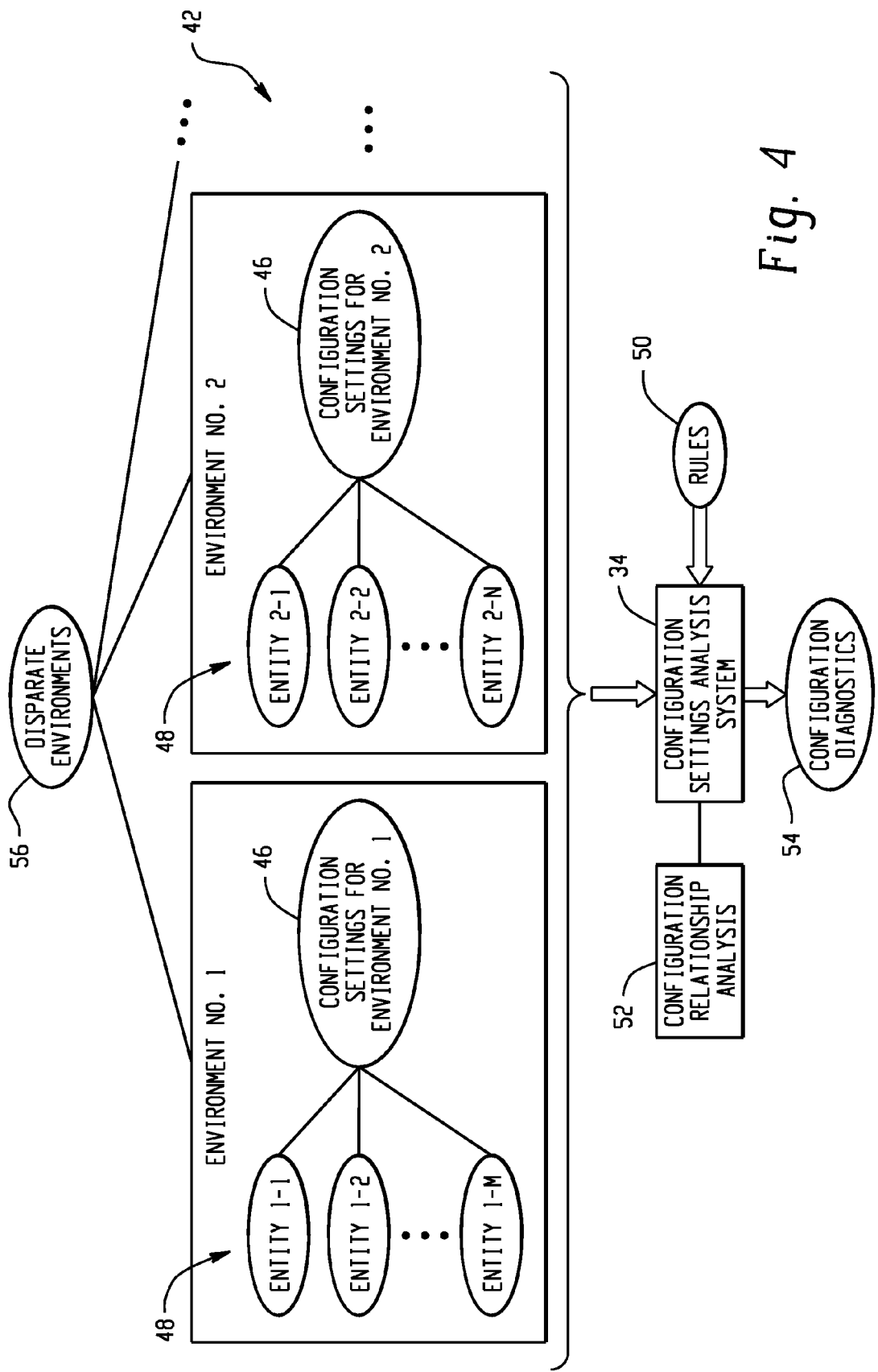
Figure 5:
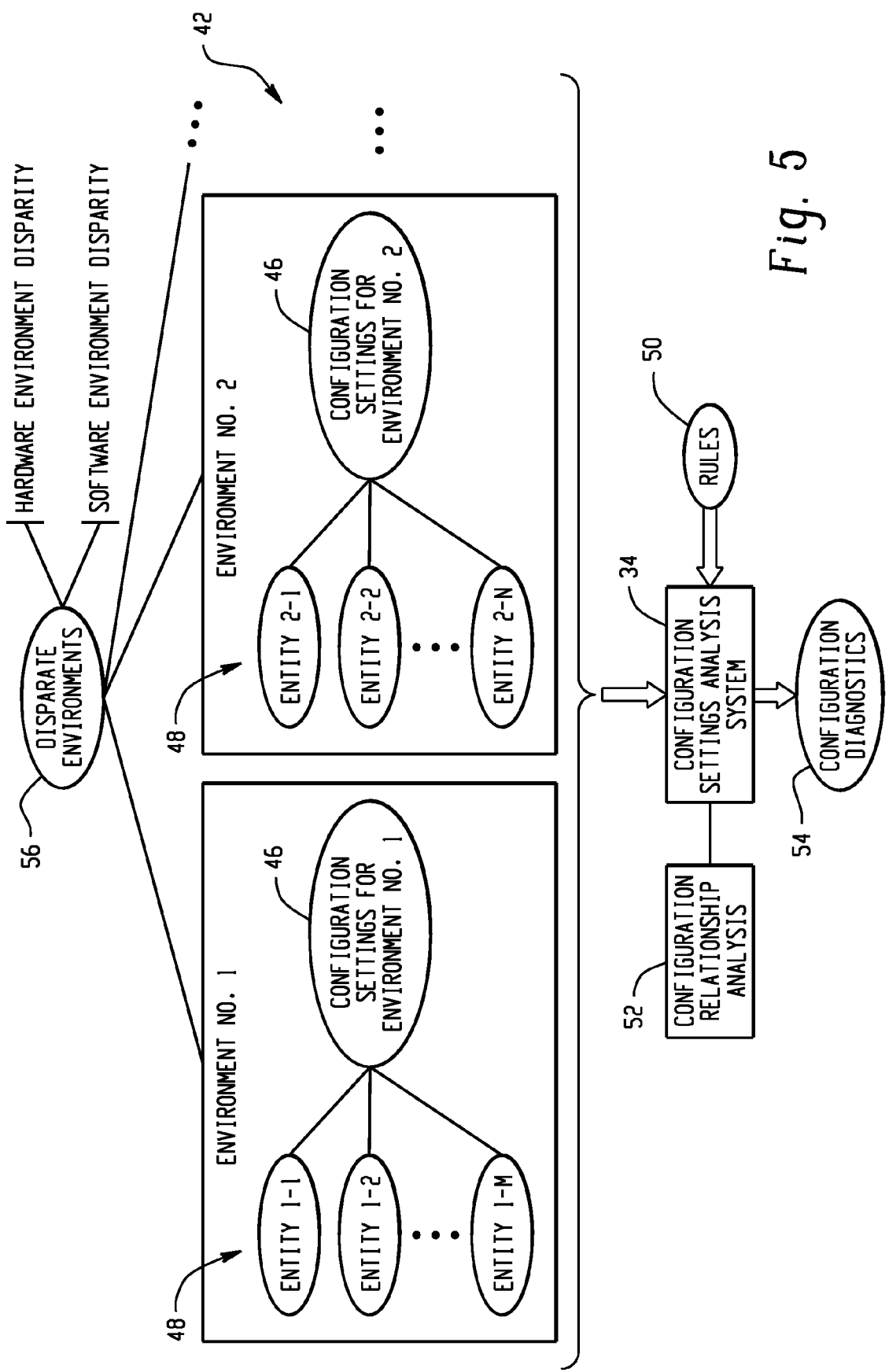

FIG. 4 illustrates that the environments 42 which supply configuration settings to the configuration settings analysis system 34 may operate in disparate environments 56 with respect to each other. These environments could be local or remote to the configuration settings analysis system 34 and could span a wide range of applications or a distributed single application. FIG. 5 further illustrates that this set of disparate environments 56 may differ because of hardware environment disparity or software environment disparity. Hardware environment disparity could include multiple architectures operating on any number of computing machines. Software environment disparity could include applications produced by different software manufacturers utilizing different computer languages, data structures, and protocols.

A configuration settings analysis system 34 can evaluate the configurations of unrelated applications produced by different software manufacturers as well as being capable of dynamically expanding to cover new products. This expansion is not limited by machine type or tier and is capable of operating across multiple architectures.

Figure 6:
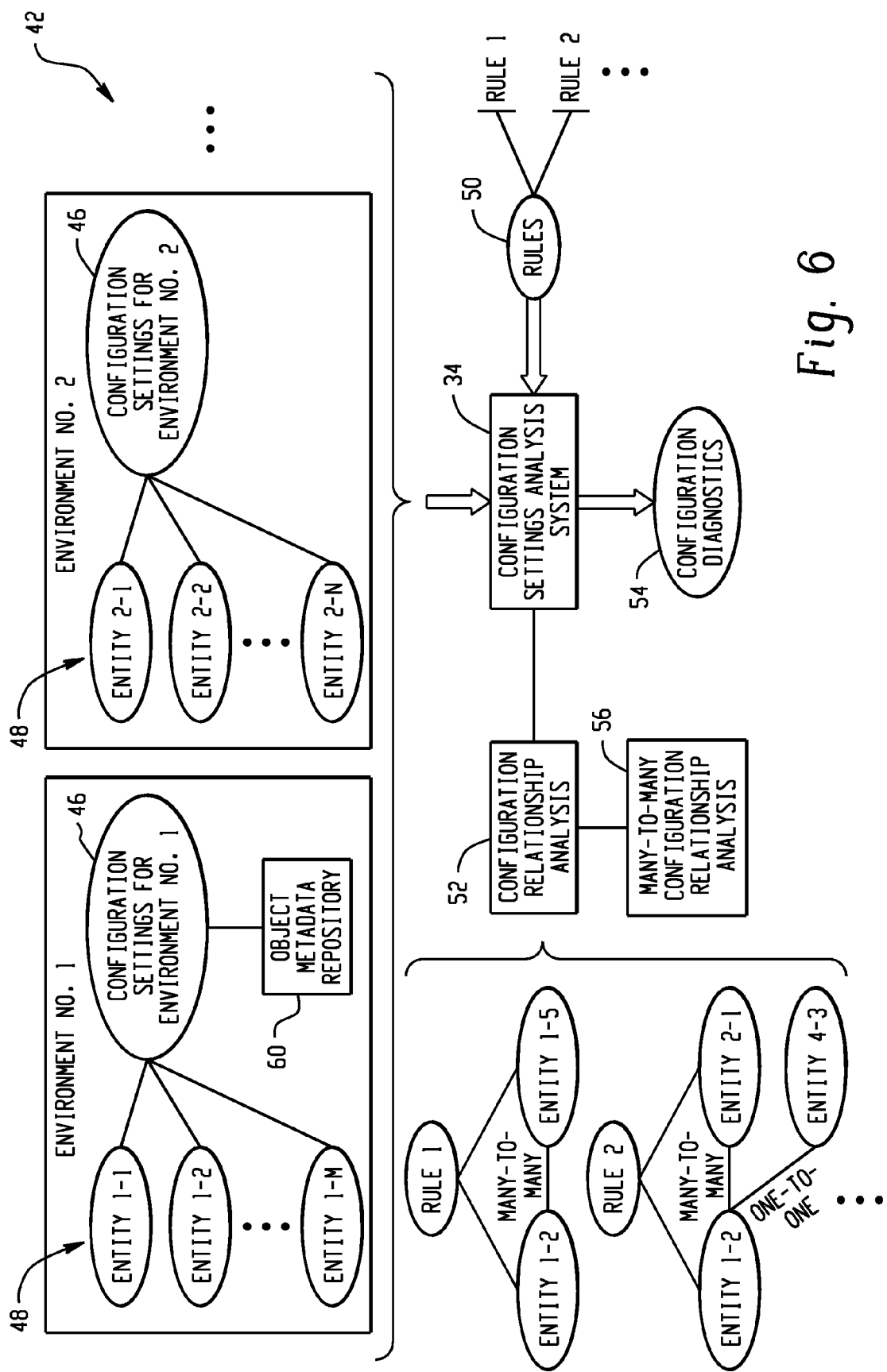
FIGS. 6 and 7 are block diagrams depicting exemplary relationships among rules and entities in many-to-many configuration relationship analysis.

FIG. 6 illustrates several of the different types of relationships that can be analyzed by the configuration relationship analysis system 52. For example, a rule introduced to the configuration settings analysis system 34 from the set of selected rules 50 may require that certain data be contained within certain entities from certain environments.

Figure 7:
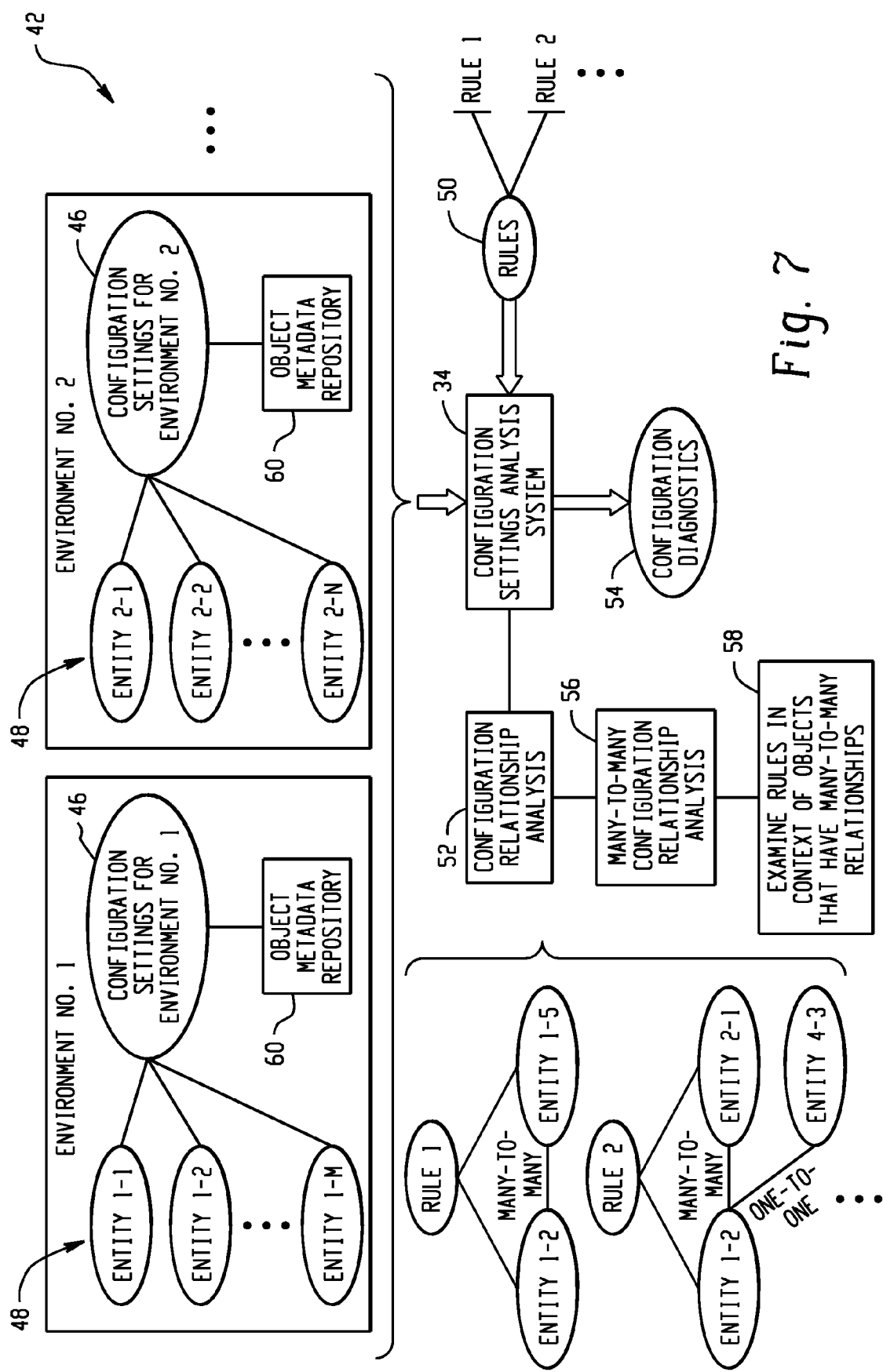

While the entities are associated with the rules, the entities may also have relationships amongst themselves. These relationships could be many-to-many, one-to-one, one-to-many, many-to-one, etc. The configuration relationship analysis is capable of taking these relationships into consideration such as handling many-to-many relationships through software code 52. As depicted in FIG. 7, software code 52 can further include (or have access to) relationship analysis code 58 which examines the rules introduced from the set of selected rules 50 in context of entities that have many-to-many relationships 58. This allows comparison of many unique data relationships which may be useful in system configuration diagnostic analysis. In this example embodiment, an environment 42 may store configuration settings in an object metadata repository 60 for access by the configuration settings analysis system 34.

Figure 8:
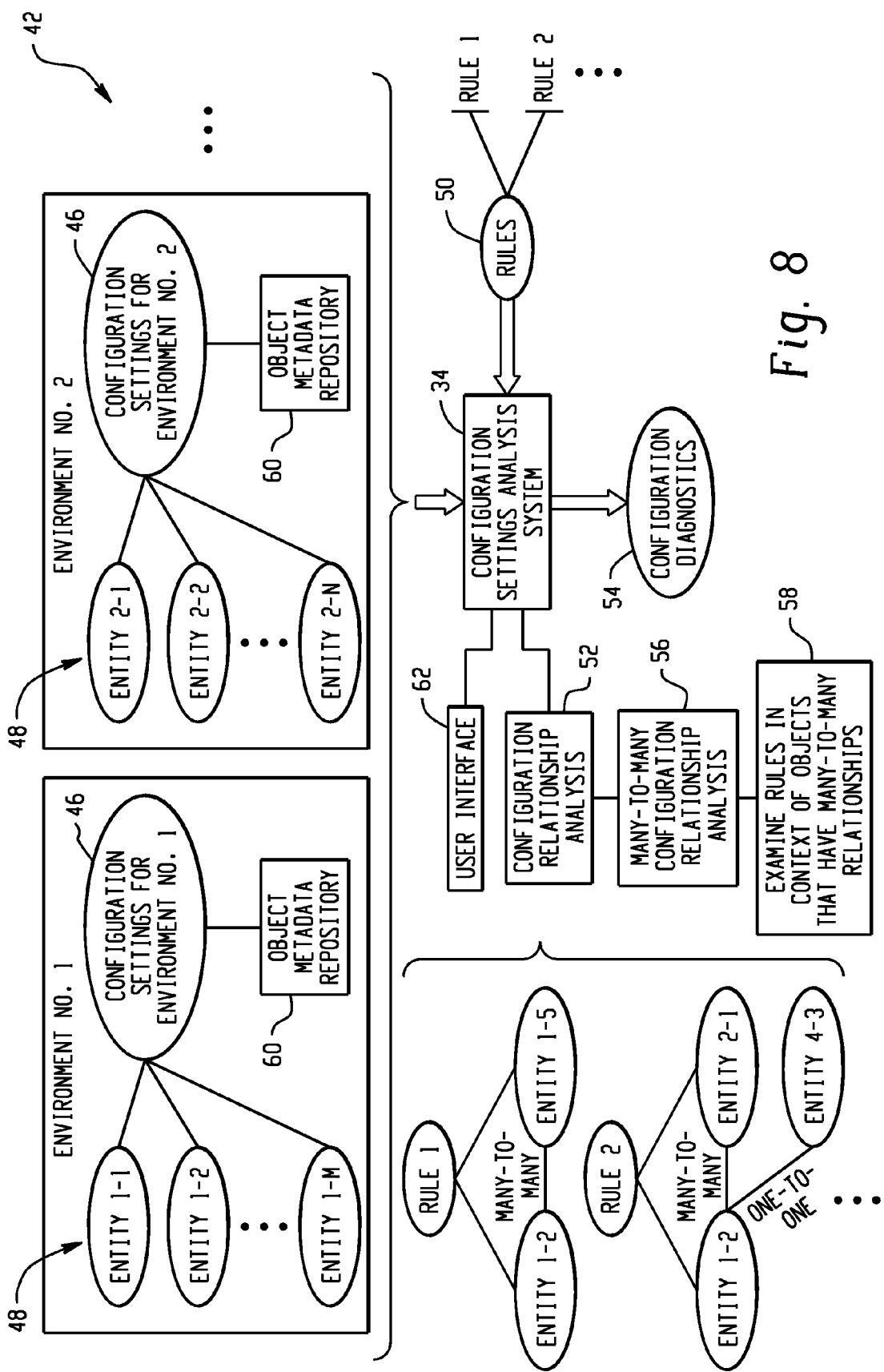
FIGS. 8 and 9 are block diagrams depicting user interfaces for configuration analysis.

FIG. 8 depicts a user interface 62 capable of visually displaying the evaluation of the relationships analyzed by the configuration relationship analysis software code 52. The user interface 62 can also be capable of displaying relationship evaluations between data stored in separate lists. Additionally, the user interface 62 is capable of visually displaying the evaluation of many-to-many relationships. For example, upon selection of an item from one list, the user interface 62 displays the evaluation of each data in the second list based upon the value of the selected item and displaying those evaluations to the user. This allows the user to rapidly compare many unique data relationships, while isolating them from the manual tasks of identifying the data items to be gathered, gathering the data item values, and manually comparing the values.

Figure 9:
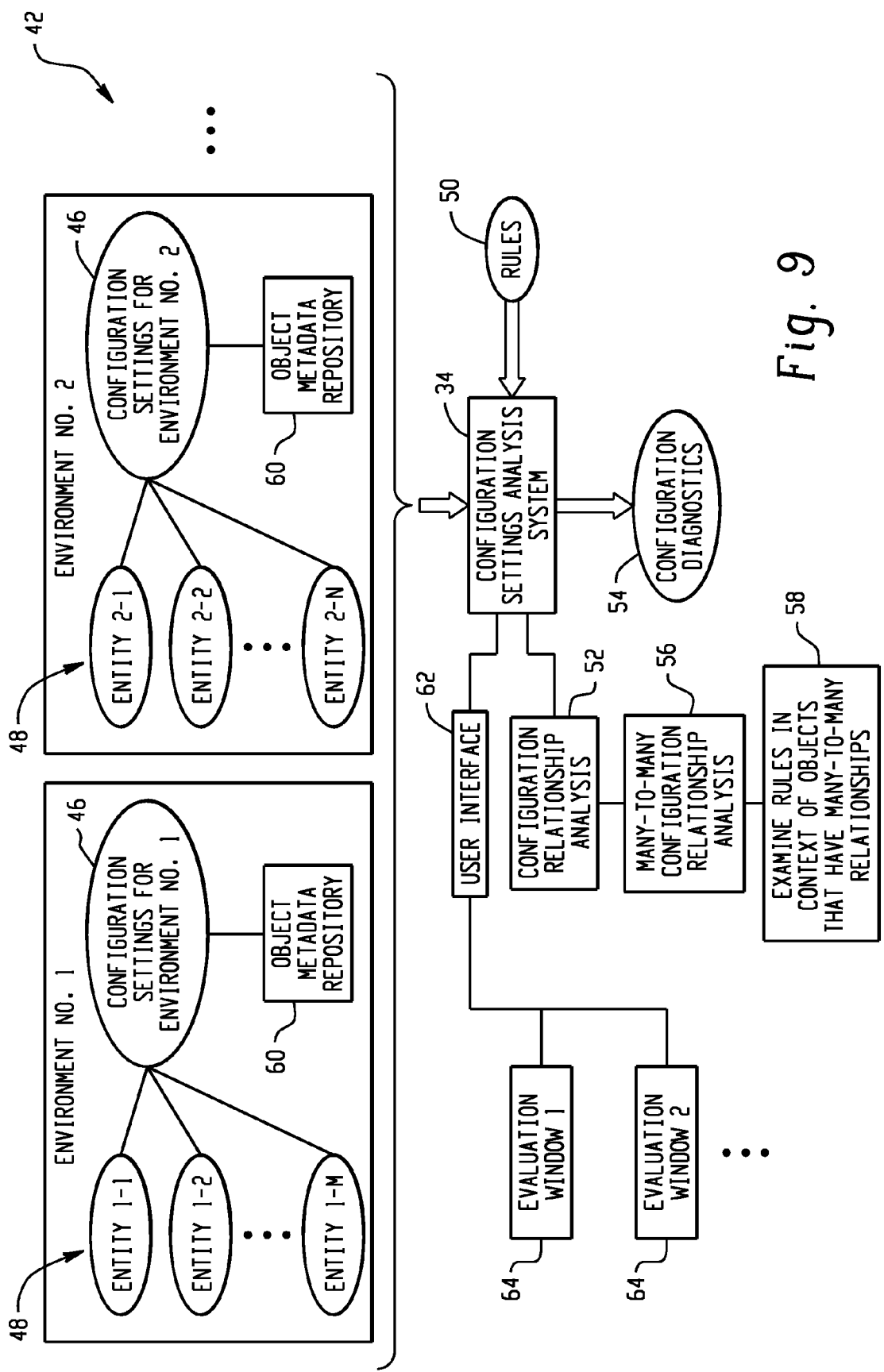

FIG. 9 depicts the user interface 62 having a multiple window evaluation display capability 64. The user display 62 is capable of displaying multiple tests by opening a separate evaluation window 64 for each test. When a user evaluates a test by selecting a data value within an evaluation window, all of the other evaluation windows dynamically begin a re-evaluation of their data and present new evaluation results based on the re-evaluation across the multiple evaluation windows 64.

Figure 10:
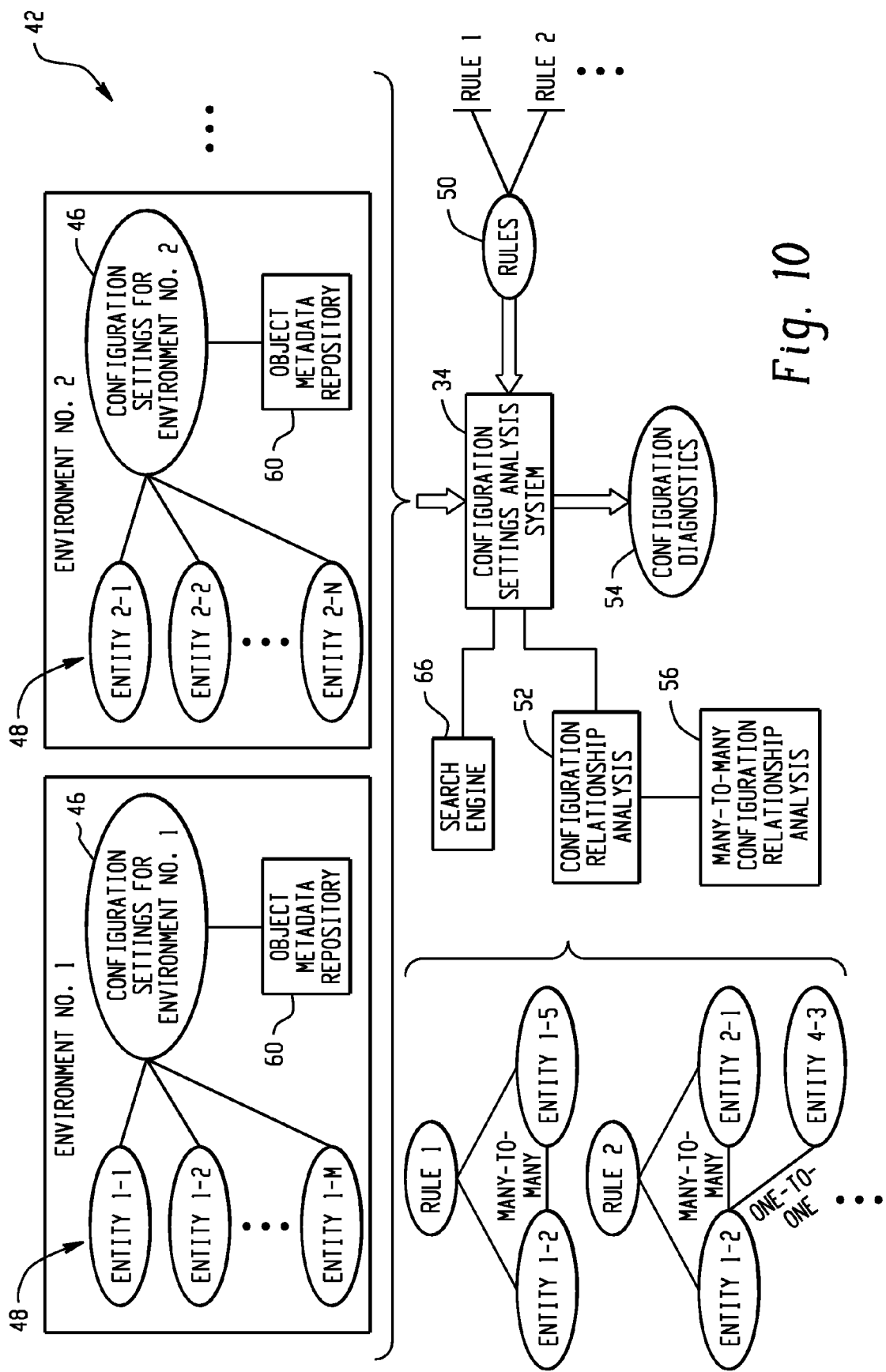
FIG. 10 is a block diagram depicting a configuration settings analysis system utilizing a search engine.

FIG. 10 illustrates the configuration settings analysis system 34 retrieving data required for analysis through use of a search engine 66. The search engine 66 may be an adaptive search engine which is capable of registering and releasing access classes. Each access class is capable of accessing certain data, such as data from currently active objects in a remote environment, from a local data repository of program configuration settings, or many other sources. The ability to register and unregister these access classes enables the configuration settings analysis system 34 to dynamically expand or contract its searching operations to more efficiently access the data required for its analysis.

Figure 11:
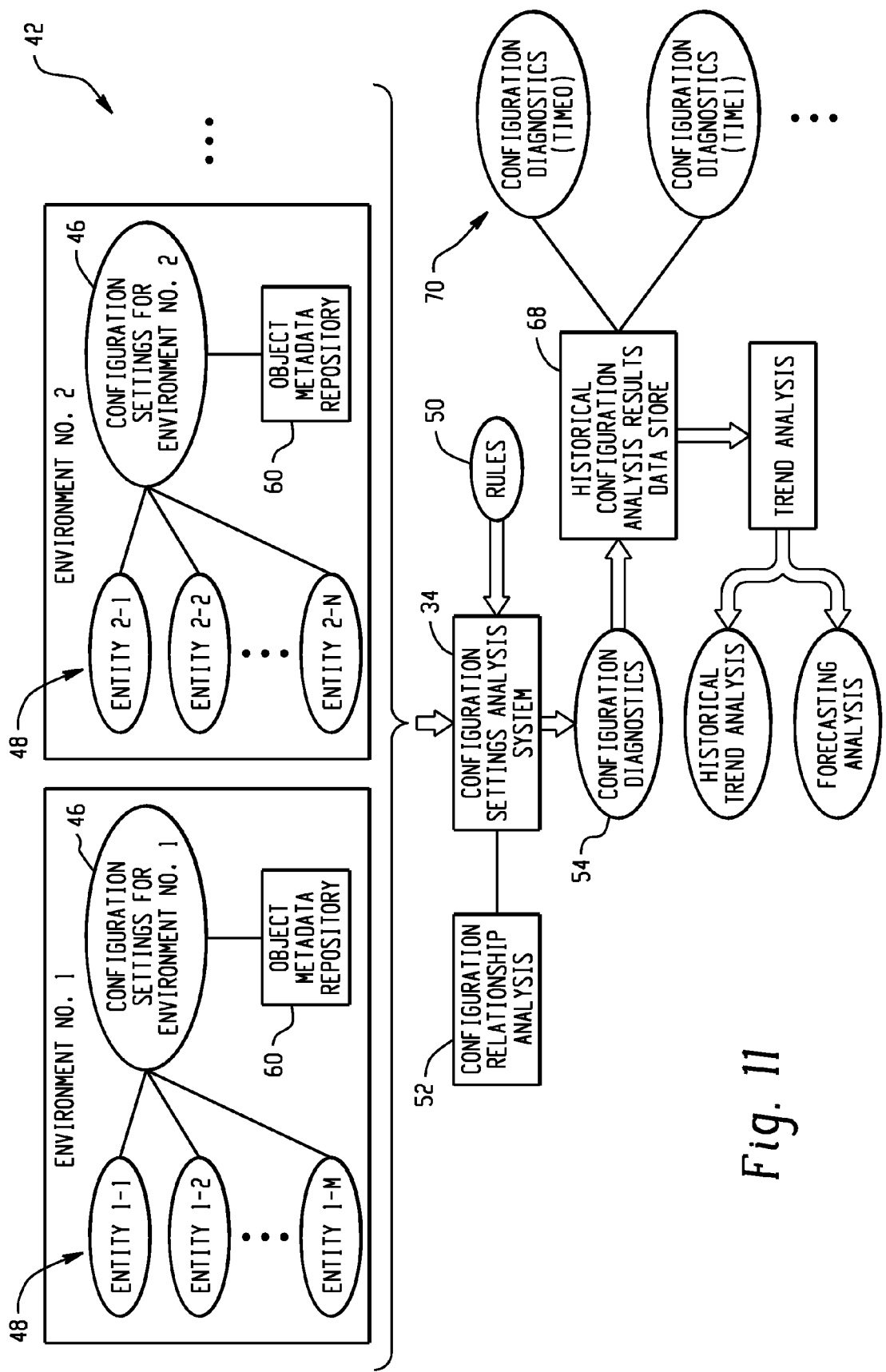
FIG. 11 is a block diagram depicting use of historical configuration data to aid analysis.

FIG. 11 illustrates that in addition to comparison of data captured during runtime, current configuration data may be compared to previously captured past execution results. This is accomplished by executing a run time configuration settings analysis as described previously to derive configuration diagnostics 54. These diagnostics can then be compared to historical data that is archived in a configuration analysis results data store 68. As shown in FIG. 11, comparisons can be made to one set of captured configuration diagnostics 70 or to a plurality of such configuration diagnostics 70. This allows a comparison of previous configuration captures which were taken during a period of successful operation and comparing those configuration settings to current configuration settings (which may be experiencing configuration problems because of a recent upgrade). The ability to make comparison to past data captures may also be useful in identifying trends and making forecasts of future system performance.

Figure 12:
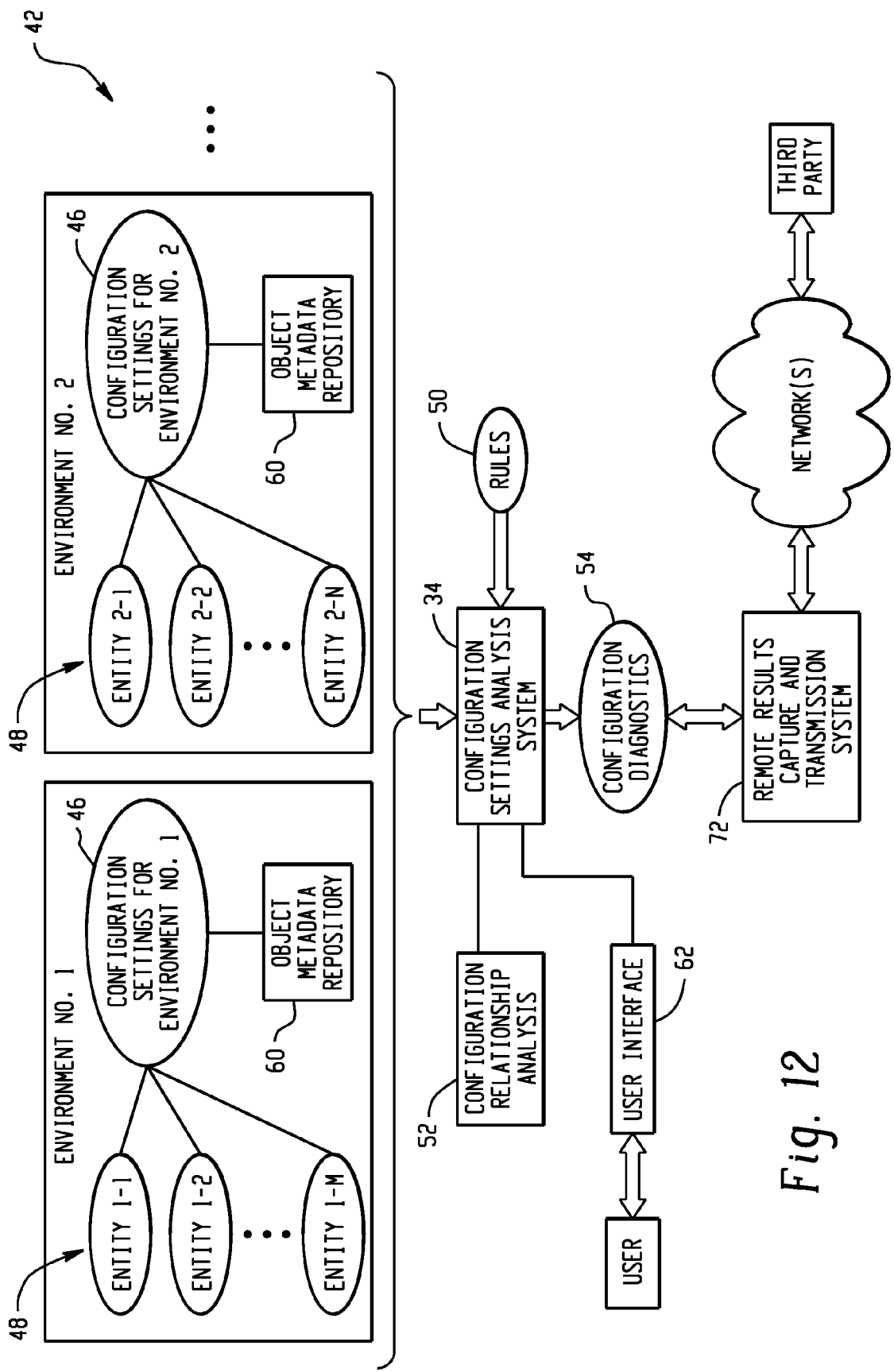
FIG. 12 is a block diagram depicting remote capture and analysis capabilities.

FIG. 12 illustrates that a remote results capture and transmission system 72 for allowing data to be captured and then sent for remote analysis. The configuration analysis results that are seen at the remote location would be identical to what would be seen if the analysis were completed at the data source site.

Figure 13:
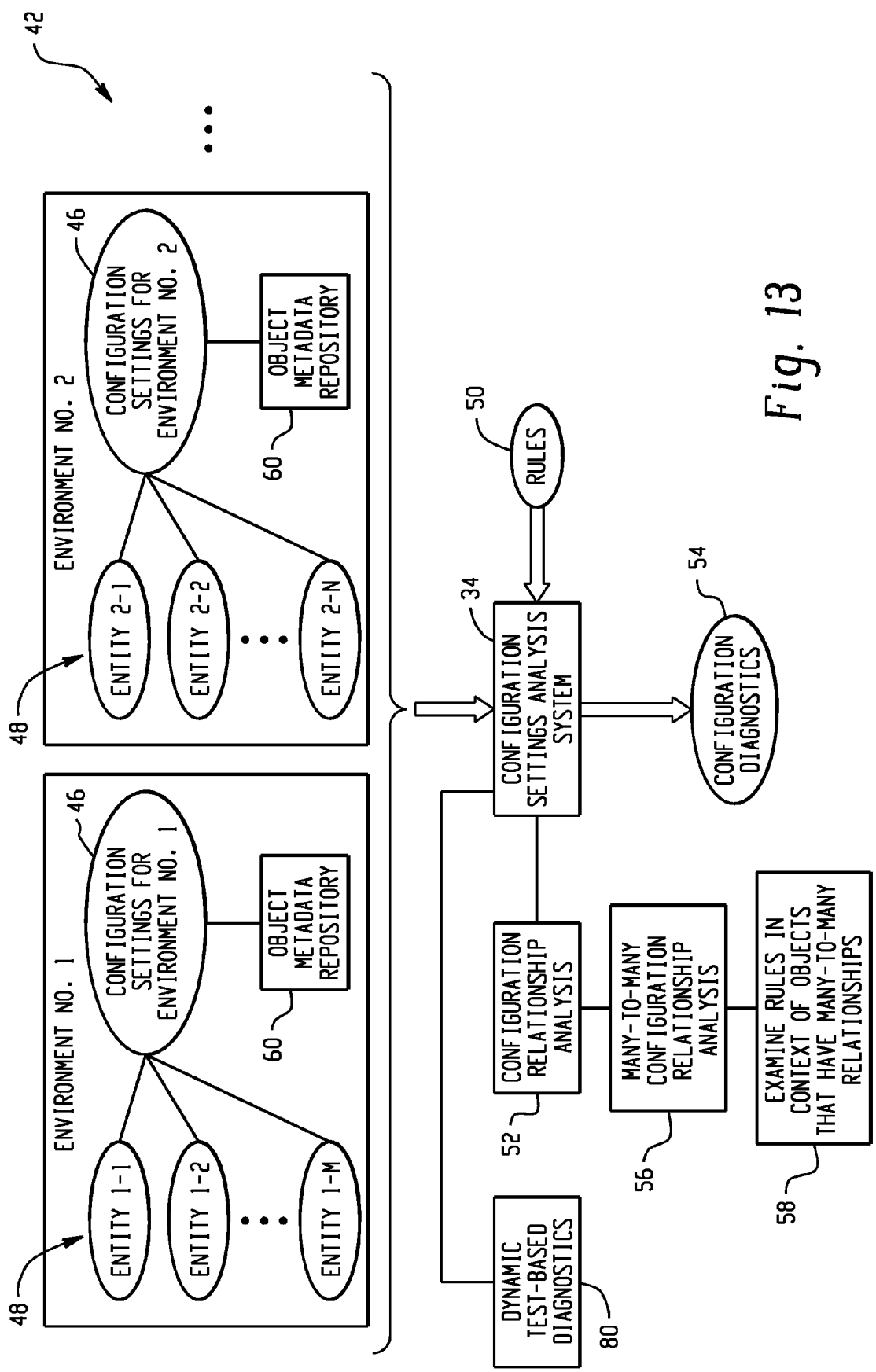
FIG. 13 is a block diagram depicting dynamic test diagnostic capabilities.

FIG. 13 illustrates that the configuration settings analysis system 34 can also be configured to execute dynamic test-based diagnostics of live systems as shown at 80. For example, the configuration settings analysis system 34 is capable of changing the tests performed and the criteria for tests performed at any time such as while the applications to be tested are running. These changes could be requested by the administrator or by updates from an external facility. This allows the configuration settings analysis system 34 to be customized by an administrator to meet their specific system requirements rather than being limited to a generic set of tests and test groups.

Figure 14:
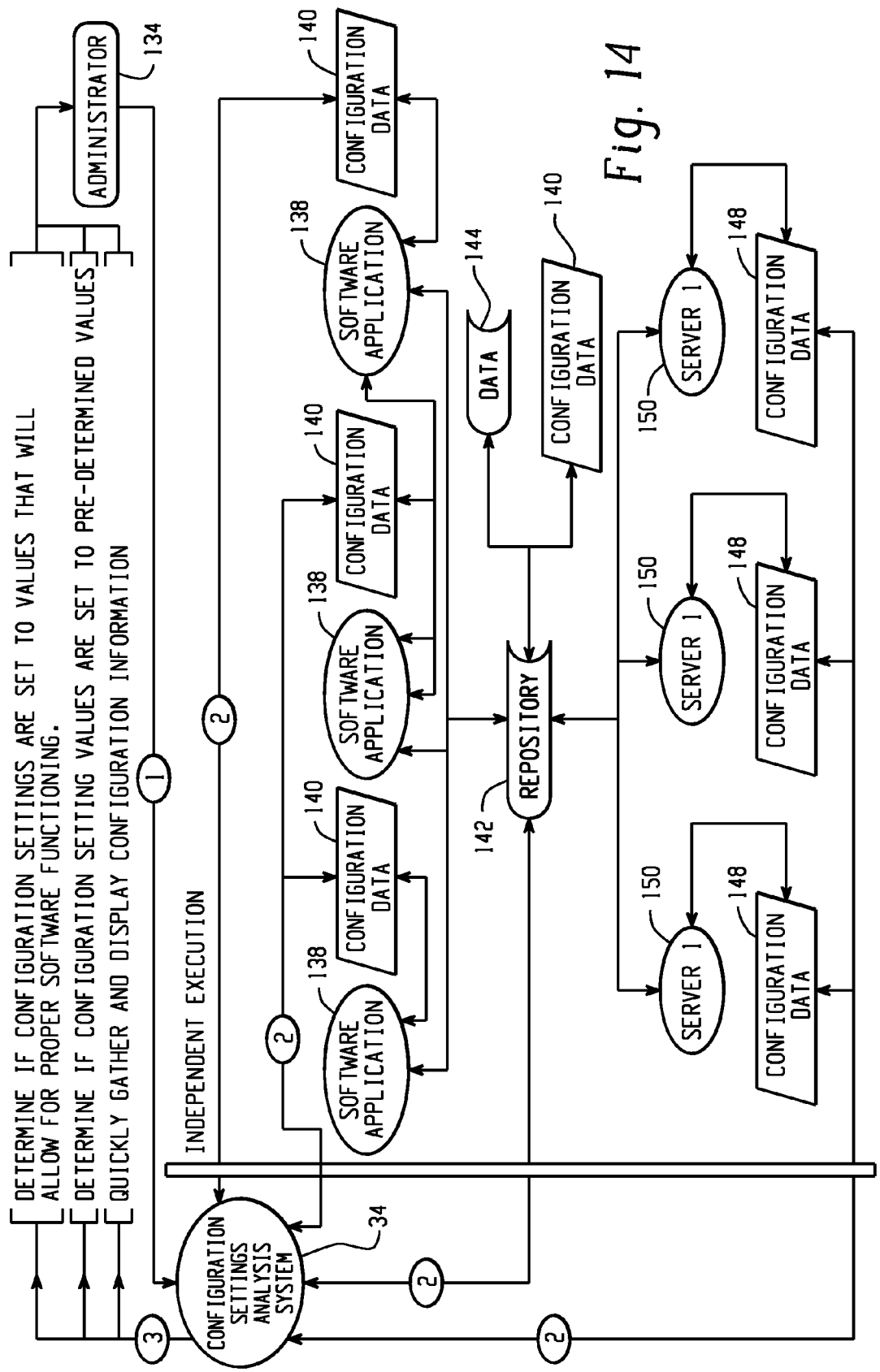
FIG. 14. depicts a functional entity relationship diagram.

FIG. 14 depicts a process flow for examining, testing, and comparing configuration settings and data (hereafter referred to collectively as 'data' unless the context provides otherwise) across multiple independent software applications. A user (e.g., an administrator) 134 selects from a list of pre-defined test groups. The administrator is a skilled person that can install, configure, and administer complex software systems comprised of independent software applications but is not required to have any detailed knowledge of the code under test. The administrator selects a test group to be executed at step 1. A test within a test group could be a comparison between two configuration settings, or between a configuration setting and an expected value. A configuration settings analysis system communicates with software applications specified by each test and retrieves the data required to evaluate the test at step 2. The configuration settings analysis system evaluates each test according to the items and actions specified within that test. Results from the test are moved to a graphical user interface where the results are displayed to the administrator at step 3.

The configuration settings analysis system is capable of analyzing disparate software application environments, thereby allowing for a significant decrease in time required to gather configuration data across applications. This analysis of environments also allows the administrator to have data values automatically compared across software applications. Any test which does not meet the conditions specified by the test is automatically flagged as a potential problem. The system can insulate the administrator from the visual noise of data not considered important to the test question being asked, thereby allowing the user to focus on the settings considered salient to the test at hand. This provides a mechanism which focuses the administrator's attention to anomalous configuration data values within complex integrated systems, extracts and displays all information related to the anomalies (across products), provides a process to gather additional information to aid in identifying the cause of any anomalies (as opposed to simply identifying a system symptom), and provides suggestions on how to correct any anomalies.

Figure 15:
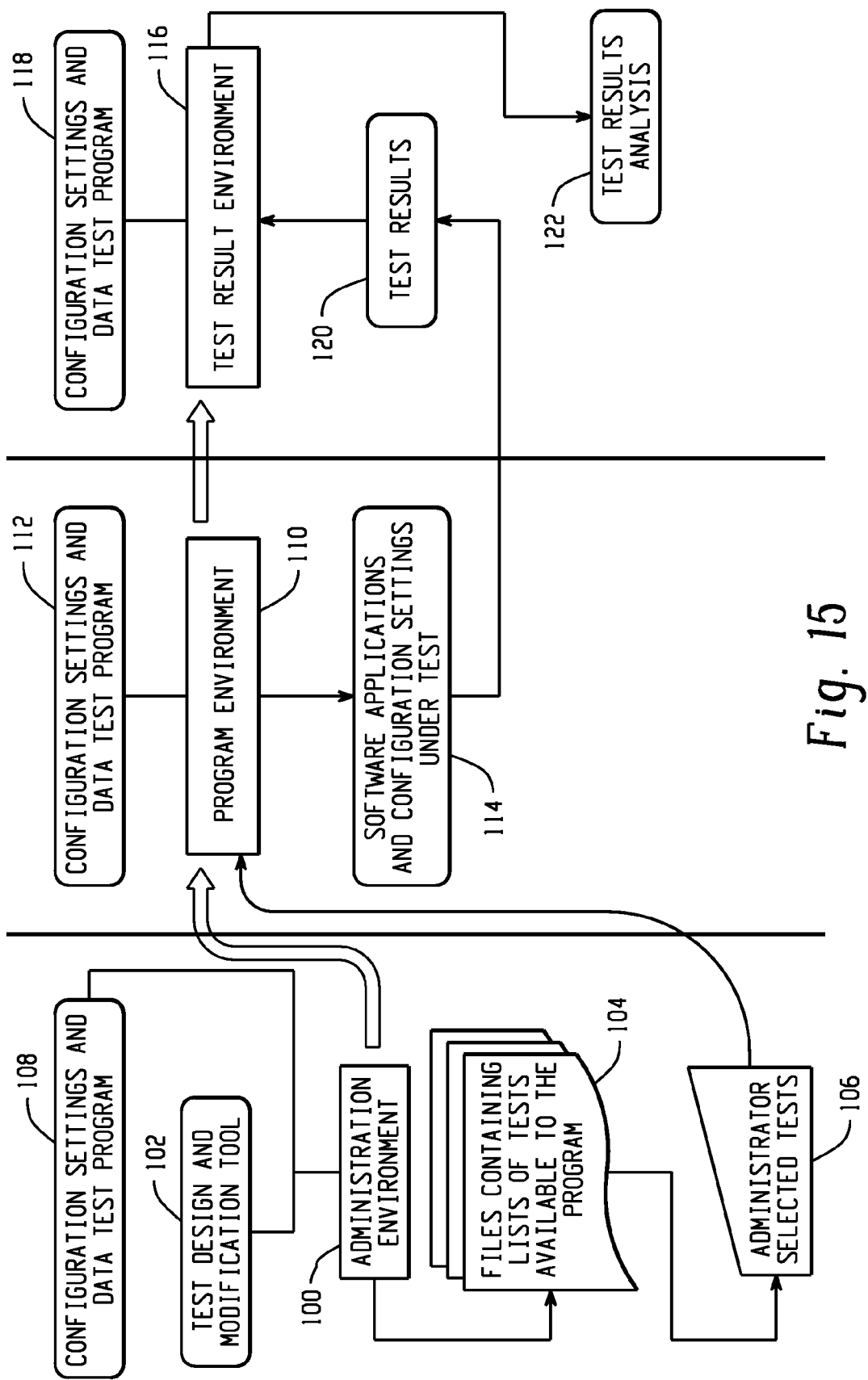
FIG. 15 depicts an overview of one embodiment of the method of the present disclosure.

FIG. 15 depicts another operational scenario for analyzing configuration data. Within administration environment 100, the test design and modification tool 102 allows an administrator to design and modify a list of high level actions that are used to control the execution of the disclosed methods within the program environment 110 of the configuration settings analysis system. Through the use of the tool 102, an administrator maintains a list of all tests and groups of tests that are available within the program environment 104. Each test is comprised of two data values to be retrieved, a relationship indicator which describes how the data values should be related, and messages that discuss the results. The test design and modification tool 102 allows the administrator to create tests which are comprised of only data that the disclosed system is capable of retrieving, thus the administrator is not required to have any knowledge (or at least a detailed knowledge) of the code.

Within the program environment 110, the system reads a set of tests (called the test group), and uses the test group to drive the tasks to be performed. For each test specified, the program independently retrieves the values required by the test and produces a result. Each result represents one test and consists of both the data required by the test, as well as an indicator of whether the required data meets the test's expected relationship state.

Within the test result environment 116, the administrator reviews the test group results using the program's test results graphical user interface display, which displays each test along with an indicator of the results status. In addition to displaying the title and results of each test, the program can allow an administrator to examine the details of each individual test. This capability identifies for the administrator the name and data value of all data items retrieved as well as the type of relationship expected to exist between the data items, and providing the administrator with an interpretation of the results.

The environmental separation of the role played by the program environment 110 and the environments 100 and 116 results in a robust, reusable, easily maintainable, and cost effective configuration setting and data exploration system. This is because integrated software environments are comprised of independently operating software applications. The system requires that each software application has the ability to communicate with specific other software applications within the system. The configuration settings for each software application are unique to each particular software application, and correct operation of a software application may require the setting of hundreds of configuration settings. In order for a software application to communicate with another software application, configuration settings on both of the software applications are set to a value that is logically related.

In contrast to the example shown in the operational scenario of FIG. 15, previous approaches would have involved the administrator manually checking the values of the data, manually comparing the values, and manually analyzing whether the data values allow each software application to communicate with another application. However, as the operational scenario of FIG. 15 illustrates, the configuration settings analysis system can be configured as disclosed herein to automate the gathering of that data, automates the analysis of the data, and focuses the administrator's attention on settings that may be causing problems within the system.

It should be understood that terms such as "administrator" refer to the role or function of an administrator, including installation, deployment, maintenance, updating, etc. As an illustration, one or more individuals can be used to fulfill the role of an administrator for a particular system. Moreover, while the separated environments allow for the different roles to operate in an insulated fashion, the same person could fulfill two or more of the roles when utilizing the separated environments.

Figure 16:
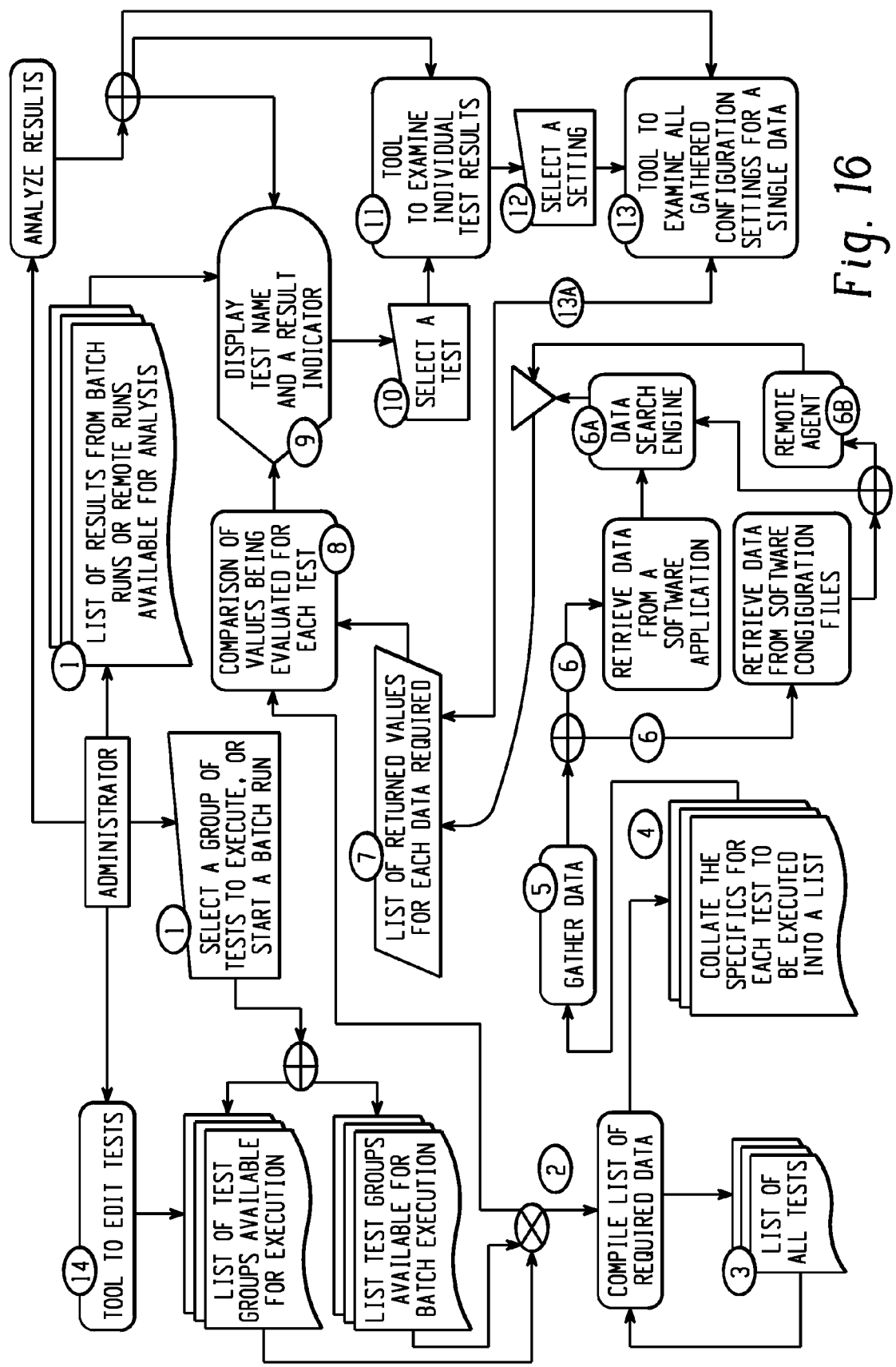
FIG. 16 depicts a flow chart according to one embodiment of the method of the present disclosure.
Figure 19A:
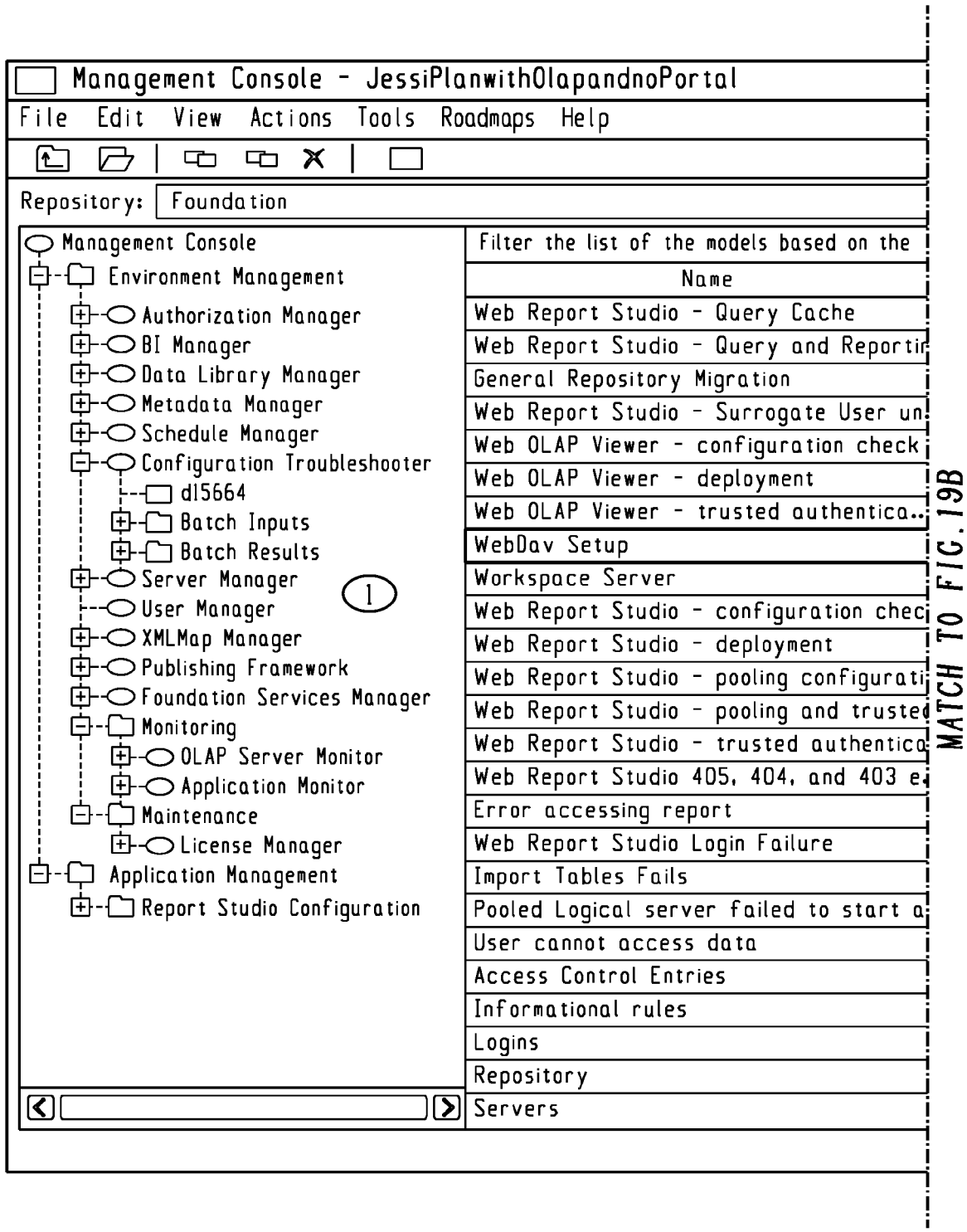
FIGS. 19A and 19B depict a user interface for performing configuration file analysis.
Figure 19B:
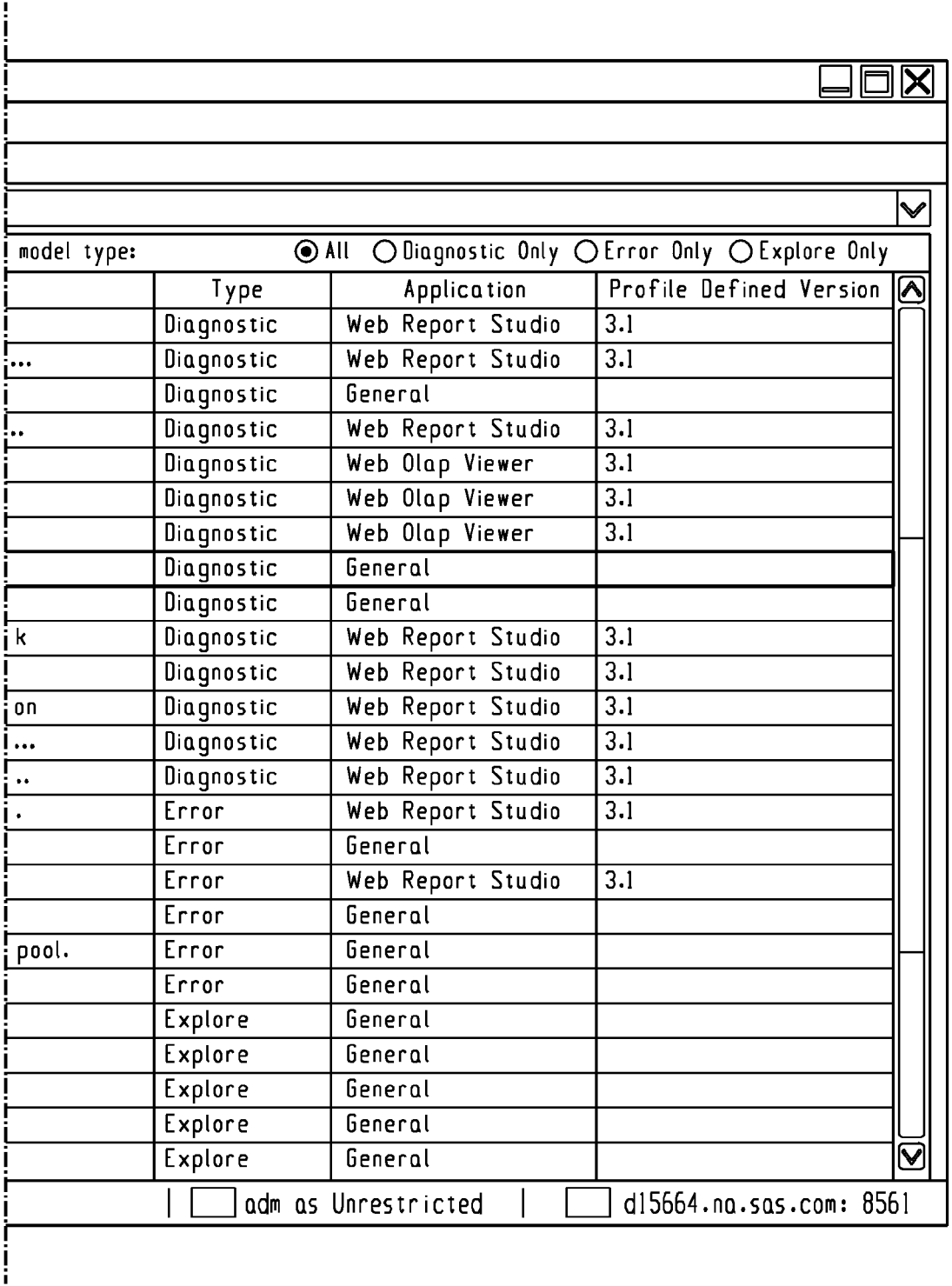

FIG. 16 illustrates another operational scenario which can include the following steps (whose numbers below correspond to the step numbers shown on FIG. 16):
1. The administrator selects a test group to execute, a batch group to execute, or a list of batch results to examine. If a test group or a batch group of tests is selected, then the list of tests in the chosen group(s) is (are) passed to the program.
2. The program compiles a list of all the data that is to be retrieved to execute all of the tests in the selected test group.
3. The list of data required to execute the selected test group is gathered by parsing an XML document which contains the specific details of all possible tests.
4. The collated list of test specifics is then used as a controller to gather the details for each piece of data that is required.
5. A controller passes the specifics of each piece of data to be retrieved into a retrieval mechanism. The controller does this for all of the required pieces of data.
6. Depending on the location and type of the data, data values are retrieved from one of two retrieval mechanisms;
    6A. A search engine which can retrieve data by talking to individual software applications, or reading their configuration files.
    6B. A remote agent which can read software application configurations on a remote machine.
The search engines retrieves all data values of the type specified, so if a configuration setting occurs in multiple places, it retrieves all of the available values.
7. All retrieved data values are compiled into a list.
8. The compiled list of data values is supplied to a comparator. The comparator retrieves a test from the list of tests to be evaluated, retrieves the data values that are required by the test and compares the data values against each other to see if they meet the specified relationship type.
9. The test results are displayed showing the list of tests executed with an indicator for each test indicating if the test 'passed', 'failed', 'more information available by examining the test individually', or 'no evaluation performed as this test is for informational purposes only'. The indicator is the decision of an evaluation of all the data values that were returned for a specific test and so is a general indicator of the test results.
10. An administrator may choose to examine an individual test in more detail.
11. If the administrator chooses to view more details about a specific test, all of the information on each data item is displayed in a separate list. Each data item in a list consists of the data source name, data name, data value, and an evaluation indicator. If the administrator selects a specific data item from one list, then all of the items in the other list are compared against the specific data value from the data item that the administrator selected. The comparison results are then displayed in the evaluation indicator location for all of the data items evaluated. A discussion of the evaluation results, what the evaluation is attempting to evaluate, and if an evaluation does not resolve as expected what are some measures that can be taken to fix it is also displayed.
12. An administrator may choose to examine an individual data item in more detail.
13. If an administrator chooses to examine an individual data item in more detail, the list of all data values is retrieved (as shown at 13A). From the list of all data values retrieved, the program compiles a list of the data names and data values that are specific to the selected data item. The program then displays the list of all of the data names, and the data values that have been retrieved.
14. The administrator has the ability to create, modify or delete existing tests from the list of available tests (See step 3). The administrator also has the ability to create, modify, or delete test groups.

FIGS. 17-22 provide another illustration contrasting previous approaches and several of the features disclosed herein. FIGS. 17 and 18 employ a traditional manual administration paradigm, where an administrator manually locates the needed configuration source, visually searches the configuration settings, retrieves the appropriate values, and manually compares the values between sources to ensure that the values are set appropriately. It is further noted in FIG. 17 that the repository host name is set to "D15664." In FIG. 18, the repository server name is set to "D15665." For this example, these two settings require the same data value in order for the two pieces of software to communicate properly with each other. This problem would produce unexpected results in a system, and the cause would be difficult to identify through the traditional manual administration paradigm.

In contrast, FIGS. 19-22 illustrate that the cause would automatically be detected by a system configured with at least several of the features disclosed herein. FIGS. 19A and 19B illustrate that an administrator has selected (as indicated by position "1" in the figure) a group of tests related to the software being configured or tested. Following the selection of the test group, the system automatically gathers the required data values for all tests in that test group. In this example, each test within a test group is comprised of two sets of data values. The sets of data values are then compared using the comparison type specified by each test. The results of testing each set of data values are then combined to give a general evaluation of the test.

Figure 20B:
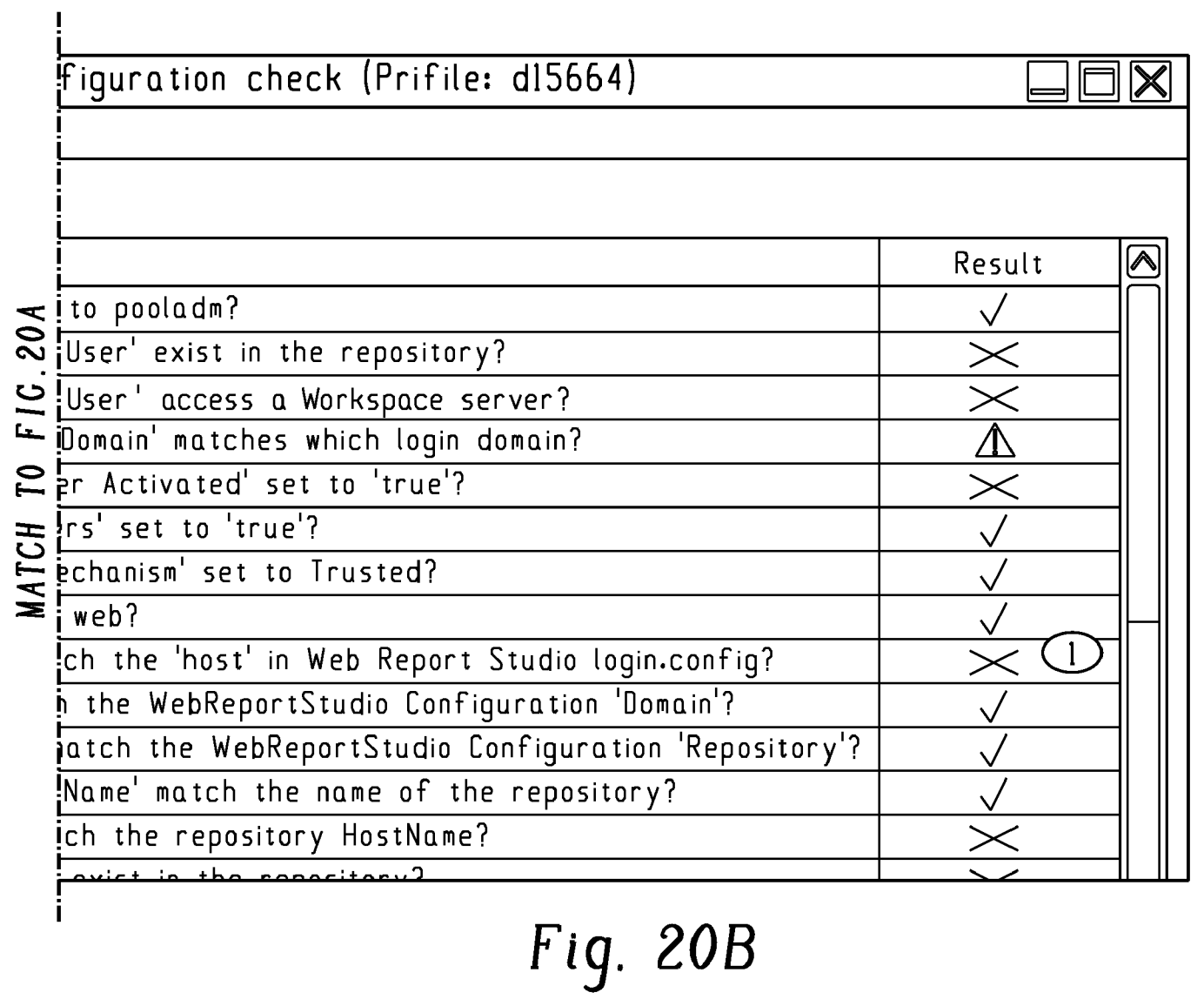

An example of this general evaluation is shown in the display screen of FIGS. 20A and 20B. With reference to FIGS. 20A and 20B, the evaluation results are presented with an evaluation indicator, wherein an 'X' symbol represents failure, a check symbol represents pass, and a triangle symbol represents 'more information'.

In FIGS. 20A and 20B, each test has a number next to it. For example, test number "9" retrieves the configuration data and executes a comparison of the configuration settings presented in FIGS. 17 and 18. As explained above, the values of the repository host in the configuration file presented in FIG. 17 and the value of the server tag in FIG. 18 have to match in order for the two pieces of software to communicate with each other properly. From the results of the execution shown in FIGS. 20A and 20B, test number "9" is automatically indicated as a test failure by presenting an 'X' (at position 1) instead of a check. This visually signals the administrator that the settings do not meet the test requirements and may be anomalous. Further information is available by selecting the specific test wished to be examined.

Figure 21B:
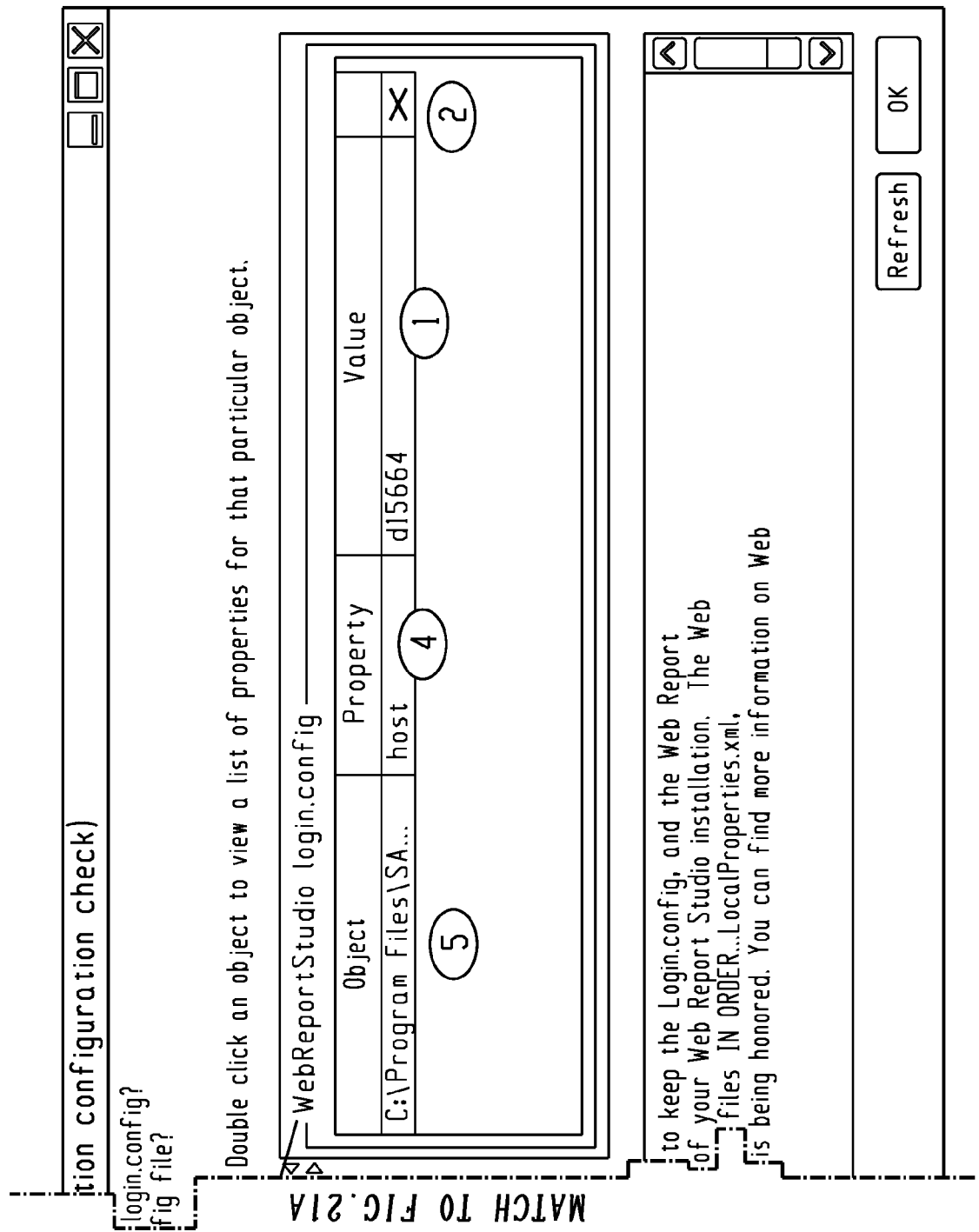

FIGS. 21A and 21B depict when examining the test in further detail, that the administrator is now presented with both of the values that were retrieved (position 1), and an indicator that shows the results of the comparison (position 2), the name of the data (position 3), the name of the property (position 4), the location from which the property was retrieved (position 5), and a discussion of the results of the test (position 6).

Figure 22:
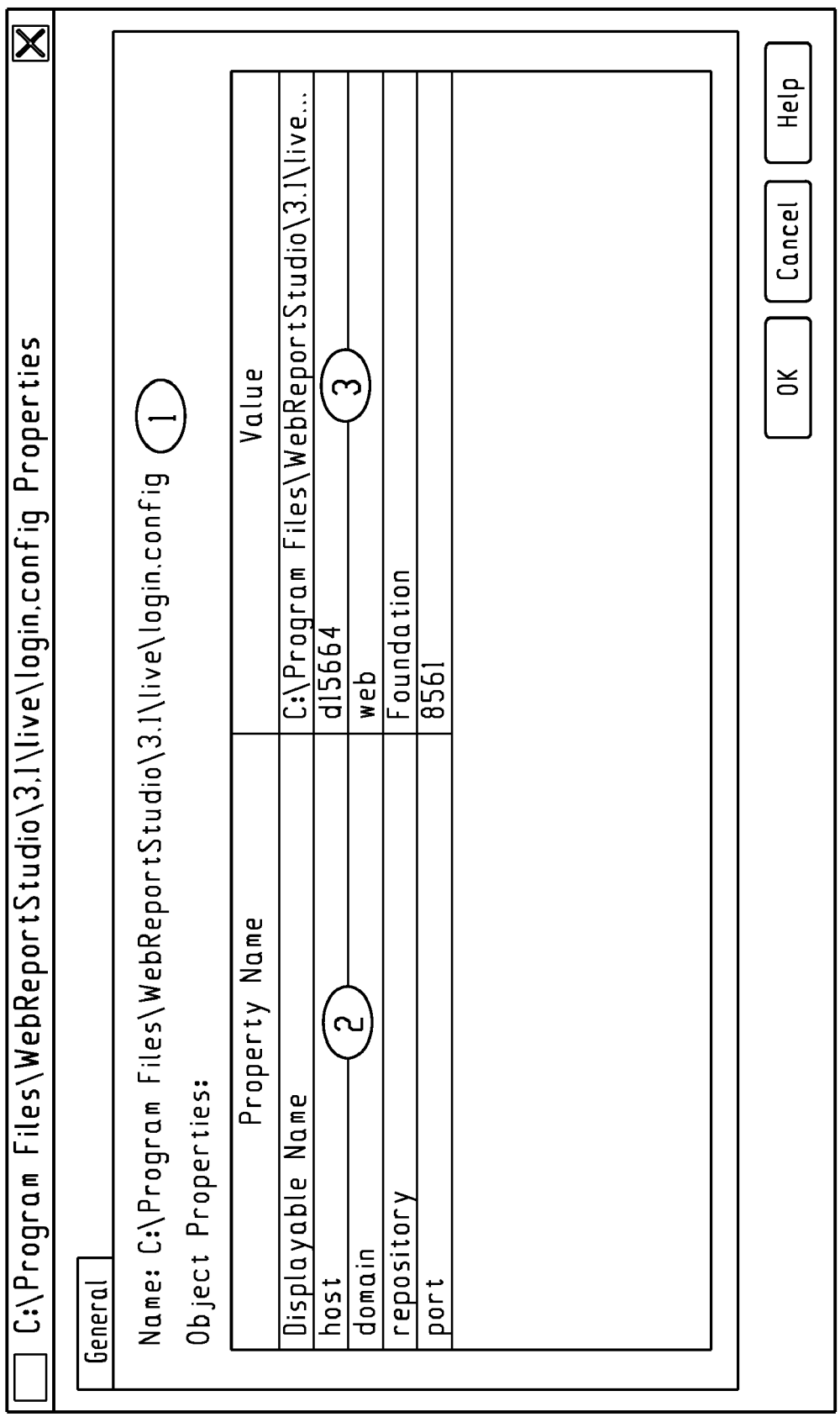
FIG. 22 depicts a configuration check data value listing screen.

FIG. 22 depicts further details of individual data values made available through selection in FIGS. 21A and 21B. In this example, the administrator can see the name of the data item is Login.config at position 1. The names of the data that has been retrieved is at position 2, and the values of the data is located at position 3. As can be readily seen by this example, an administrator does not have to be burdened to manually execute many tests in order to fully exercise a question that they are attempting to answer.

Figure 23B:
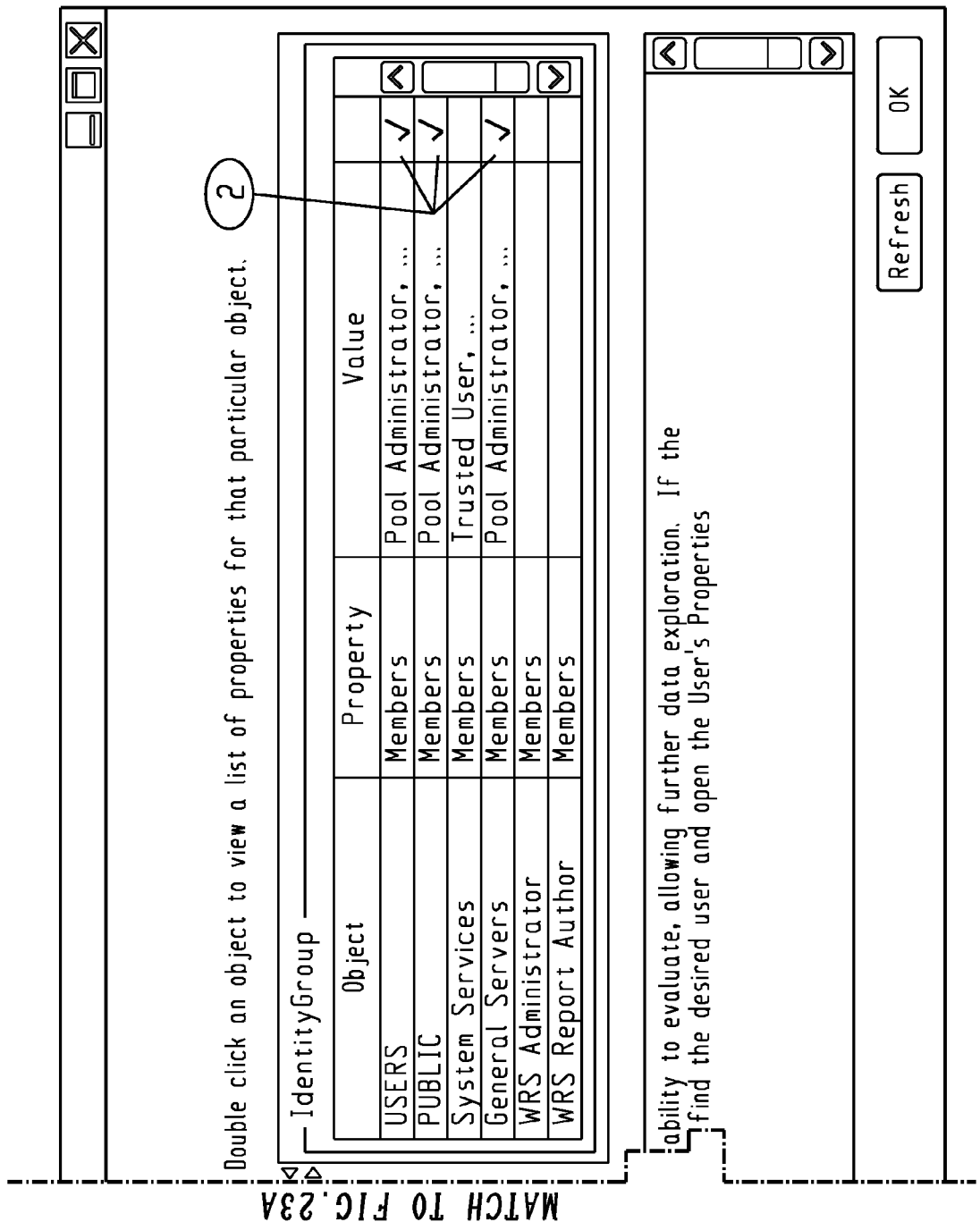

FIGS. 23A and 23B illustrate an exemplary embodiment of a display for analyzing entities having many-to-many relationships. All data that has been retrieved for a specific test is displayed simultaneously in two lists. The administrator can select a specific value from the data settings in either list, and all of the data values in the other list are evaluated against the selected data. Evaluation indicators are displayed for matching values (position 2). This feature allows for visual presentation and evaluation of data that occurs not only in many-to-many types of relationships, but also for other types of relationships, such as one-to-one, one-to-many, etc. This allows rapid examination of data that occurs in multiple isolated locations, and provides an efficient system for displaying and evaluating data that occurs in complex relationships.

Figure 24B:
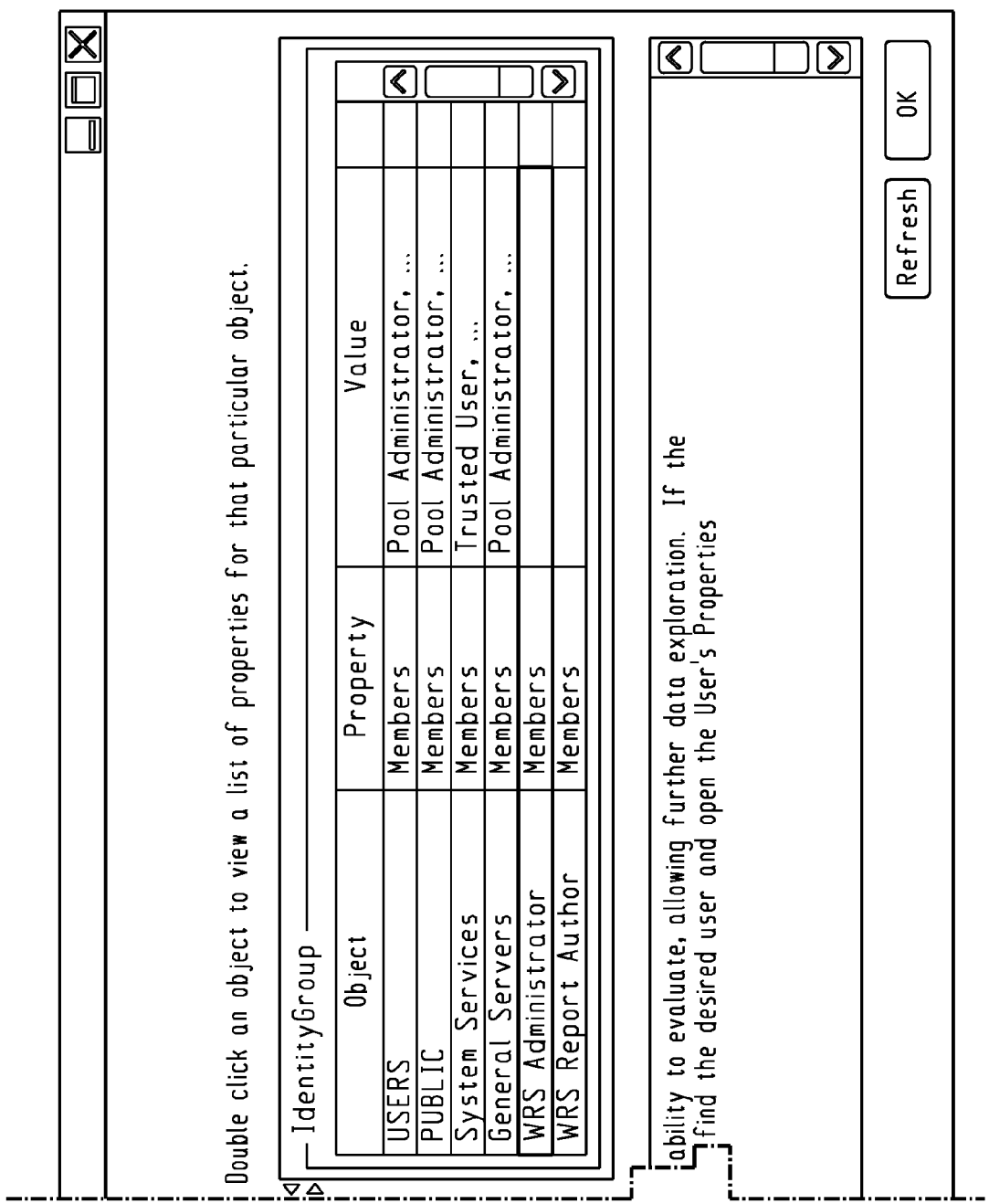

FIGS. 24A and 24B illustrate that if a data item is selected from either list (which in this case is the second list), and no data items from the first list evaluate successfully, then evaluation indicators showing failure are displayed. This allows the administrator to quickly evaluate and explore a very large number of data items, their values, and their relationships to other data items.

FIGS. 25A and 25B illustrate allowing the administrator to select a test to edit or create a new test. Regions 1 and 2 in the figure allow filtering of the displayed tests by object and property type respectively. Columns permit viewing and sorting of ID numbers, test names, and test descriptions respectively. The 'Open' and 'New' buttons in Region 6 allows for opening of an existing test or creation of a new Test.

Upon opening of an existing test or creation of a new test, a test customization display is presented to the administrator. This display allows entry of a name and description for the rule (in regions 2 and 3 respectively). It also permits specification of which objects are being evaluated in the test being edited or created (region 4) and specification of the properties for each object being evaluated in the test. The display can be configured such that only properties available for the selected object are displayed. Region 6 allows specification of the relationship type for the test being edited or created, and region 7 specifies how the evaluation results should be displayed for the test being created. Regions 8 and 9 allow the administrator to specify messages that should be displayed when the test passes or fails.

A test design and modification display can also be provided for allowing the administrator to create test groups. For example, the administrator could group tests according to the software applications upon which they wish to perform tests. The administrator could also group tests to explore specific system behaviors, anomalies, or logged messages. The administrator could also group tests so that the information is distributed across a number of different location is brought together for ease of exploration.

Figure 26:
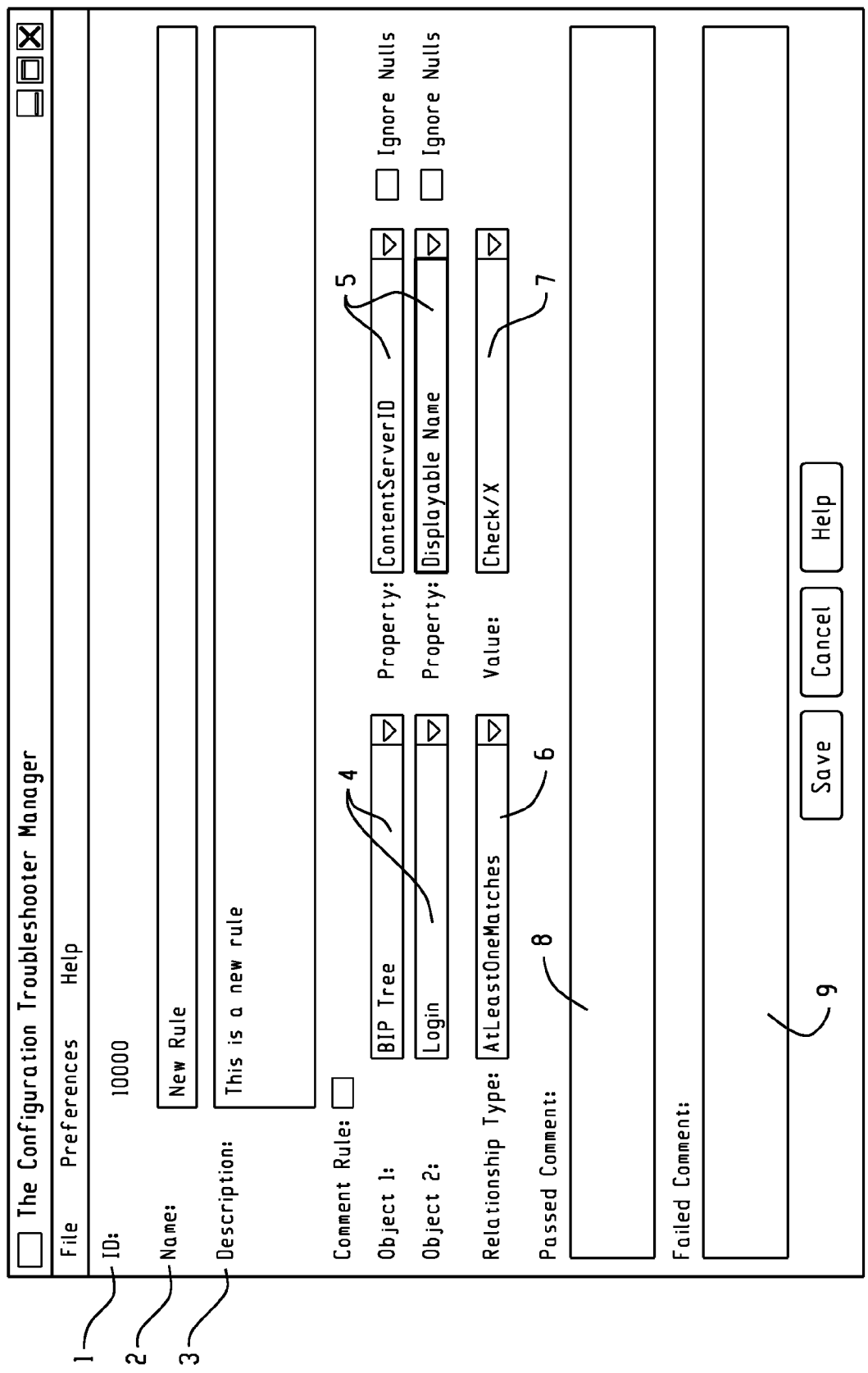
FIG. 26 depicts a test customization display.

FIG. 26 depicts a test customization display which gives an administrator the capability of editing existing tests, or creating new tests. This provides the administrator with the capability of customizing tests to suit their own particular system requirements. The following provides a description of the various regions on the display:

Region 1: ID number of the test being edited or created.
Region 2: Name of the test being edited or created.
Region 3: Description of the test being edited or created.
Region 4: Specification of which objects are being evaluated in the test being edited or created.
Region 5: Specification of which properties for each object are being evaluated in the test being edited or created. Only the properties available for the selected Objects are available.
Region 6: Specification of the relationship type for the test being edited or created.
Region 7: Specification of how the evaluation results should be displayed for the test being edited or created.
Region 8: Specification of a message to be displayed to the user in if the evaluation of the test being edited or created should pass.

Region 9: Specification of a message to be displayed to the user if the evaluation of the test being edited or created should fail.

FIG. 27 illustrates a test design and modification display which permits creation of new groups or editing of existing groups identified by group name and description. Upon creation of a new group or selection of a group for editing, a display would be presented to allow administrators to specify which tests are included in a test group. As shown in FIGS. 28A and 28B, the display can include a listing of all available tests on the left side (region 1), the tests assigned to the current test group on the right side (region 3), and controls for including or removing tests (region 2).

Figure 29:
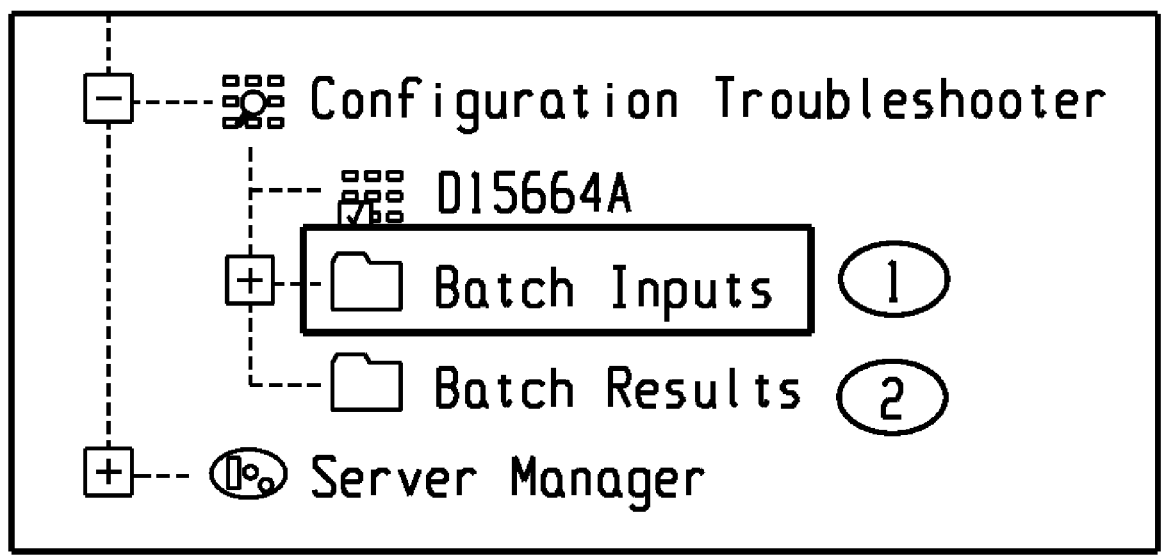
FIG. 29 depicts a batch mode display.

Tests and test groups can be run in a batch mode. As shown in FIG. 29, a batch mode program could have two subfolders that provide batch run capabilities. Folder 1 allows an administrator to select a list of all of the test groups that they want to run. The second folder allows an administrator to view the results of batch executions. It also allows an administrator to read results files that are received from a remote location. When the administrator views these results files, the program behaves exactly as if the results are live. The interface that is used to present the batch results can be the same as the interface for display of live results. Each interface behaves the same and has the same capabilities. This gives the administrator the ability to check configurations, explore data, and do analysis on the systems from which they are physically isolated. It also provides the administrator with the ability to examine historical data configuration checks. FIG. 30 shows an exemplary interface for selecting tests and test groups for inclusion in the batch inputs folder.

The batch capabilities also allow for longitudinal comparison of configurations and/or comparisons to be made between different computer/software systems. For example, if a computer/software system has begun having anomalous behaviors, the current configuration test results gathered via the batch mechanism can be compared to configuration test results that are known to have worked before an upgrade or at a specific time in the past. This provides the administrator with the ability to quickly identify changes that have taken place in the software configuration between the system operating in a normal state and in an anomalous state.

Figure 31:
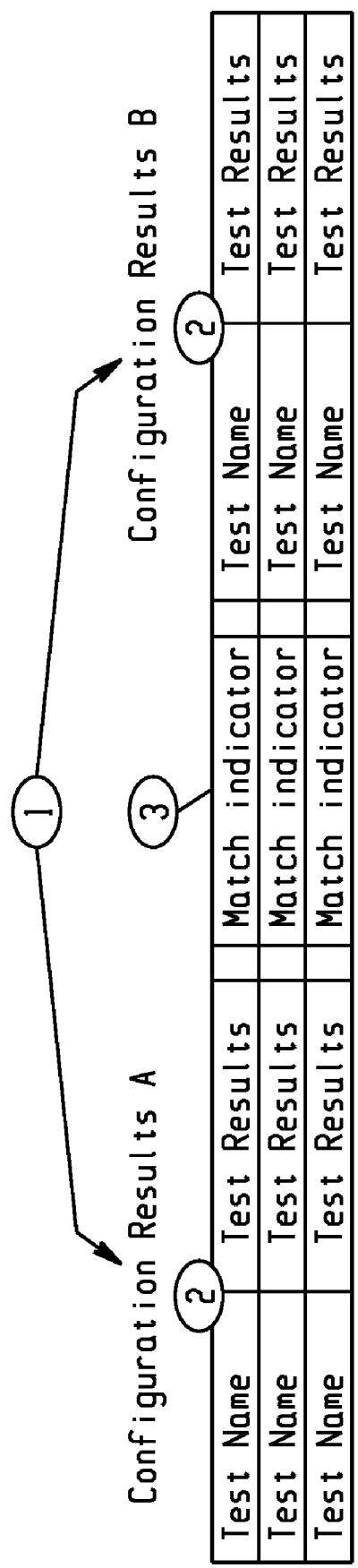
FIG. 31 depicts a test results comparison display.

This capability is illustrated in the display of FIG. 31, wherein two sets of configuration results are compared. As shown at position 1, the result comparison display uses two configuration analysis results generated by the program. These results can be generated on different systems, at different times, or from different locations. As shown at position 2, each test and its accompanying results in this example are compared between the two configuration analysis results. A match indicator is displayed according to the results of this comparison. As shown at position 3, the match indicator is a Boolean indicator displaying whether the test results were the same or different between the configuration results.

Figure 32:
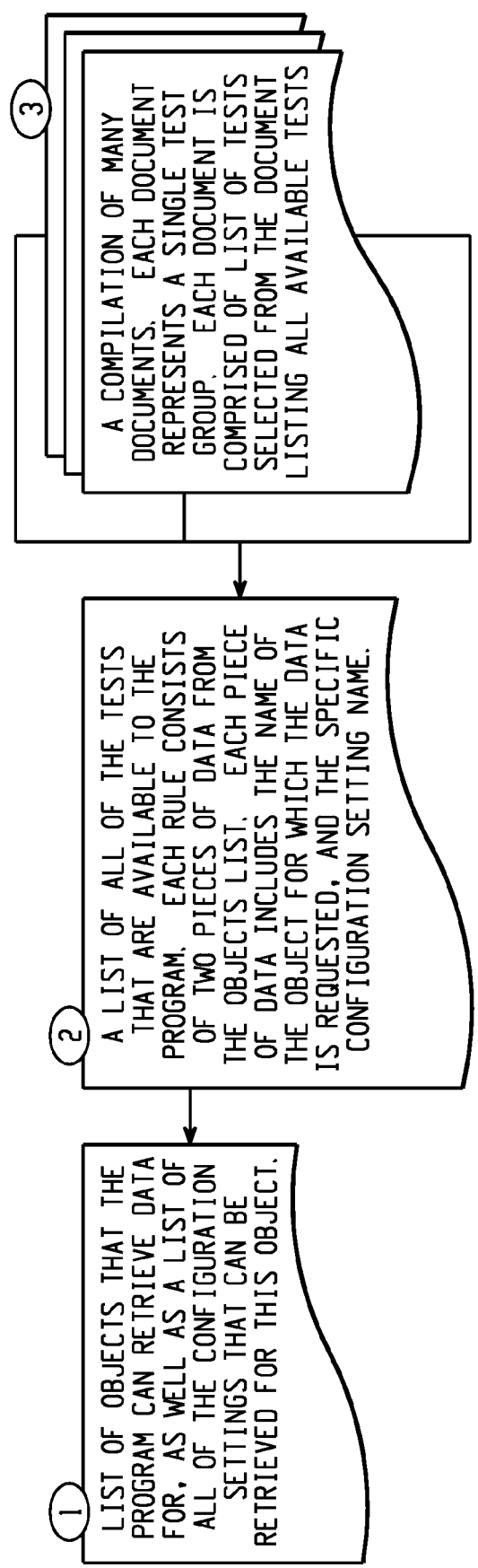
FIG. 32 depicts types of task data.

FIG. 32 illustrates that a configuration settings analysis system can be configured to use multiple different types of data, such as the following three types of data:
1. Configuration data sources (known as objects) and the properties that can be retrieved from each source: This document contains a listing of the individual data sources that are available to the program, as well as all of the properties that the program can retrieve for each source.
2. Tests: The 'tests list' is an XML listing of all individual tests available to the program. Each test is very specific. A test specifies the two pieces of data that are to be retrieved, as well as what type of relationship that data should have with each other. Only data sources and properties specified in the objects list (item 1) can be included in this document.
3. Tests are bound together in groups. A group is simply a listing of tests selected from the test list (item 2) that can answer the specific question the administrator is attempting to answer.

Collectively the three pieces of information are known as "Task Data." Task data can be stored in a number of forms including in flat files, XML format, within databases, etc.

With respect to the configuration data source contained in the task data, the configuration data sources can use objects to store configuration information. FIG. 33 depicts an example of a programmed object data type. This example contains an XML listing for an object named "ObjectSpawner". The object contains the properties 'application', 'description', 'name', 'type', and 'value'. The property tag contains information for retrieval by the configuration settings analysis system. Such properties contained within the property tags include: 'Name', 'Port', 'Displayable Name', 'Servers started by object spawner', 'is object spawner running', and 'what machine hosts the object spawner'.

FIG. 34 depicts an XML example of a single test. In the XML, the test is referred to as a rule. Rules are written based on properties of objects and relationships that exist between them. In FIG. 34, each test is composed of two referencing objects listed in the object data type list. Each object reference include the object name and the configuration setting name (property name) that is needed for the object. Two comment fields are included: a Passed Comment which discusses the results if the test evaluates successfully, and a Failed Comment which discusses the results if the test evaluates unsuccessfully. It should be understood that other types of comments can be used as well.

FIG. 35 is an XML example of a test group. Each group has identifying information associated with it listed at the top and includes a list of tests (specified by the "<Inc_Rule ID=*/>" tag) that are included in the test group.

A filter can also be made available test groups. Using this filter and after an administrator has selected a test profile (e.g., a test model), the system reads and parses all test data and holds it in memory (or some other storage device). The system examines the data for each test group to determine if the test group meets the testing environment requirements set in the profile. This can be accomplished by examining the application, type, and version properties of each test group and comparing the test group's property values to the values specified in the profile. If a test group meets the requirements set in a profile, the test group is included in a display of the test groups available for execution (e.g., as discussed above with respect to FIGS. 19A and 19B).

When an administrator selects a test profile or test model for execution, the data for each test in the selected model is read and a list is compiled which identifies all of the required objects and the properties required from each object. This is done to prevent duplication of execution because an object and its data may be used by more than one test in a test group. For each object in the list, the system attempts to retrieve the required data values for the specified settings. For each object that requires the system to communicate with a software application, repository, or host environment, the model asks the controller to retrieve the required objects. It accomplishes this by using either the type of object required or both the type of object and the name or specifying object ID of the specific object required. If the information is the type of object required, the system would retrieve pointers to all objects of the specified type. If the information is both the type of object and the ID of the object then the system retrieves pointers only to the objects of the specified type, which match the name or ID.

Once the system has collected all objects required by the tests, the property values are retrieved. The system iterates through the list of objects sequentially, passing a pointer to each object, the name of the object's class, the object's value, the name of the property to be retrieved, the type of the property, and the potential value of the property to a search engine. This is accomplished by calling the fetchSingleObjectProperty (String classname, Object obj, String obj_value, String prop, String type, String value) method. Not all of the values passed in are required to retrieve each property value. The system receives the values returned by the search engine and passes them to their individual tests for storage.

For each object that is a configuration file, the system locates and reads the specified configuration if it is available locally. If the required configuration file is not available locally, the system locates and reads the configuration file by using a remote agent that is installed on a web application server. The system receives the values returned by the search engine and passes them to their individual tests for storage.

Figure 36:
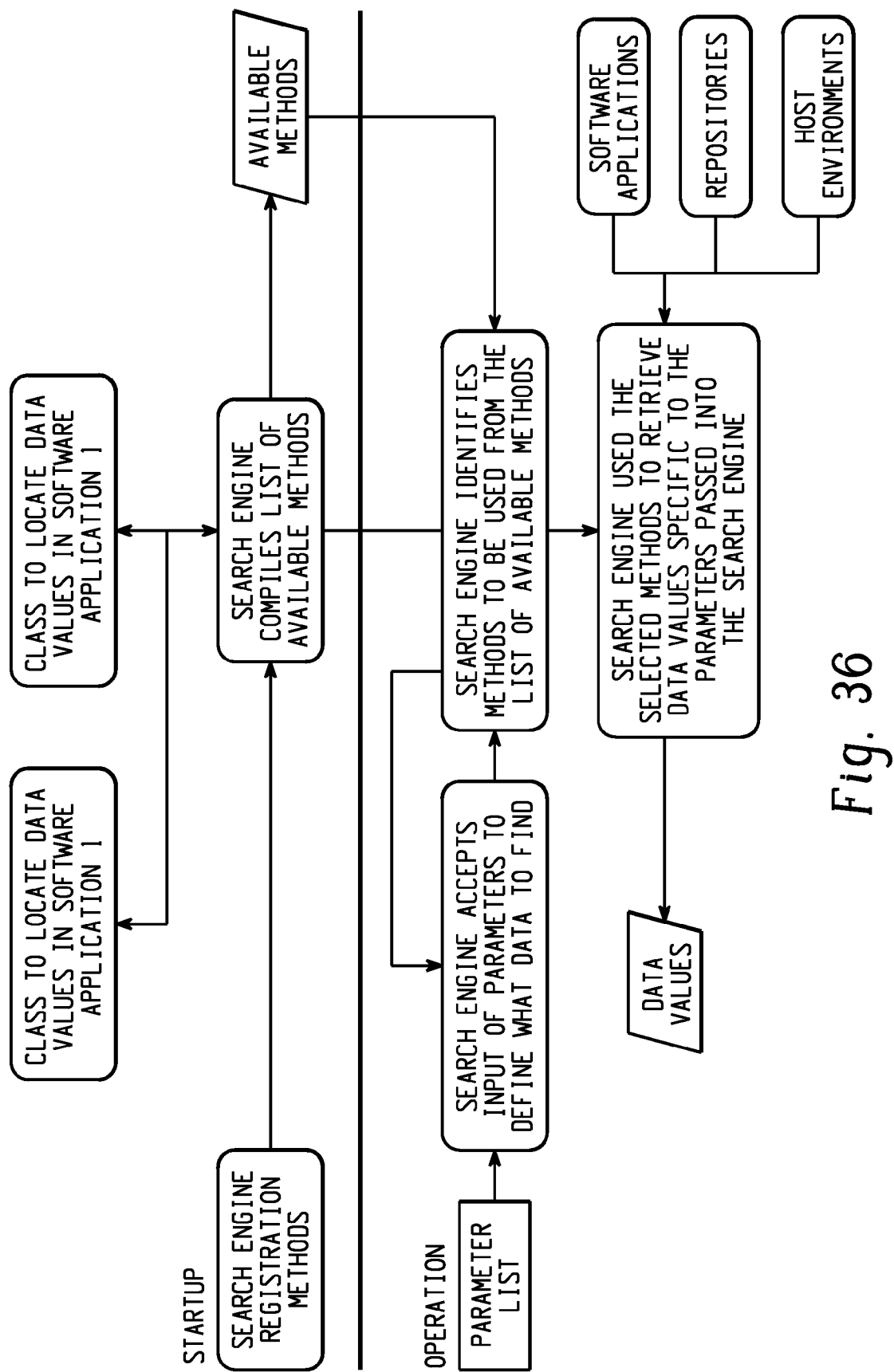
FIGS. 36 and 37 depict task processing using a search engine and a remote file search agent, respectively.

To facilitate the task of searching for the proper objects, a search engine as depicted in FIG. 36 can be used by a configuration settings analysis system. The search engine, which is designed to search for either specific data types or data from specific software applications to be dynamically registered and unregistered with the search engine. This allows the search engine to add capabilities in retrieving new types of data without having to change the search engine code. This also allows the search engine to select the code it will execute so that the executed code is specific to the types of searches to be performed. This reduces system overhead and reduces the amount of time required to execute a search. Thus, the search engine has the capability to change according to the tasks it needs to perform.

When a new searching class is registered with the search engine, the class could be held in a hash table or map with the class as the key (e.g., through call such as the following: registered Searchers.put(Class,code)). The search engine then creates a map that contains pointers to all of the search methods within all of the registered search code that can be used to retrieve data. By holding these methods in a map, the system has very fast access to those methods, thereby reducing the time required to execute any method since the registered searching class does not have to locate the method for use. The methods that are stored in the method map are not limited by operating system, tier, machine architecture, or product. Each method may include the ability to access data values crossing any of these boundaries. Using the parameters passed into the search engine, the search engine attempts to identify which methods are most likely to successfully retrieve the required data values. The search engine then executes the identified methods. If the chosen methods do not successfully retrieve the needed data values, the search engine identifies all methods that can be successfully run using the fetchSingeObjectProperty method parameters, and begins a systematic search of these methods to retrieve the required data values. Once retrieved, the search engine passes the data values back.

Figure 37:
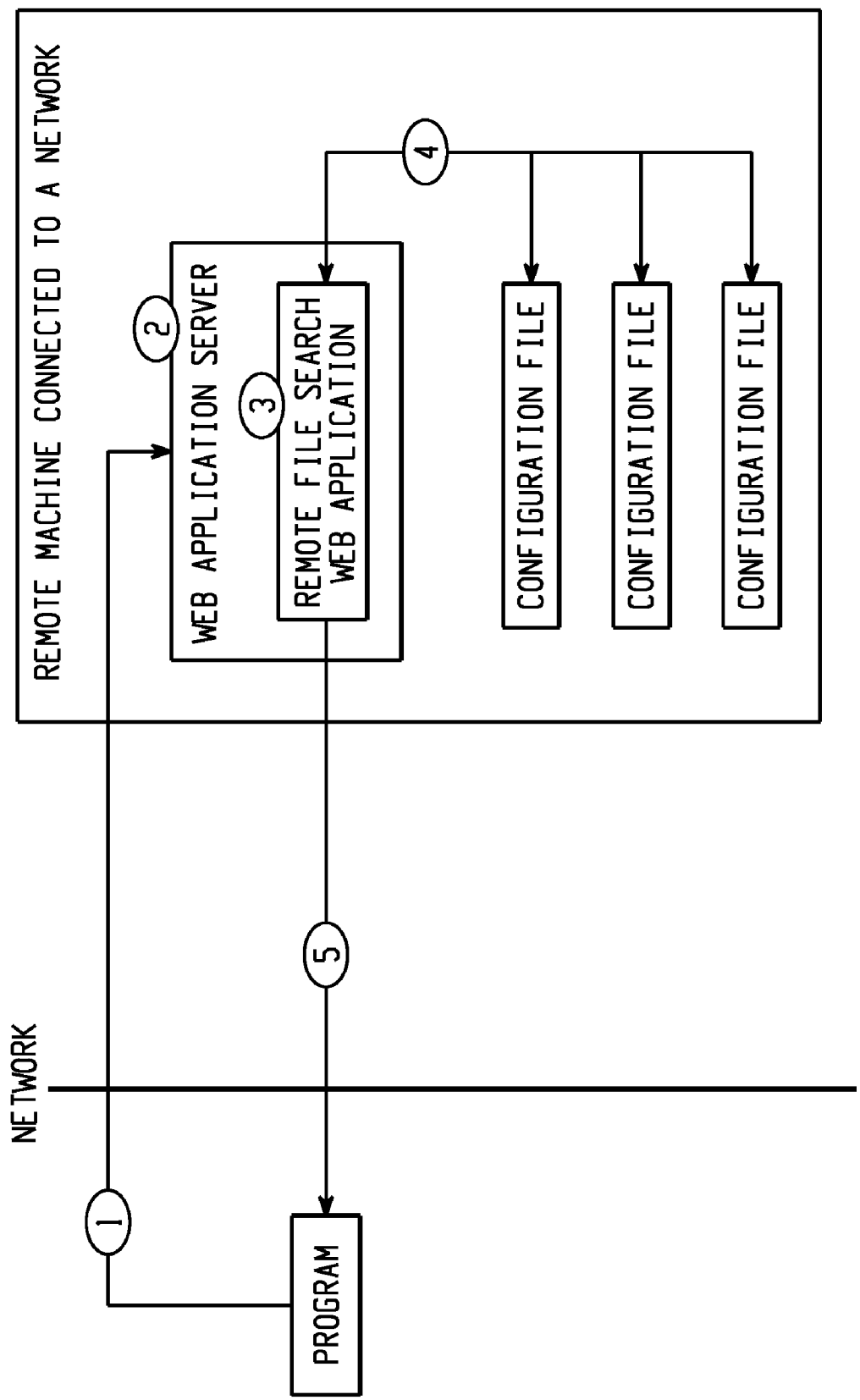

When the system is retrieving a data value for a test which requires data from a remote and otherwise inaccessible configuration file, the method calls a remote method (e.g. utilizing SOAP over HTTP) which will retrieve the data from the service agent's host. The agent's ability to perform this task is not limited by operating system, tier, or machine architecture. As an illustration, FIG. 37 depicts example task processing using a remote file search agent. The system first makes a connection with a web application server. The web application server then communicates with the remote file search web application. The remote file search web application receives the request to locate a list of specific configuration setting values from a list of specified configuration files. The remote file search web application searches the remote machine, locates any data meeting the specified requests, and returns the value to the remote file search web application. The data values gathered are then returned to the program.

After all of the data values are retrieved, the program analyzes each individual test, and displays the results in a general display test results display. If an administrator wishes to examine the results of any individual test in more detail, they may select a test from the general test results display. This will open the specific test results display. An administrator is then able to examine all of the retrieved data for any particular instance of a data value by selecting the data value within the specific test results display. The program will then retrieve, from the model, all of the data names and data values that are related to the instance from the model. The retrieved data names and data values are then displayed in a table.

In one example view which is shown in FIG. 38, a group test result analysis interface displays a listing of all of the tests just executed (region C), a test number indicator (region B), as well as an indicator of the test results (region D). The group test results are calculated by evaluating all of the data values that were returned to the program. If all of the data values evaluate successfully, then the global result indicates pass. If any of the data values evaluate unsuccessfully, then the group result indicates failure. The indicator can take one of several forms including 'passed', 'failed', 'more information available by selecting this test', and 'information only—no evaluation was performed'. Also included is an area where an administrator can read a detailed description of any test selected (region E). This tool isolates the administrator from the program environment and gives the administrator the ability to identify data areas that may contain anomalous values. The administrator may elect to explore any individual test by choosing a single test.

FIG. 39 shows a single test result analysis interface tool. This tool retrieves the data names and values from the model, which retrieves the specific test from the list of tests, and then retrieves the data values stored in the individual tests. The specific test result interface displays all of the data values retrieved for the test. It then provides the administrator with the ability to evaluate and compare the data values that have been retrieved. Each test is comprised of two types of data. The results for each type of data are displayed in separate tables (region F). The specific test result display shows all found instances of each of these data types within a table, with the different instances being displayed in a list format (region L). Each line of the list includes the name of the source for that particular instance (region G), as well as the data name (region I), the value of the data (region I), as well as an evaluation indicator (region J).

The single test result analysis interface tool also includes an area (region K) that contains a discussion of how the two data tables are related, a discussion of the results, suggestions on how to fix the results if not as expected, and links to further information. The administrator exercises the analysis of the test by choosing a specific instance of data from either table. The tool automatically compares the data values between the chosen instance and all of the data values in the other table. It then places an evaluation indicator next to the data in the opposite table. This indicator has several potential values including 'passed,' 'failed,' and 'information'. This isolates the administrator from the need to compare and analyze data values, and provides the administrator with a quick scan capability that focuses attention on anomalous data values.

Figures 40, 41:
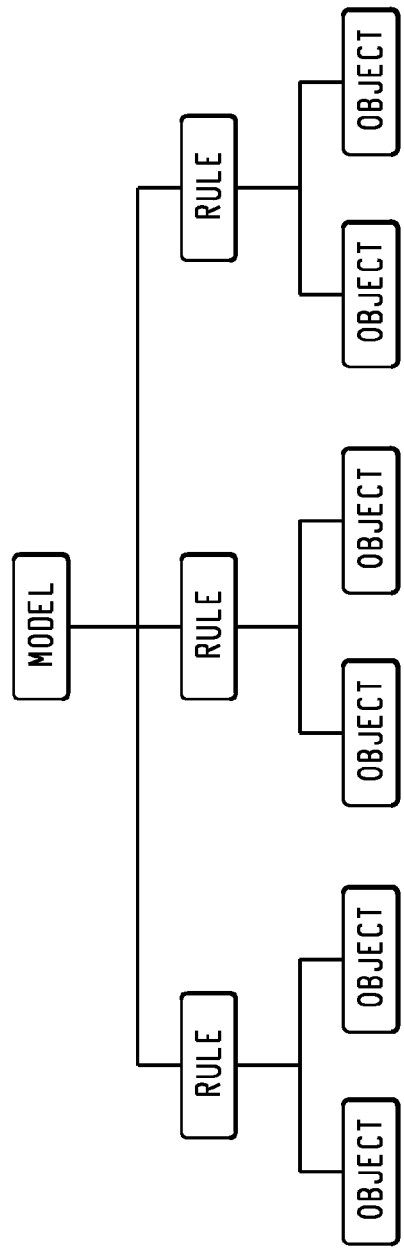

FIG. 40 illustrates another view all of the data values (region C) collected from a single data source (region B). This provides the administrator with the ability to immediately access a single compilation of data for a single configuration data source. This ability isolates the administrator from the software applications and documents that comprise the system.

The objects used in the task data can be structured in many different ways, such as the manner shown in FIG. 41. FIG. 41 shows that a model is a test group that is comprised of a list of rules and other models. Within the model, objects are referenced by rules for specifying how configuration data is to be analyzed. An object can represent anything that information can be retrieved about; such as a workspace server, a library, a user, or a configuration file.

FIGS. 42-48 provide an example of using a model within a configuration analysis scenario. In this example, FIG. 42 shows an object "IdentityGroup" that is defined with a value ("IdentityGroup") and type ("SASObject") which are used to instruct the system to retrieve all objects specific to the IdentityGroup type. These IdentityGroup Objects are then made available for inspection. The object also specifies property names ("Displayable Name," "Name", "Members," and "Logins") which are used to provide instructions to the system describing which specific property values the system should retrieve if asked to do so.

FIG. 43 shows a rule being defined with a unique rule identifier ("108"), the name of the rule that is to be displayed on the interface ("Users belong to which Identity Groups"), and a description which in this example is the same as the displayable name. The rule specifies two objects ("person" and "IdentityGroup") and the relationship ("AtLeastOne-Matches") that is to be used in analyzing the two objects.

FIG. 44 shows a model being defined that uses the object and rule that were defined in FIGS. 42 and 43. The model has a name ("Users"), a type ("Explore"), and an application value ("SASManagementConsole") which are used to assist the end user by providing uniquely identifiable and filterable descriptive variables as they decide which models they are interested in viewing. The model also specifies which rules are to be included in the model. Two rules are specified including rule number 108 which was defined above.

Figure 45:
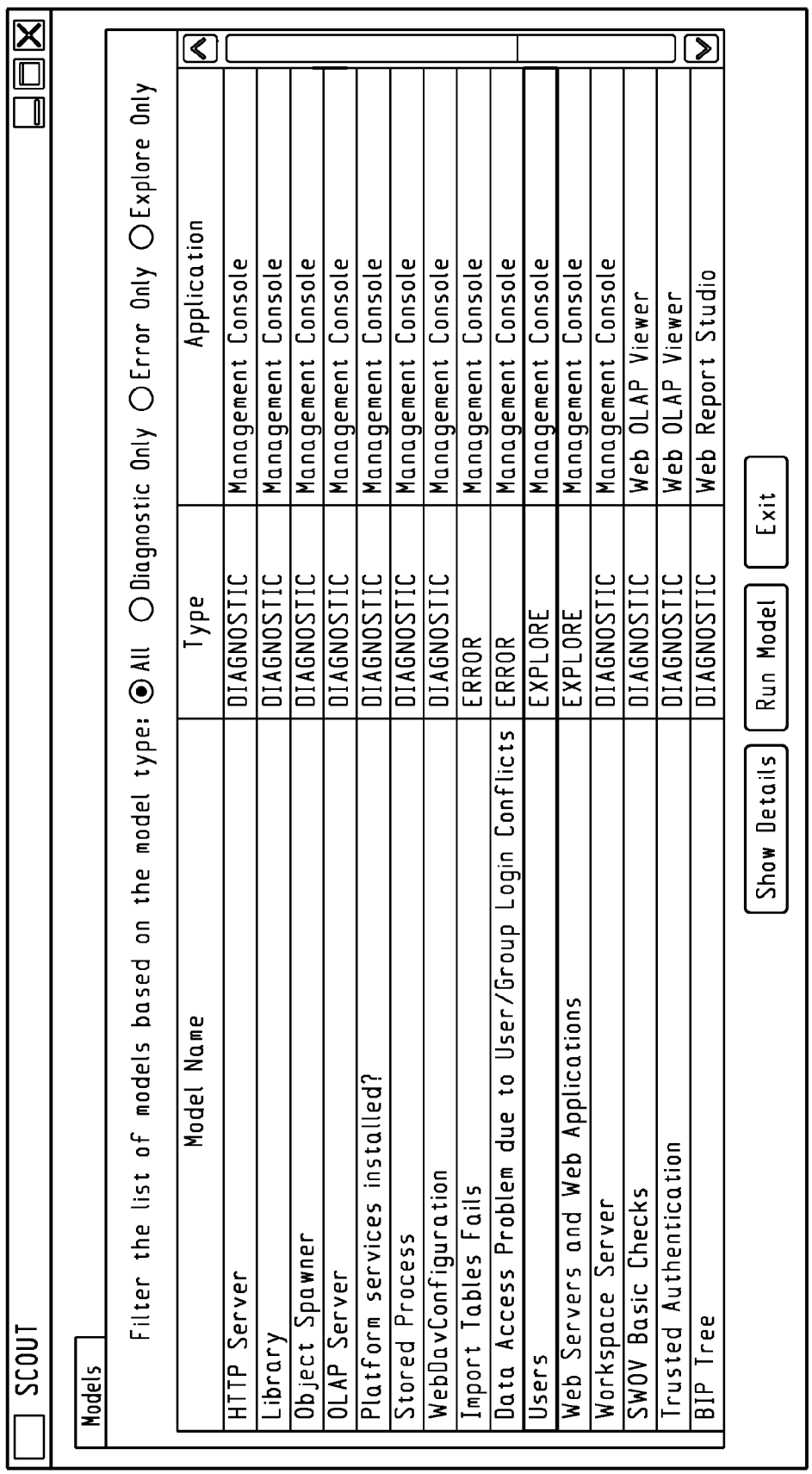
FIGS. 45 and 46 depict a run model selection display and a model results display, respectively.

FIG. 45 displays to an administrator a list of models that the administrator can select to form iteration analysis. The first column of the display lists the model names. The second column indicates the type of the model. The third column indicates the application. The administrator can filter the list of models based on the model type in order to hone in upon the specific types of models. For example, models can be filtered upon whether the model is a diagnostic only model, and explore only.

As shown in FIG. 45, the administrator has selected the "Users" model. The administrator can click upon the show details button on the interface in order to show additional descriptive information about what the model covers. The administrator could also click upon the run model button in order to have the model execute.

Figure 46:
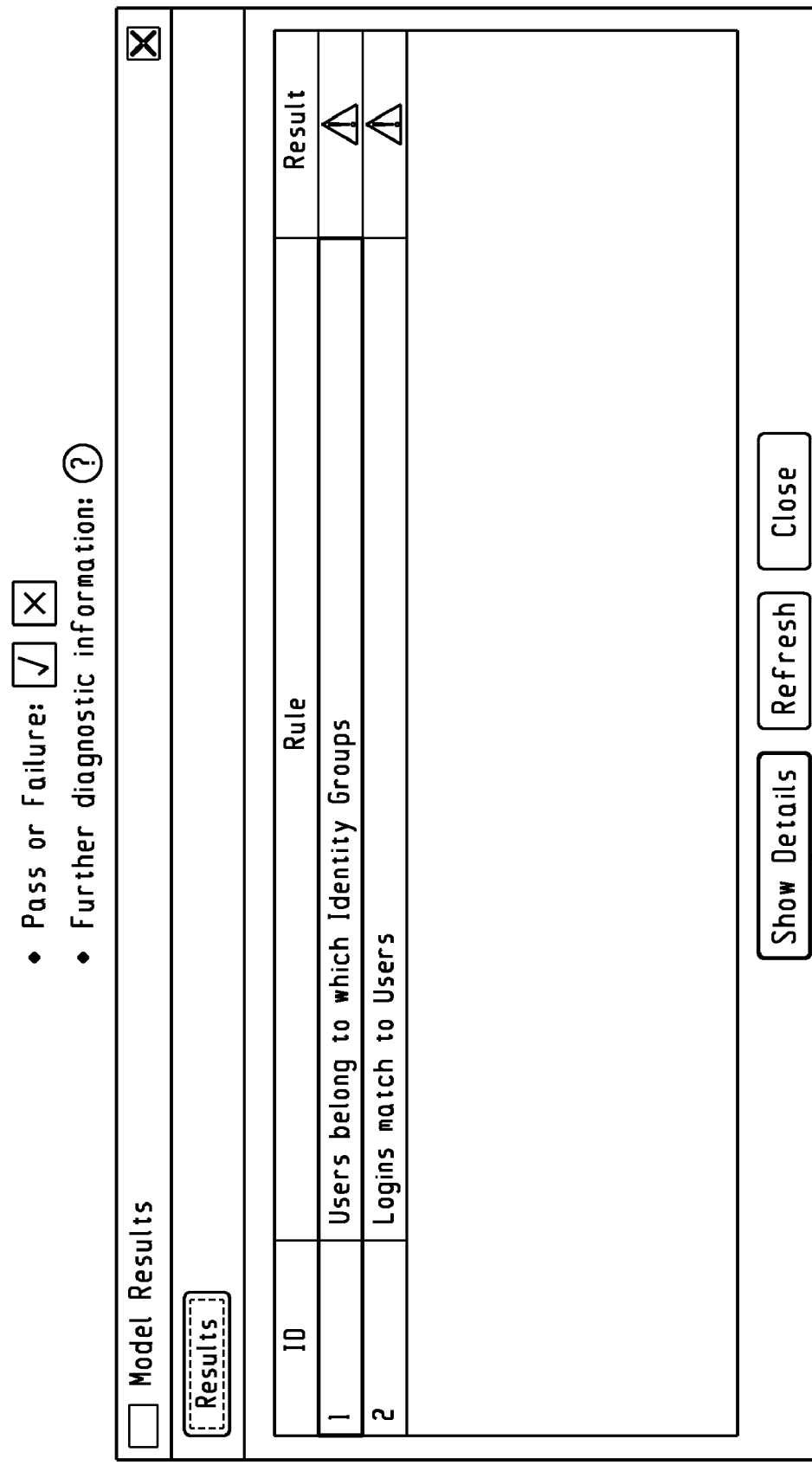

FIG. 46 shows the results from the execution of the "Users" model. The display of FIG. 46 illustrates that the rules associated with the selected model have resulted in issues being identified as illustrated in the last column of the display. The administrator can click upon the show details button in order to view detailed diagnostic information associated with the identified issues.

Figure 47:
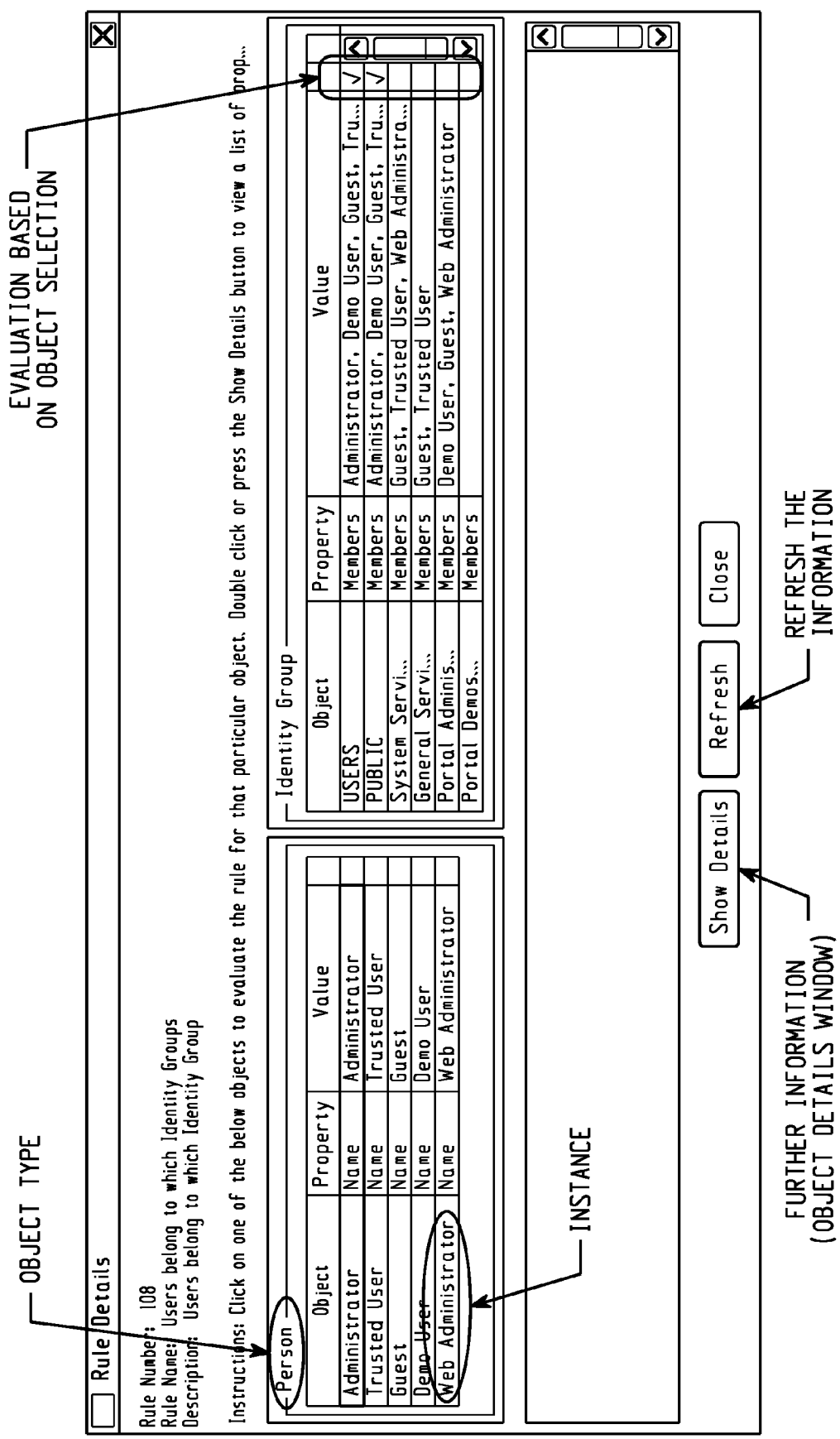
FIGS. 47 and 48 depict a rule details display and an object details display, respectively.

FIG. 47 provides an example of an interface providing details about application of the rule. In the example of FIG. 47, details about rule number 108 are provided in the interface. This rule is directed towards checking users or persons belonging to which identity groups. Accordingly, the upper left-hand portion of the interface contains user or "Person" information, and the upper right-hand portion of the interface contains identity group information.

The administrator has selected the object "SAS Administrator" that is located in the upper left-hand portion of the interface. In response, an evaluation is performed based upon the selected object. The evaluation results are shown in the last column of the identity group portion of the interface. The administrator can select the refresh button to see if any evaluation results have changed since the time of the last evaluation administrator can also select the show details button in order to view additional information about the selected object.

Figure 48:
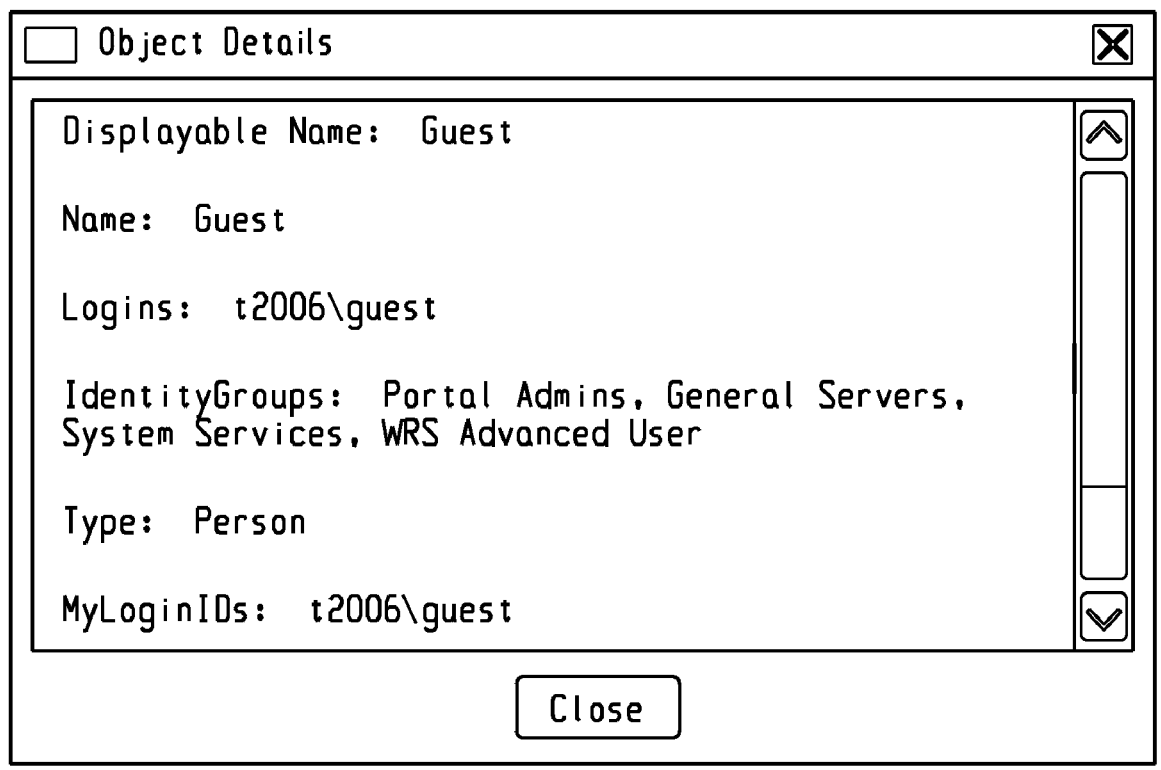

FIG. 48 is example of a window providing additional details about the selected object. In this example, the object "SAS Guest" have been selected, and the object details window provides values and other information associated with the selected object.

Figure 49A:
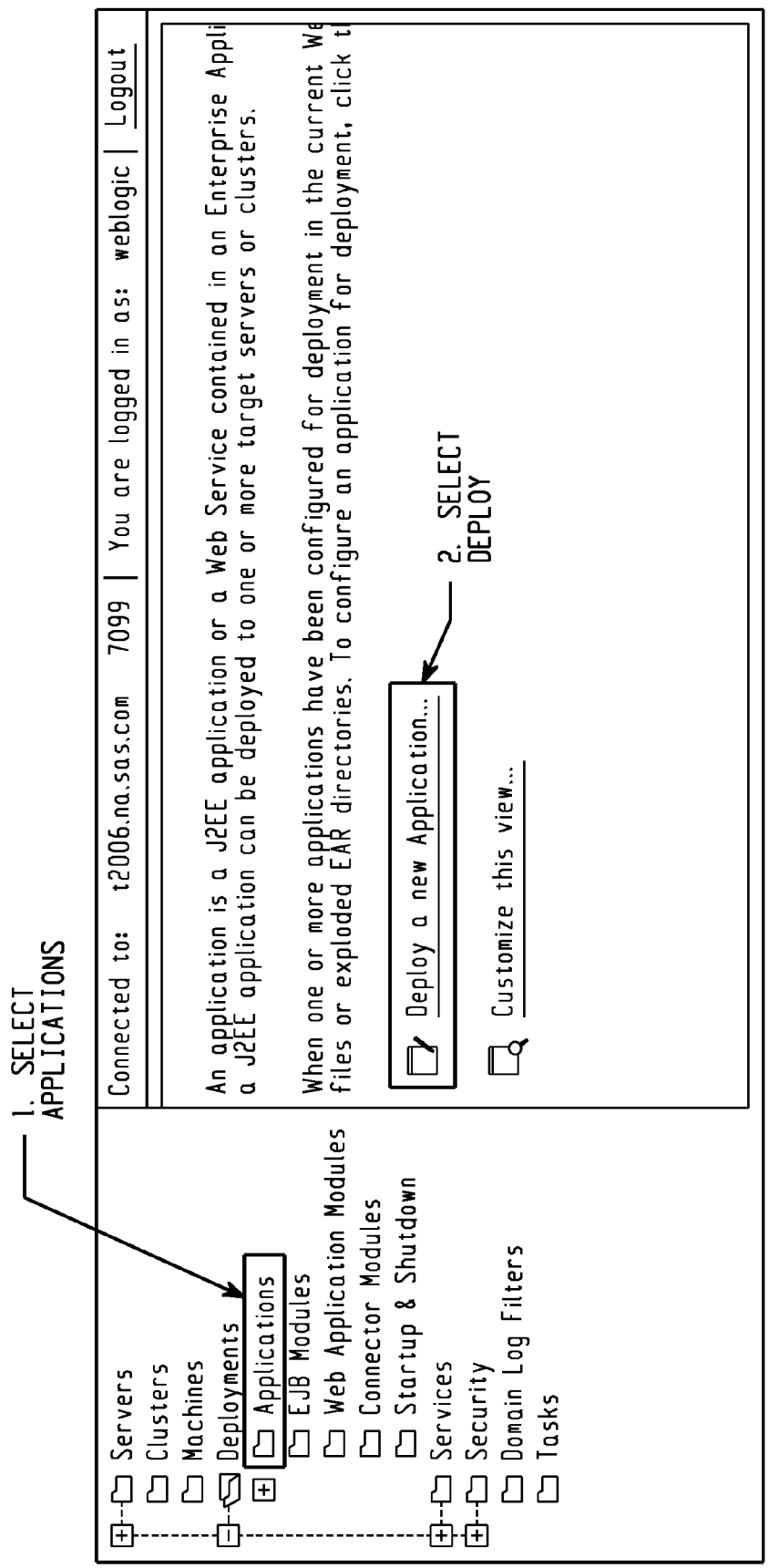
FIGS. 49A-52 depict a remote data capture and analysis example.
Figure 49B:
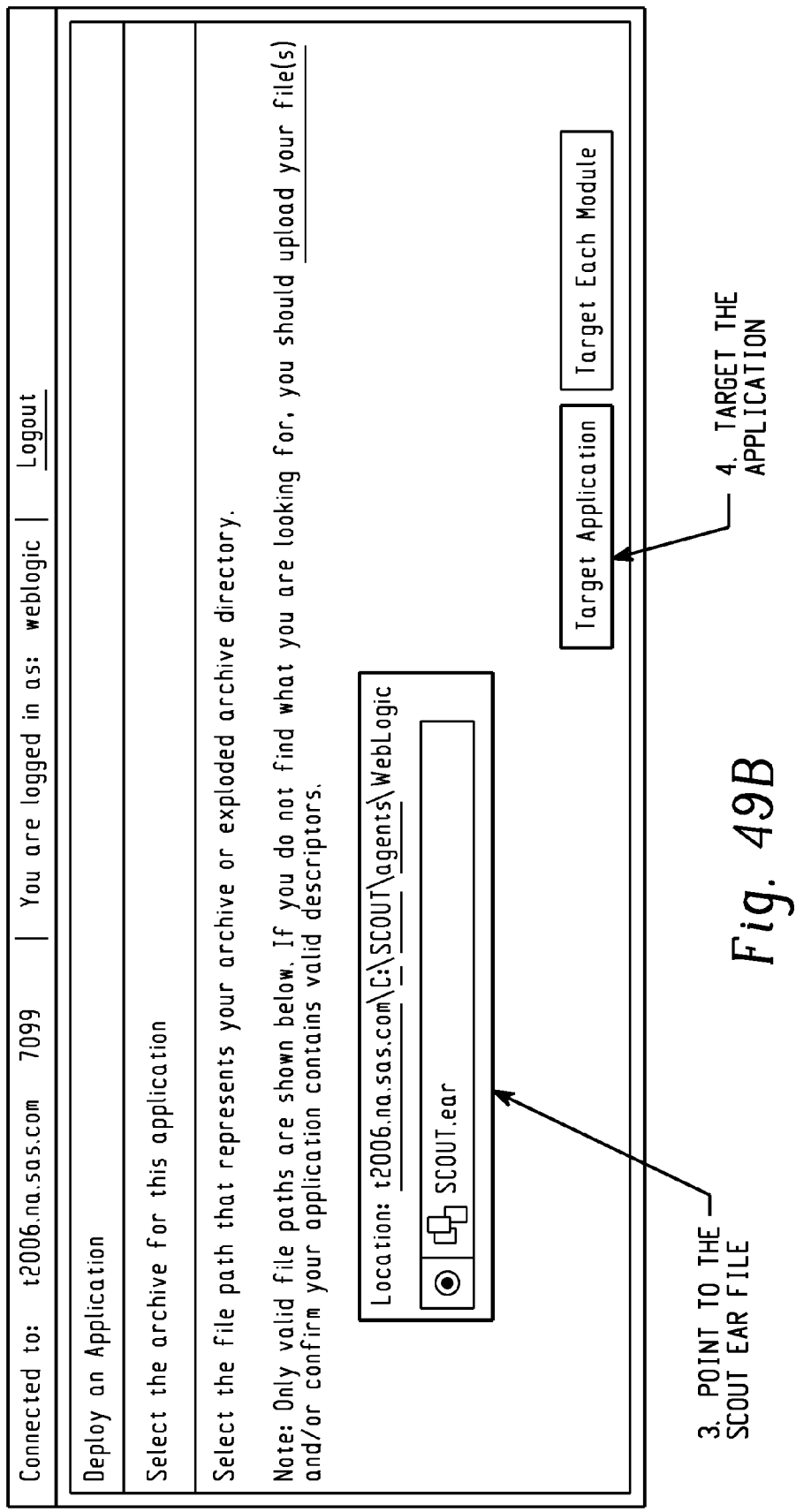
Figure 50:
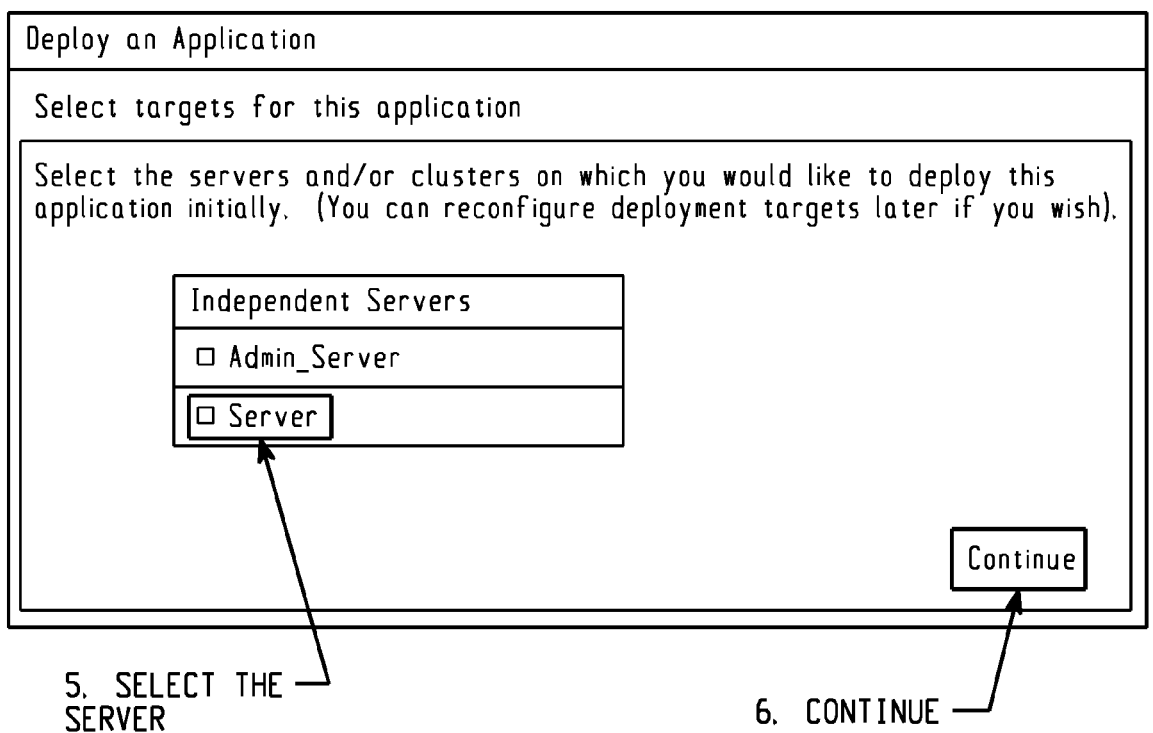
Figure 51:
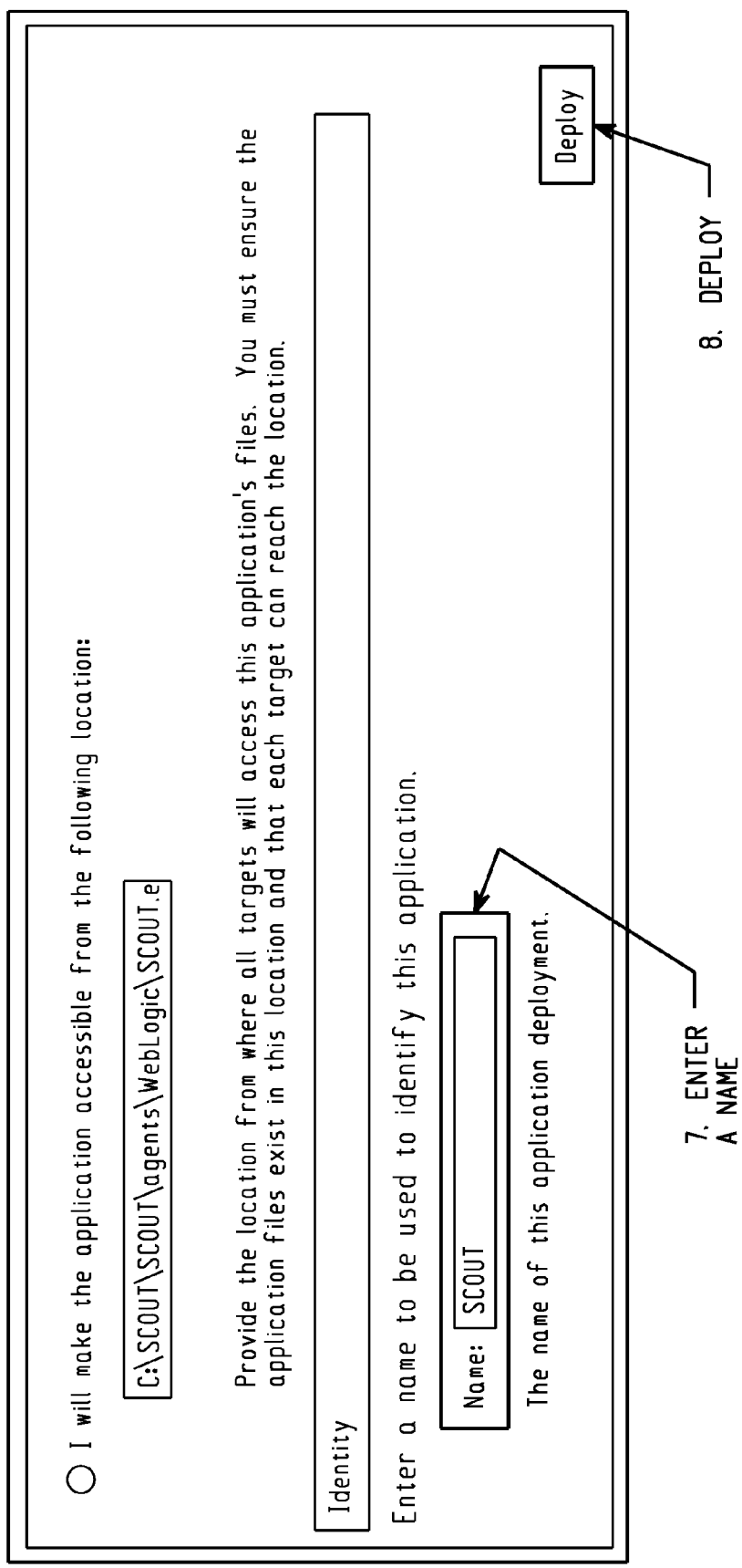
Figure 52:
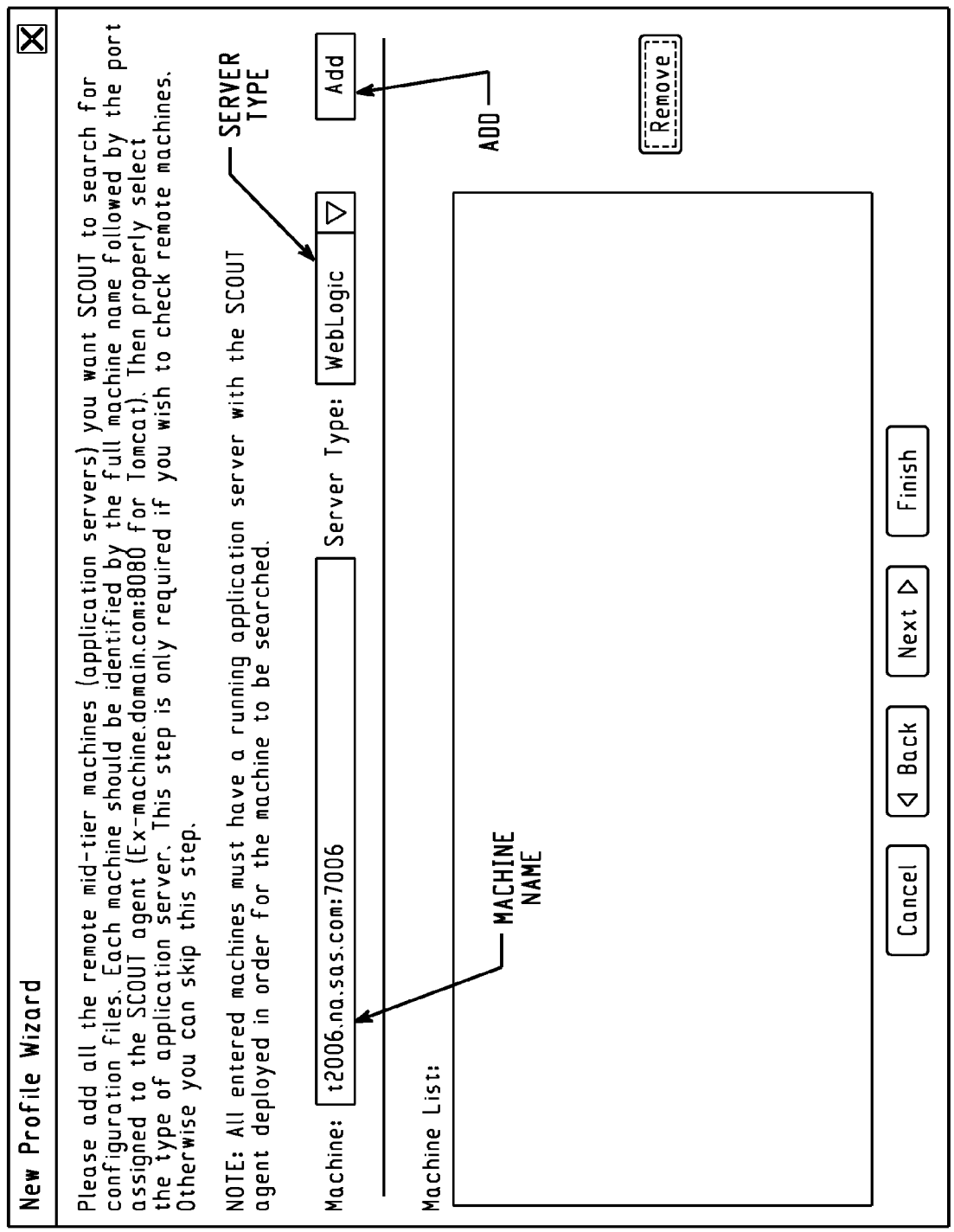

FIGS. 49A-52 provided an example of deploying a new application. As shown in FIGS. 49A and 49B, an administrator selects the application to be deployed as indicated at position one on the figure. The administrator selects the interface item at position 2 in order to select the deploy action. The administrator selects the archive for this application at position 3, and clicks upon the target application button at position 4. As shown in FIG. 50, the administrator selects the server at position 5 on the interface, and clicks upon the continue button at position 6. As shown in FIG. 51, the name is entered at position 7, and the deploy operation is initiated upon the button indicated at position 8. The interface on FIG. 52 is a new profile Wizard for adding information about a new machine or application. In this example, the machine name is added along with the type of server it is. This provides an orderly deployment of an application or computer, wherein information about its configuration is automatically handled.

A configuration settings analysis system can also be run from a command line, and produce output that can be viewed without being connected to a repository network. This can be useful in many different situations, such as technical support of remote systems, system administrators supporting multiple repositories, etc. FIGS. 53 and 54 respectively show XML input and XML output for use when the configuration settings analysis system is being run in batch mode. In such a mode, the configuration settings analysis system automatically receives the input data it needs to perform its configuration analysis automatically, and outputs the results in a data file for later examination.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, the systems and methods may be implemented on various types of computer architectures, such as for example on a single general purpose computer or workstation, or on a networked system, or in a client-server configuration, or in an application service provider configuration.

Figure 55:
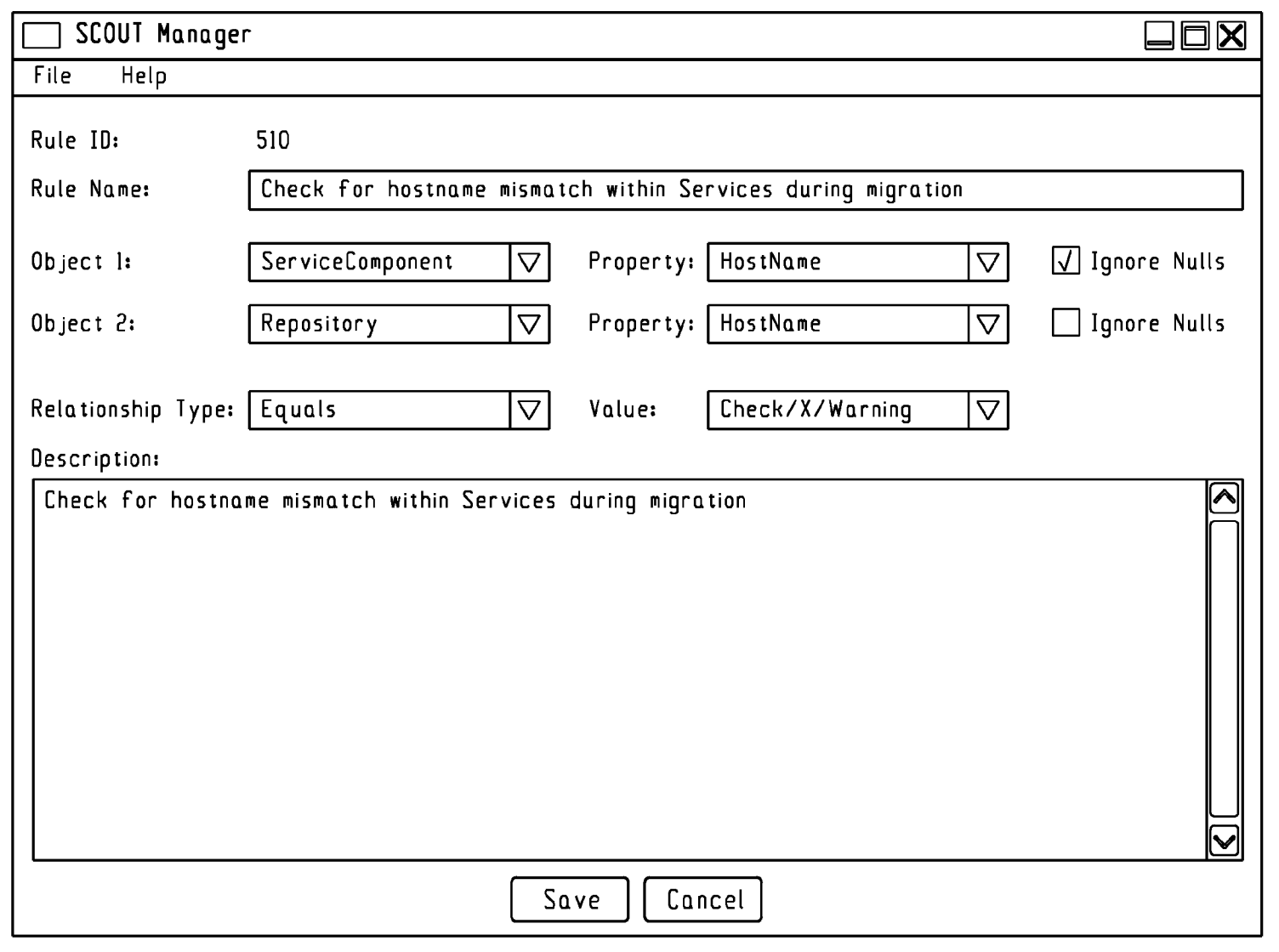
Figure 56:
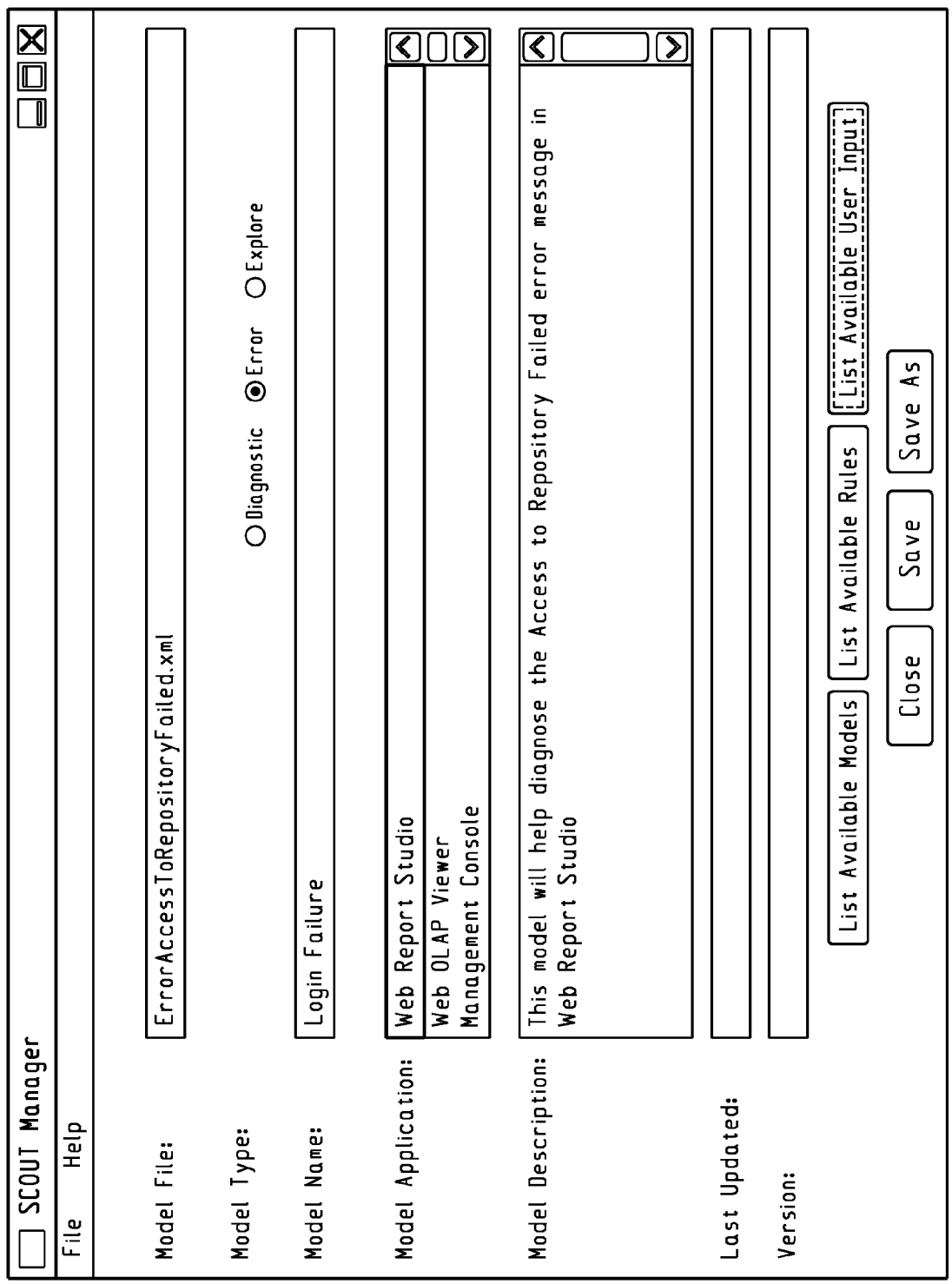

As another example, a system and method can include interfaces to assist the administrator in defining models, rules, batch mode input files, and other relevant items. As an illustration, FIG. 55 shows an interface wherein administrator can visually create a rule, and FIG. 56 shows an interface for visually creating a model.

Further, it be understood that systems and methods disclosed herein are applicable to all situations involving configuration data analysis. For example, a system and method can be configured to analyze configuration settings associated with an initial installation of what Amore software applications over one or more computer environments.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for analyzing configuration data, comprising:

receiving, using one or more data processors, a selection of software configuration tests, wherein a software configuration test determines whether a specified relationship exists between software configuration items associated with multiple software applications;

determining, using the one or more data processors, software configuration items needed to perform the software configuration tests, wherein the software configuration items are retrieved from the multiple software applications, and wherein many to many relationships exist among the software configuration items;

retrieving, using the one or more data processors, values for the software configuration items, wherein retrieving values includes using a search engine and a remote agent, wherein the search engine communicates with the software applications or reads configuration files associated with the software applications, and wherein the remote agent reads software application configuration files on a remote machine;

executing, using the one or more data processors, the software configuration tests using a comparator that determines whether the specified relationship exists by comparing the retrieved values for the software configuration items needed to perform the software configuration tests; and providing, using the one or more data processors, data for display, wherein the data includes a list of executed software configuration tests, and wherein the data includes a pass indication when an executed software configuration test is passed.

2. The method of claim 1, wherein software configuration tests are associated with software configuration items, and wherein the selection of software configuration tests is based upon a selection of an associated configuration item from a list on a graphical display.

3. The method of claim 2, wherein the graphical display includes a first list of configuration items and a second list of configuration items, and wherein selection of a software configuration item on the first list causes a software configuration test associated with the selected software configuration item on the first list and all software configuration items on the second list to be selected.

4. The method of claim 3, wherein many to many relationships exist among the software configuration items in the first list and the software configuration items in the second list.

5. The method of claim 1, wherein a particular software configuration item is a software object having classes and properties.

6. The method of claim 1, wherein a particular software configuration test is based upon a software configuration test model.

7. The method of claim 6, wherein the software configuration test model of the particular software configuration test references a rule or an additional software configuration test model.

8. The method of claim 7, wherein the rule specifies a criteria for evaluating the retrieved values to see if the specified relationship exists between software configuration items.

9. The method of claim 1, wherein the software configuration items include configuration information about a workspace server, a library, and a configuration file.

10. The method of claim 1, wherein at least one software application resides in a different and disparate computer environment.

11. The method of claim 10, wherein the different computer environment is a different server.

12. The method of claim 10, wherein the disparate computer environment includes a different software manufacturer vendor source, machine type or tier, software or hardware architecture, or software operating system.

13. The method of claim 1, further comprising:
   storing test results for future analysis to evaluate changes of configuration settings over time.
14. The method of claim 1, further comprising:
   storing test results as a benchmark of a proper system configuration.
15. The method of claim 1, further comprising:
   providing test results to a third party for analysis.
16. The method of claim 1, further comprising:
   providing a test group indicator, wherein the test group indicator identifies whether all of the selected configuration tests were passed.
17. The method of claim 1, wherein the data provided for display is sorted according to software applications.
18. The method of claim 1, wherein one or more of the software applications are executing when the software configuration tests are executed.
19. The method of claim 1, further comprising:
   receiving an edit to one or more of the configuration tests.
20. The method of claim 1, wherein a particular configuration test includes a relationship indicator, and wherein the relationship indicator identifies the specified relationship to be tested.
21. The method of claim 1, wherein the configuration items include an object, wherein the search engine is provided with parameters of the object, and wherein the parameters of the object include a pointer to the object, a class of the object, a value of the object, a name of a property of the object, a type of the property of the object, or a potential value of the property of the object.
22. The method of claim 1, wherein the values are retrieved from metadata repositories in different and disparate computer environments.
23. The method of claim 1, wherein the configuration items include software application installation configuration data.
24. The method of claim 1, wherein the configuration items include post-installation production configuration data.
25. A computer-implemented system for analyzing configuration data, comprising:
   one or more data processors;
   one or more computer-readable storage mediums containing instructions configured to cause the one or more processors to perform operations including:
   receiving a selection of software configuration tests, wherein a software configuration test determines whether a specified relationship exists between software configuration items associated with multiple software applications;
   determining software configuration items needed to perform the software configuration tests, wherein the software configuration items are retrieved from the multiple software applications, and wherein many to many relationships exist among the software configuration items;
   retrieving values for the software configuration items, wherein retrieving values includes using a search engine and a remote agent, wherein the search engine communicates with the software applications or reads configuration files associated with the software applications, and wherein the remote agent reads software application configuration files on a remote machine;
   executing the software configuration tests using a comparator that determines whether the specified relationship exists by comparing the retrieved values for the software configuration items needed to perform the software configuration tests; and
   providing data for display, wherein the data includes a list of executed software configuration tests, and wherein the data includes a pass indication when an executed software configuration test is passed.
26. A computer-program product for analyzing configuration data, tangibly embodied in a machine-readable non-transitory storage medium, including instructions configured to cause a data processing apparatus to:
   receive a selection of software configuration tests, wherein a software configuration test determines whether a specified relationship exists between software configuration items associated with multiple software applications;
   determine software configuration items needed to perform the software configuration tests, wherein the software configuration items are retrieved from the multiple software applications, and wherein many to many relationships exist among the software configuration items;
   retrieve values for the software configuration items, wherein retrieving values includes using a search engine and a remote agent, wherein the search engine communicates with the software applications or reads configuration files associated with the software applications, and wherein the remote agent reads software application configuration files on a remote machine;
   execute the software configuration tests using a comparator that determines whether the specified relationship exists by comparing the retrieved values for the software configuration items needed to perform the software configuration tests; and
   provide data for display, wherein the data includes a list of executed software configuration tests, and wherein the data includes a pass indication when an executed software configuration test is passed.

* * * * *